United States Patent
Kawamura et al.

(10) Patent No.: US 9,404,039 B2
(45) Date of Patent: Aug. 2, 2016

(54) NEMATIC LIQUID CRYSTAL COMPOSITION AND LIQUID CRYSTAL DISPLAY DEVICE USING THE SAME

(71) Applicant: DIC CORPORATION, Tokyo (JP)

(72) Inventors: Joji Kawamura, Kita-adachi-gun (JP); Makoto Negishi, Kita-adachi-gun (JP); Masahiro Niwa, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/428,777

(22) PCT Filed: Dec. 11, 2012

(86) PCT No.: PCT/JP2012/082065
§ 371 (c)(1),
(2) Date: Mar. 17, 2015

(87) PCT Pub. No.: WO2014/091555
PCT Pub. Date: Jun. 19, 2014

(65) Prior Publication Data
US 2015/0240158 A1 Aug. 27, 2015

(51) Int. Cl.
| C09K 19/12 | (2006.01) |
| C09K 19/20 | (2006.01) |
| C09K 19/30 | (2006.01) |
| C09K 19/44 | (2006.01) |
| C09K 19/04 | (2006.01) |
| C09K 19/18 | (2006.01) |

(52) U.S. Cl.
CPC .............. *C09K 19/3066* (2013.01); *C09K 19/44* (2013.01); *C09K 2019/0466* (2013.01); *C09K 2019/123* (2013.01); *C09K 2019/181* (2013.01); *C09K 2019/301* (2013.01); *C09K 2019/3004* (2013.01); *C09K 2019/3009* (2013.01); *C09K 2019/3016* (2013.01); *C09K 2019/3025* (2013.01); *C09K 2019/3063* (2013.01)

(58) Field of Classification Search
CPC .................. C09K 19/3066; C09K 2019/0466; C09K 2019/123; C09K 2019/3004; C09K 19/12; C09K 19/20; C09K 19/30; C09K 19/44; C09K 2019/181; C09K 2019/3994; C09K 2019/3025; C09K 2019/3063; C09K 2019/3066
See application file for complete search history.

(56) References Cited

U.S. PATENT DOCUMENTS

2003/0134056 A1* 7/2003 Heckmeier ........ C09K 19/3001
428/1.1
2006/0278850 A1* 12/2006 Czanta ............... C09K 19/3003
252/299.61

FOREIGN PATENT DOCUMENTS

| JP | 2005-220355 A | 8/2005 |
| JP | 2008-7752 A | 1/2008 |
| JP | 2009-84560 A | 4/2009 |
| JP | 2009-149853 A | 7/2009 |
| JP | 2009-270102 A | 11/2009 |
| JP | 2011-510112 A | 3/2011 |
| JP | 2011-153202 A | 8/2011 |
| JP | 2011-525553 A | 9/2011 |
| JP | 2011-231197 A | 11/2011 |
| JP | 2012-516920 A | 7/2012 |
| WO | 2010/137538 A1 | 12/2010 |

OTHER PUBLICATIONS

International Search Report dated Mar. 19, 2013, issued in corresponding application No. PCT/JP2012/082065.

* cited by examiner

*Primary Examiner* — Shean C Wu
(74) *Attorney, Agent, or Firm* — Westerman, Hattori, Daniels & Adrian, LLP

(57) ABSTRACT

A composition contains one or more compounds represented by general formula (i) and one or more compounds represented by general formula (ii), where a content of the compounds represented by general formula (i) is 5% to 30% and a content of the compounds represented by general formula (ii) is 5% to 25%:

[Chem. 1]

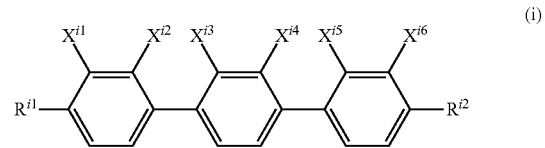

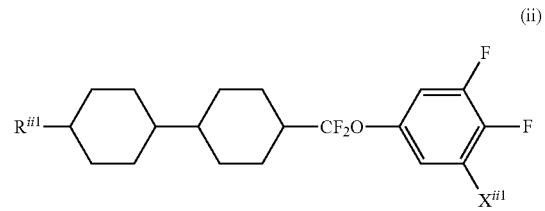

(In the formulae, $R^{i1}$, $R^{i2}$, and $R^{ii1}$ each independently represent an alkyl group having 1 to 8 carbon atoms where one —$CH_2$— or two or more non-adjacent —$CH_2$— in the alkyl group may each independently be substituted with —CH=CH—, —C≡C—, —O—, —CO—, —COO—, or —OCO—, $X^{i1}$ to $X^{i6}$ each independently represent a hydrogen atom or a fluorine atom, and $X^{ii1}$ represents a hydrogen atom, a fluorine atom, or a chlorine atom.).

7 Claims, 1 Drawing Sheet

NEMATIC LIQUID CRYSTAL COMPOSITION AND LIQUID CRYSTAL DISPLAY DEVICE USING THE SAME

TECHNICAL FIELD

The present invention particularly relates to a nematic liquid crystal composition that is useful as a liquid crystal display material and has dielectric anisotropy ($\Delta\in$) that takes a positive value and to a liquid crystal display device that uses the nematic liquid crystal composition.

BACKGROUND ART

Liquid crystal display devices are being used in watches, calculators, various measurement instruments, automobile panels, word processors, electronic organizers, printers, computers, televisions, clocks, advertising boards, etc. Typical examples of the liquid crystal display mode include TN (twisted nematic) mode, STN (super twisted nematic) mode, and vertical alignment or IPS (in-plane switching) that uses TFT (thin film transistors) mode. Liquid crystal compositions that are used in these liquid crystal display devices are required to be stable against external stimuli such as moisture, air, heat, and light, stay in a liquid crystal phase in a temperature range as wide as possible about room temperature, exhibit low viscosity, and operate at a low drive voltage. A liquid crystal composition is constituted by several to dozens of compounds in order to optimize dielectric anisotropy ($\Delta\in$), refractive index anisotropy ($\Delta n$), and other properties for individual display devices.

In a horizontal alignment-type display such as a TN, STN, or IPS (in-plane switching) display, a liquid crystal composition having a positive $\Delta\in$ is used. There is a report of a drive mode in which the liquid crystal composition having a positive $\Delta\in$ is made to align vertically in the absence of applied voltage and a horizontal electric field is applied to perform display. There is an increasing need for a liquid crystal composition with a positive $\Delta\in$.

Low voltage driving, high speed response, and a wide operation temperature range are highly desirable in these driving modes. In other words, a positive $\Delta\in$ with a large absolute value, low viscosity ($\eta$), and a high nematic phase-isotropic liquid phase transition temperature (Tni) are desirable. Due to setting of $\Delta n \times d$, which is the product of $\Delta n$ and a cell gap (d), the $\Delta n$ of the liquid crystal composition needs to be adjusted to be within an appropriate range in accordance with the cell gap. Since high-speed response is important in order to use a liquid crystal display device in a television or the like, a liquid crystal composition having a low rotational viscosity ($\gamma 1$) is required.

Examples of the structure of a liquid crystal composition disclosed so far include liquid crystal compositions containing compounds represented by formulae (A-1a) and (A-1b) below and compounds represented by formulae (B-1a) to (B-1c) below (refer to PTL 1):

[Chem. 1]

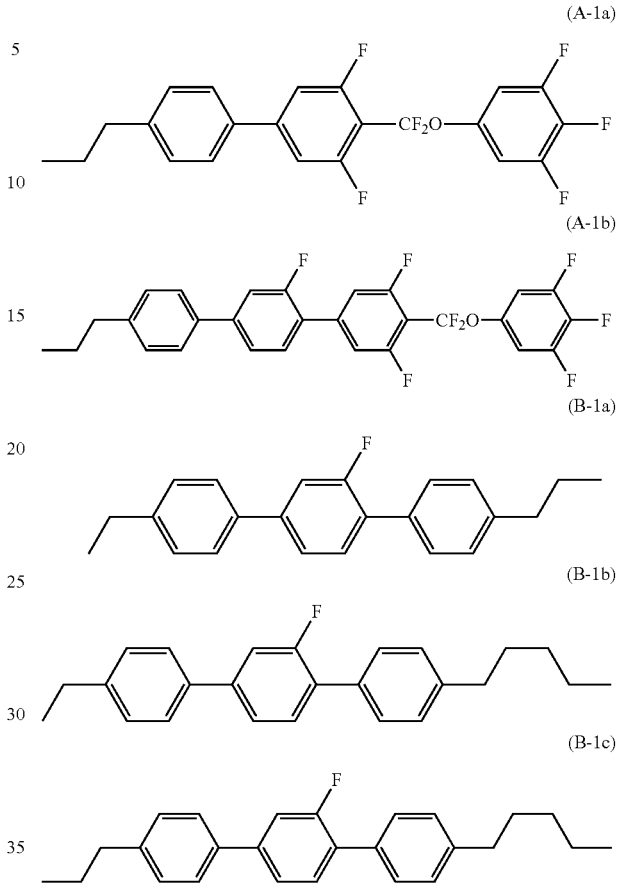

and liquid crystal compositions containing a compound represented by formula (A-3) below, compounds represented by formulae (A-2a) and (A-2b) below, and a compound represented by formula (B-2a) below (refer to PTL 2):

[Chem. 2]

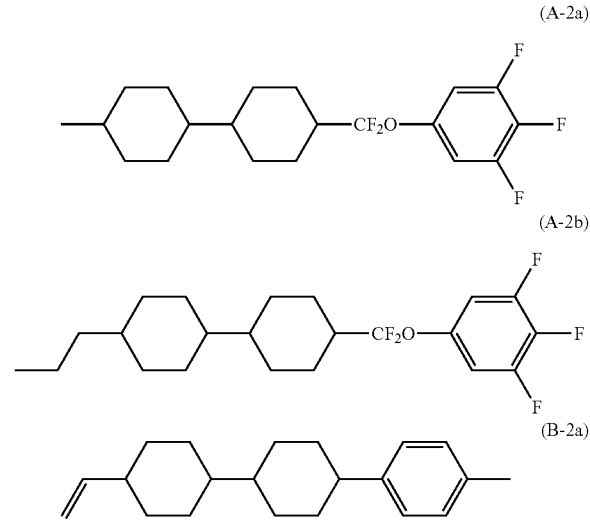

These liquid crystal compositions are characterized in that there are three ring structures in a liquid crystal compound having a positive Δ∈ and that —CF$_2$O— structure is included as a linking group.

As the usage of liquid crystal display devices expands, the operation methods and the production methods therefor have undergone significant changes. In order to meet the changes, optimization of the properties other than basic physical property values considered in the related art has become necessary. In other words, VA mode and IPS mode liquid crystal display devices that use liquid crystal compositions have become prevalent and display devices with super large screen size of 50 or larger have been put to practice and are now being widely used. As the substrate size increases, a one drop fill (ODF) method has become the mainstream method for injecting a liquid crystal composition into a substrate, thereby replacing a conventional vacuum injection method. However, degradation of display quality caused by drop marks that occur when the liquid crystal composition is dropped onto a substrate has become a problem.

In a liquid crystal display device production process based on the ODF method, optimum amounts of liquid crystals need to be injected by dropping according to the size of a liquid crystal display device. If the injection amount significantly deviates from the optimum value, the balance among the pre-designed refractive index and drive electric field will be adversely affected and display defects such as nonuniformity and poor contrast will result.

In particular, for a small-size liquid crystal display device frequently used in smart phones that have become prevalent in recent years, it is difficult to control the deviation from the optimum value within a particular range since the optimum amount of the liquid crystals to be injected is small.

Accordingly, in order to produce liquid crystal display devices while maintaining high yield, for example, the influence of rapid pressure changes inside the dropping machine or impacts that occur during dropping of liquid crystals needs to be reduced and properties that enable stable dropping of liquid crystals for a long time are required.

As such, a liquid crystal composition used in an active matrix-drive liquid crystal display device driven by TFTs and the like is required to maintain properties and performance, such as high-speed response, desirable for a liquid crystal display device, exhibit high resistivity and high voltage holding ratio and be stable against external stimuli such as light and heat as have been emphasized in the past, and to be developed by taking into account the liquid crystal display device production method.

CITATION LIST

Patent Literature

PTL 1: Japanese Unexamined Patent Application Publication No. 2008-7752 (Example 1)
PTL 2: Japanese Unexamined Patent Application Publication No. 2011-153202 (Example 3)

SUMMARY OF INVENTION

Technical Problem

An object of the present invention is to provide a composition that has Δ∈ that takes a positive value and is stable against heat and light.

Solution to Problem

The inventors of the present application have made studies on various compounds and found that the problem described above can be overcome by combining particular compounds, thereby making the present invention.

That is, the present invention provides a composition containing one or more compounds represented by general formula (i) below and one or more compounds represented by general formula (ii) below, in which a content of the compounds represented by general formula (i) below is 5% to 30% and a content of the compounds represented by general formula (ii) below is 5% to 25%.

[Chem. 3]

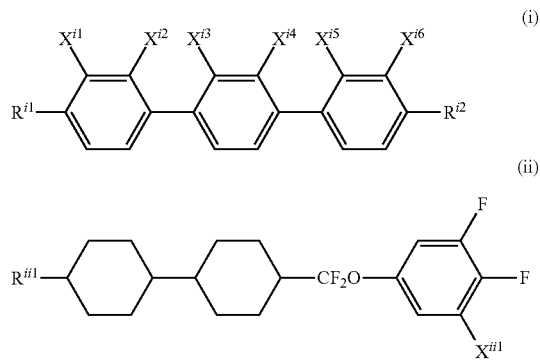

(In the formulae, $R^{i1}$, $R^{i2}$, and $R^{ii1}$ each independently represent an alkyl group having 1 to 8 carbon atoms where one —CH$_2$— or two or more non-adjacent —CH$_2$— in the alkyl group may each independently be substituted with —CH=CH—, —C≡C—, —O—, —CO—, —COO—, or —OCO—; $X^{i1}$ to $X^{i6}$ each independently represent a hydrogen atom or a fluorine atom; and $X^{ii1}$ represents a hydrogen atom, a fluorine atom, or a chlorine atom.)

Advantageous Effects of Invention

A composition according to the present invention can obtain low viscosity and exhibits a stable nematic phase at low temperature, and changes in resistivity and voltage holding ratio after heating and after UV irradiation are significantly small. Accordingly, the resulting product has high utility and a liquid crystal display device of a TN mode or the like that uses the composition can achieve high-speed response. Moreover, since performance can be stably exhibited during the process of producing a liquid crystal display device, display defects caused by the process are suppressed and high-yield production is possible. Thus, the composition of the present invention is significantly useful.

DESCRIPTION OF EMBODIMENTS

Figure 1:
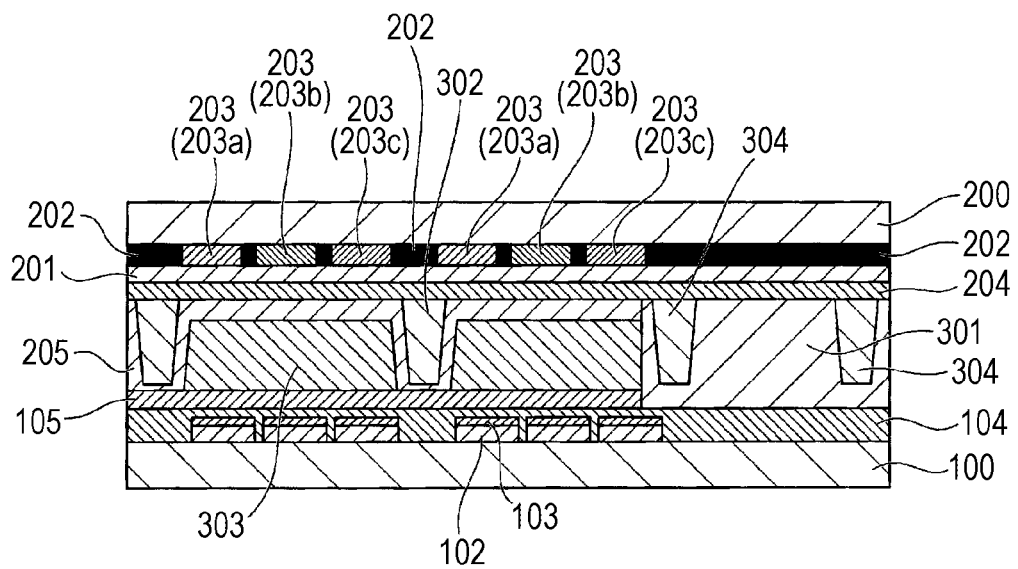
FIG. 1 is a cross-sectional view of a liquid crystal display device according to the present invention. A substrate that includes 100 to 105 is referred to as a "backplane" and a substrate that includes 200 to 205 is referred to as a "frontplane".

A composition according to the present invention contains a compound represented by general formula (i) below:

[Chem. 4]

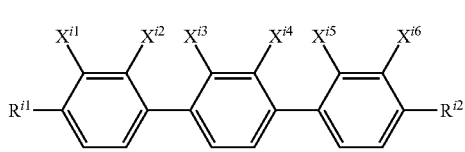

(In general formula (i), $R^{i1}$ and $R^{i2}$ each independently represent an alkyl group having 1 to 8 carbon atoms where one —$CH_2$— or two or more non-adjacent —$CH_2$— in the alkyl group may each independently be substituted with —CH=CH—, —C≡C—, —O—, —CO—, —COO—, or —OCO—; and $X^{i1}$ to $X^{i6}$ each independently represent a hydrogen atom or a fluorine atom.)

In general formula (i) above, $R^{i1}$ and $R^{i2}$ preferably each independently represent a linear alkyl group having 1 to 8 carbon atoms or a linear alkenyl group having 1 to 8 carbon atoms, preferably a linear alkyl group having 1 to 5 carbon atoms or a linear alkenyl group having 1 to 5 carbon atoms, or preferably a methyl group, an ethyl group, a propyl group, a butyl group, a pentyl group, or the structures described below:

[Chem. 5]

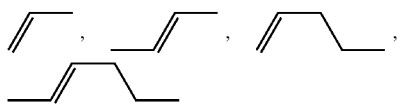

(In the formulae, the right-hand end is bonded to a cyclic structure.)

An alkenyl group is preferred when improvement of response speed is important and an alkyl group is preferred when the reliability, such as voltage holding ratio, of the resulting liquid crystal composition is important.

In general formula (i), $X^{i1}$ to $X^{i6}$ each independently represent a hydrogen atom or a fluorine atom. Among $X^{i1}$ to $X^{i6}$ in general formula (i), at least one preferably represents a fluorine atom. Specific examples thereof are compounds represented by formulae (i-1) to (i-11) below:

[Chem. 6]

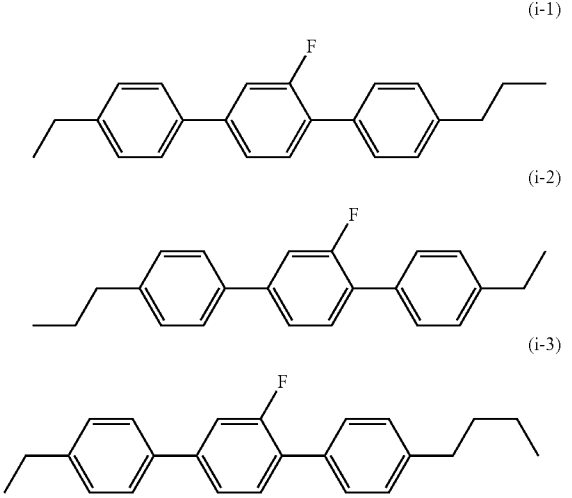

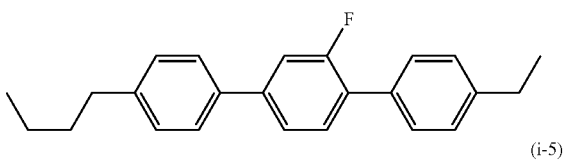

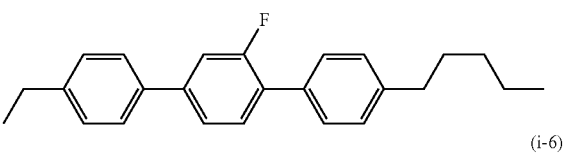

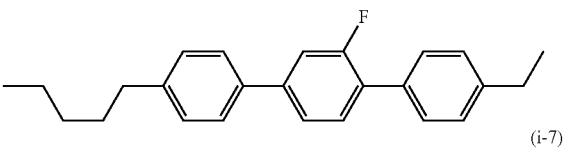

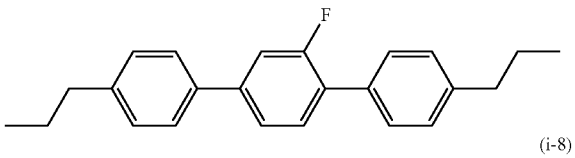

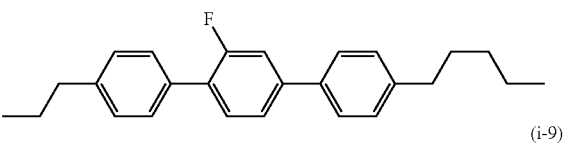

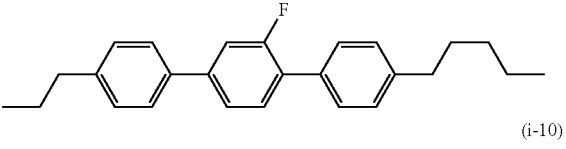

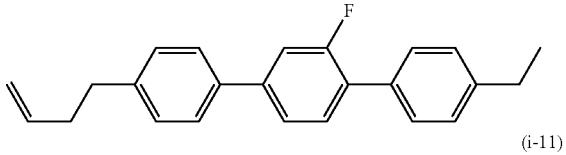

The composition of the present invention may contain only one of the compounds represented by formulae (i-1) to (i-11) above or two or more these compounds. Preferably, the compounds are appropriately used in combination in accordance with the desired refractive index anisotropy and solubility at room temperature and below freezing point.

Care should be taken since solubility is affected by the structures of the alkyl groups at the two ends of the compound. A compound in which at least one of the terminal groups is an ethyl group is preferred and compounds represented by formulae (i-1) to (i-6) are preferable. The content of a compound selected from compounds represented by formula (i-1) and formula (i-2) relative to the total amount of the composition of the present invention is preferably 3% by mass or more, preferably 5% by mass or more, and preferably 3% by mass or more, and is preferably 15% by mass or less and preferably 13% by mass or less. The content of a compound selected from the compounds represented by formula (i-3) and formula (i-4) relative to the total amount of the composition of the present invention is preferably 1% by mass or more and preferably 2% by mass or more, and preferably 15% by mass or less and preferably 13% by mass or less. The content of a compound selected from the compounds represented by formula (i-5) and formula (i-6) relative to the total amount of the composition of the present invention is preferably 5% by mass or more, preferably 7% by mass or more, preferably 8% by mass or more, and preferably 10% by mass or more, but is preferably 17% by mass or less and preferably 15% by mass or less. The compound represented by formula (i-1) and the compound represented by formula (i-3) are preferably contained together; in such a case, the total content relative to the total amount of the composition of the present invention is preferably 5% by mass or more and preferably 7% by mass or more but is preferably 20% by mass or less and preferably 18% by mass or less. The compound represented by formula (i-1) and the compound represented by formula (i-5) are preferably contained together; in such a case, the total content relative to the total amount of the composition of the present invention is preferably 10% by mass or more, preferably 15% by mass or more, preferably 20% by mass or more, and preferably 23% by mass or more but is preferably 30% by mass or less and preferably 28% by mass or less.

The number of the compounds that can be used in combination is not particularly limited. One to five of these compounds are preferably contained, one to four of these compounds are more preferably contained, and one to three of these compounds are most preferably contained. The molecular weight distribution of the compounds selected is preferably wide since it is effective for solubility. For example, one compound selected from the compounds represented by formula (i-1) and formula (i-2), one compound selected from the compounds represented by formula (i-3) and formula (i-4), one compound selected from the compounds represented by formula (i-5) and formula (i-6), and one compound selected from the compounds represented by formula (i-8) and formula (i-9) may be used in combination.

The composition may contain only one of the compounds represented by general formula (i) above or two or more of such compounds. Preferably, the compounds are appropriately used in combination in accordance with desired performance. The composition of the present invention preferably contains one to three compounds and more preferably one or two compounds selected from the compounds represented by general formula (i).

The content of the compounds represented by general formula (i) relative to the total amount of the composition is preferably 5 to 30% by mass or more, preferably 5% by mass or more, more preferably 7% by mass or more, and most preferably 8% by mass or more, but is preferably 30% by mass or less, more preferably 25% by mass or less, and most preferably 20% by mass or less.

The composition of the present invention contains a compound represented by general formula (ii) below.

[Chem. 7]

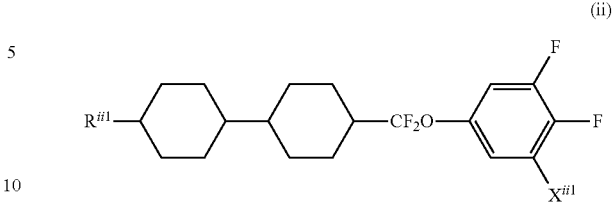

(ii)

(In general formula (ii) above, $R^{ii1}$ represents an alkyl group having 1 to 8 carbon atoms where one —CH$_2$— or two or more non-adjacent —CH$_2$— in the alkyl group may each independently be substituted with —CH=CH—, —C≡C—, —O—, —CO—, —COO—, or —OCO—; and $X^{ii1}$ represents a hydrogen atom, a fluorine atom, or a chlorine atom.)

In general formula (ii) above, $R^{ii1}$ is the same as $R^{i1}$ and $R^{i2}$ in general formula (i) above.

In this description, a 1,4-cyclohexylene group is preferably a trans-1,4-cyclohexylene group.

$X^{ii1}$ in general formula (ii) preferably represents a fluorine atom. Specific examples thereof include compounds represented by general formulae (ii-1) to (ii-4) below.

[Chem. 8]

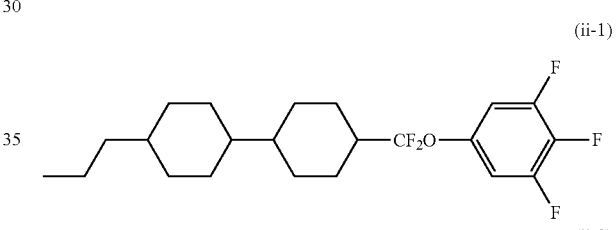

(ii-1)

(ii-2)

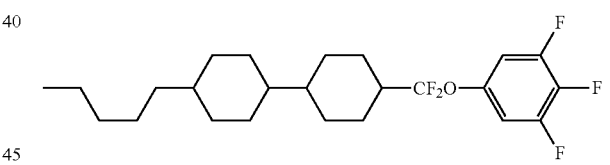

(ii-3)

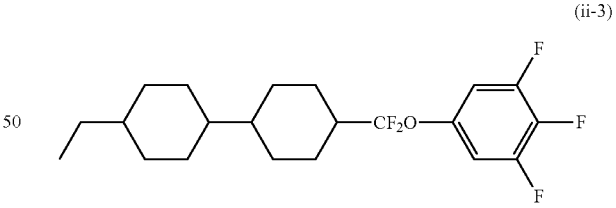

(ii-4)

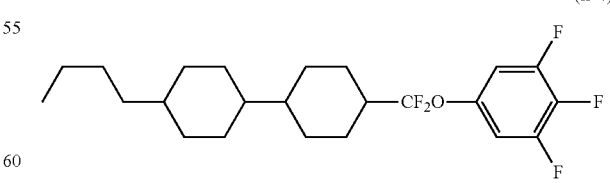

These compounds only differ from one another in terms of molecular weight due to the alkyl group structure at the termini. Since viscosity and Tni change due to the molecular weight, the contents of these compounds are appropriately adjusted. For example, a compound represented by formula (ii-2) has a large molecular weight and is effective for increasing Tni, but also increases viscosity due to its large molecular weight. Accordingly, the content of the compound represented by formula (ii-2) relative to the total amount of the composition of the present invention is preferably 2% by mass or more and preferably 3% by mass or more but is preferably 18% by mass or less, preferably 15% by mass or less, preferably 12% by mass or less, and preferably 10% by mass or less.

The composition of the present invention preferably contains 2% by mass or more and more preferably 3% by mass or more but 25% by mass or less, preferably 23% by mass or less, preferably 21% by mass or less, and preferably 20% by mass or less of the compound represented by formula (ii-1) relative to the total amount of the composition of the present invention.

The number of compounds to be used in combination is not particularly limited. Preferably one to three compounds and more preferably one or two compounds among these compounds are contained.

The composition may contain only one of the compounds represented by general formula (ii) above or two or more of such compounds. Preferably, the compounds are appropriately used in combination in accordance with desired performance. The composition of the present invention preferably contains one to three compounds and more preferably one or two compounds selected from the compounds represented by general formula (ii). Preferably, a compound represented by formula (ii-1) and a compound represented by formula (ii-2) are used in combination.

From the viewpoint of improving $\Delta\epsilon$, the content of the compound represented by general formula (ii) relative to the total amount of the composition is preferably 12% by mass or more and more preferably 15% by mass or more but is preferably 25% by mass or less, preferably 20% by mass or less, and preferably 18% by mass or less. From the viewpoint of balance between $\Delta\epsilon$ and $\Delta n$, the content is preferably 3% by mass or more and more preferably 5% by mass or more but is preferably 13% by mass or less, preferably 10% by mass or less, and preferably 9% by mass or less.

The composition of the present invention may contain one or more compounds represented by general formula (L).

[Chem. 9]

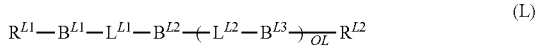

(L)

(In the formula, $R^{L1}$ and $R^{L2}$ each independently represent an alkyl group having 1 to 8 carbon atoms where one —$CH_2$— or two or more non-adjacent —$CH_2$— in the alkyl group may each be substituted with —CH═CH—, —C≡C—, —O—, —CO—, —COO—, or —OCO—, OL represents 0, 1, 2, or 3, $B^{L1}$, $B^{L2}$, and $B^{L3}$ each independently represent a group selected from the group consisting of the following:
(a) a 1,4-cyclohexylene group (one —$CH_2$— or two or more non-adjacent —$CH_2$— that are present in this group may be substituted with —O—) and
(b) a 1,4-phenylene group (one —CH═ or two or more non-adjacent —CH═ that are present in this group may be substituted with —N═), where the group (a) and the group (b) may each independently be substituted with a cyano group, a fluorine atom, or a chlorine atom, $L^{L1}$ and $L^{L2}$ each independently represent a single bond, —$CH_2CH_2$—, —$(CH_2)_4$—, —$OCH_2$—, —$CH_2O$—, —COO—, —OCO—, —$OCF_2$—, —$CF_2O$—, —CH═N—N═CH—, —CH═CH—, —CF═CF—, or —C≡C—, and when OL represents 2 or 3 and there are two or more $L^{L2}$, the two or more $L^{L2}$ may be the same or different and when OL represents 2 or 3 and there are two or more $B^{L3}$, the two or more $B^{L3}$ may be the same or different, provided that the compounds represented by general formula (i) and compounds represented by general formula (ii) are excluded.)

The number of compounds that can be used in combination is not particularly limited. An appropriate combination of compounds is used in accordance with desired performance, such as solubility at low temperature, transition temperature, electrical reliability, and birefringence. The number of compounds used may be one in an embodiment of the present invention, two in another embodiment of the present invention, three in another embodiment of the present invention, four in another embodiment of the present invention, five in another embodiment of the present invention, six in another embodiment of the present invention, seven in another embodiment of the present invention, eight in another embodiment of the present invention, nine in another embodiment of the present invention, and ten or more in another embodiment of the present invention.

In the liquid crystal composition of the present invention, the content of the compound represented by general formula (L) needs to be appropriately adjusted in accordance with the desired performance such as solubility at low temperature, transition temperature, electrical reliability, birefringence, process compatibility, drop marks, ghosting, and dielectric anisotropy.

The lower limit of the preferable content relative to the total amount of the liquid crystal composition of the present invention is, for example, 1% in one embodiment of the present invention, 10% in another embodiment of the present invention, 20% in another embodiment of the present invention, 30% in another embodiment of the present invention, 40% in another embodiment of the present invention, 50% in another embodiment of the present invention, 55% in another embodiment of the present invention, 60% in another embodiment of the present invention, 65% in another embodiment of the present invention, 70% in another embodiment of the present invention, 75% in another embodiment of the present invention, and 80% in another embodiment of the present invention.

The upper limit of the preferable content relative to the total amount of the liquid crystal composition of the present invention is, for example, 95% in one embodiment of the present invention, 85% in another embodiment of the present invention, 75% in another embodiment of the present invention, 65% in another embodiment of the present invention, 55% in another embodiment of the present invention, 45% in another embodiment of the present invention, 35% in another embodiment of the present invention, and 25% in another embodiment of the present invention.

The lower limit is preferably high and the upper limit is preferably high in order to keep the viscosity of the liquid crystal composition of the present invention low and if a liquid crystal composition having high response speed is needed. Moreover, in order to keep Tni of the liquid crystal composition of the present invention high and if a liquid crystal composition having good temperature stability is needed, the lower limit is preferably high and the upper limit is preferably high. If the dielectric anisotropy is desirably increased to keep drive voltage low, the lower limit is preferably low and the upper limit is preferably low.

$R^{L1}$ and $R^{L2}$ preferably each represent a linear alkyl group having 1 to 5 carbon atoms, a linear alkoxy group having 1 to 4 carbon atoms, or an alkenyl group having 4 or 5 carbon atoms if the cyclic structures to which $R^{L1}$ and $R^{L2}$ are bonded are phenyl groups (aromatic). $R^{L1}$ and $R^{L2}$ preferably each represent a linear alkyl group having 1 to 5 carbon atoms, a linear alkoxy group having 1 to 4 carbon atoms, or a linear alkenyl group having 2 to 5 carbon atoms if the cyclic structures to which $R^{L1}$ and $R^{L2}$ are bonded are saturated ring structures such as cyclohexane, pyran, or dioxane.

If a liquid crystal composition with chemical stability is desired, the compound represented by general formula (L) preferably does not contain chlorine atoms in its molecule.

The compound represented by general formula (L) is preferably a compound selected from a group of compounds represented by general formula (I).

[Chem. 10]

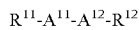  (I)

(In the formula, $R^{11}$ and $R^{12}$ each independently represent an alkyl group having 1 to 5 carbon atoms, an alkoxy group having 1 to 5 carbon atoms, or an alkenyl group having 2 to 5 carbon atoms; $A^{11}$ and $A^{12}$ each independently represent a 1,4-cyclohexylene group, a 1,4-phenylene group, a 2-fluoro-1,4-phenylene group, or a 3-fluoro-1,4-phenylene group.)

The number of compounds that can be used in combination is not particularly limited. An appropriate combination of compounds is used in accordance with desired performance, such as solubility at low temperature, transition temperature, electrical reliability, and birefringence. The number of compounds used is, for example, one in one embodiment of the present invention, two in another embodiment of the present invention, three in another embodiment of the present invention, four in another embodiment of the present invention, five in another embodiment of the present invention, and six or more in another embodiment of the present invention.

In the liquid crystal composition of the present invention, the content of the compound represented by general formula (I) needs to be appropriately adjusted in accordance with the desired performance such as solubility at low temperature, transition temperature, electrical reliability, birefringence, process compatibility, drop marks, ghosting, and dielectric anisotropy.

The lower limit of the preferable content relative to the total amount of the liquid crystal composition of the present invention is, for example, 3% in one embodiment of the present invention, 15% in another embodiment of the present invention, 18% in another embodiment of the present invention, 20% in another embodiment of the present invention, 29% in another embodiment of the present invention, 35% in another embodiment of the present invention, 42% in another embodiment of the present invention, 47% in another embodiment of the present invention, 53% in another embodiment of the present invention, 56% in another embodiment of the present invention, 60% in another embodiment of the present invention, and 65% in another embodiment of the present invention.

The upper limit of the preferable content relative to the total amount of the liquid crystal composition of the present invention is, for example, 75% in one embodiment of the present invention, 65% in another embodiment of the present invention, 55% in another embodiment of the present invention, 50% in another embodiment of the present invention, 45% in another embodiment of the present invention, 40% in another embodiment of the present invention, 35% In another embodiment of the present invention, and 30% in another embodiment of the present invention.

The lower limit is preferably high and the upper limit is preferably in order to keep the viscosity of the liquid crystal composition of the present invention low and if a liquid crystal composition having high response speed is needed. Moreover, in order to keep Tni of the liquid crystal composition of the present invention high and if a liquid crystal composition having good temperature stability is needed, the lower limit is preferably medium and the upper limit is preferably medium. If the dielectric anisotropy is desirably increased to keep drive voltage low, the lower limit is preferably low and the upper limit is preferably low.

The compound represented by general formula (I) is preferably a compound selected from a group of compounds represented by general formula (I-1).

[Chem. 11]

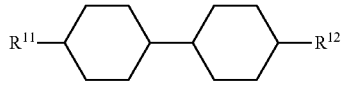  (I-1)

(In the formula, $R^{11}$ and $R^{12}$ each independently represent an alkyl group having 1 to 5 carbon atoms, an alkoxy group having 1 to 5 carbon atoms, or an alkenyl group having 2 to 5 carbon atoms.)

The number of compounds that can be used in combination is not particularly limited. An appropriate combination of compounds is used in accordance with the desired performance such as solubility at low temperature, transition temperature, electrical reliability and birefringence. The number of compounds to be used is, for example, one in one embodiment of the present invention, two in another embodiment of the present invention, three in another embodiment of the present invention, four in another embodiment of the present invention, and five or more in another embodiment of the present invention.

In the liquid crystal composition of the present invention, the content of the compound represented by general formula (I-1) needs to be appropriately adjusted in accordance with the desired performance, such as solubility at low temperature, transition temperature, electrical reliability, birefringence, process compatibility, drop marks, ghosting, and dielectric anisotropy.

The lower limit of the preferable content relative to the total amount of the liquid crystal composition of the present invention is, for example, 3% in one embodiment of the present invention, 15% in another embodiment of the present invention, 18% in another embodiment of the present invention, 25% in another embodiment of the present invention, 29% in another embodiment of the present invention, 31% in another embodiment of the present invention, 35% in another embodiment of the present invention, 43% in another embodiment of the present invention, 47% in another embodiment of the present invention, 50% in another embodiment of the present invention, 53% in another embodiment of the present invention, and 56% in another embodiment of the present invention.

The upper limit of the preferable content relative to the total amount of the liquid crystal composition of the present invention is, for example, 70% in one embodiment of the present invention, 60% in another embodiment of the present invention, 50% in another embodiment of the present invention, 45% in another embodiment of the present invention, 40% in another embodiment of the present invention, 35% in another embodiment of the present invention, 30% in another embodiment of the present invention, and 26% in another embodiment of the present invention.

The lower limit is preferably high and the upper limit is preferably high in order to keep the viscosity of the liquid crystal composition of the present invention low and if a liquid crystal composition having high response speed is needed. Moreover, in order to keep Tni of the liquid crystal composition of the present invention high and if a liquid crystal composition having good temperature stability is needed, the lower limit is preferably medium and the upper limit is preferably medium. If the dielectric anisotropy is desirably increased to keep drive voltage low, the lower limit is preferably low and the upper limit is preferably low.

The compound represented by general formula (I-1) is preferably a compound selected from a group of compounds represented by general formula (I-1-1).

[Chem. 12]

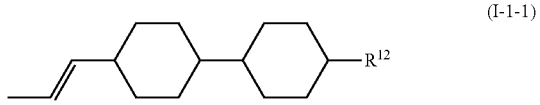

(I-1-1)

(In the formula, $R^{12}$ each independently represents an alkyl group having 1 to 5 carbon atoms, an alkenyl group having 2 to 5 carbon atoms, or an alkoxy group having 1 to 5 carbon atoms.)

In the liquid crystal composition of the present invention, the content of the compound represented by general formula (I-1-1) needs to be appropriately adjusted in accordance with the desired performance such as solubility at low temperature, transition temperature, electrical reliability, birefringence, process compatibility, drop marks, ghosting, an dielectric anisotropy. The lower limit of the preferable content relative to the total amount of the liquid crystal composition of the present invention is, for example, 2% in one embodiment of the present invention, 4% in another embodiment of the present invention, 7% in another embodiment of the present invention, 11% in another embodiment of the present invention, 13% in another embodiment of the present invention, 15% in another embodiment of the present invention, 17% in another embodiment of the present invention, 20% in another embodiment of the present invention, 25% in another embodiment of the present invention, 30% in another embodiment of the present invention, 32% in another embodiment of the present invention, and 35% in another embodiment of the present invention.

The upper limit of the preferable content relative to the total amount of the liquid crystal composition of the present invention is, for example, 60% in one embodiment of the present invention, 50% in another embodiment of the present invention, 40% in another embodiment of the present invention, 35% in another embodiment of the present invention, 30% in another embodiment of the present invention, 25% in another embodiment of the present invention, 20% in another embodiment of the present invention, and 15% in another embodiment of the present invention.

The compound represented by general formula (I-1-1) is preferably a compound selected from a group of compounds represented by formula (1.1) to formula (1.3), more preferably a compound represented by formula (1.2) or (1.3), and particularly preferably a compound represented by formula (1.3).

[Chem. 13]

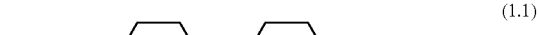

(1.1)

(1.2)

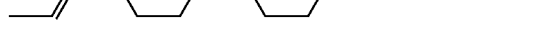

(1.3)

If the compound represented by formula (1.2) or formula (1.3) is used alone, it is effective for improving response speed to adjust the content of the compound represented by formula (1.2) to a relatively high value and the content of the compound represented by formula (1.3) is preferably within a range described below since a liquid crystal composition having high response speed and high electrical and optical reliability can be offered.

The content of the compound represented by formula (1.3) relative to the total amount of the liquid crystal composition of the present invention is preferably 7% by mass or more, more preferably 9% by mass or more, yet more preferably 11% by mass or more, and most preferably 15% by mass or more. The maximum content is preferably 35% by mass or less, more preferably 25% by mass or less, and most preferably 20% by mass or less.

The compound represented by general formula (I-1) is preferably a compound selected from a group of compounds represented by general formula (I-1-2).

[Chem. 14]

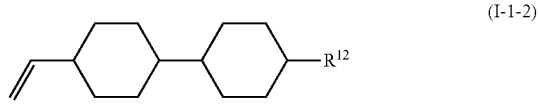

(I-1-2)

(In the formula, $R^{12}$ each independently represents an alkyl group having 1 to 5 carbon atoms, an alkoxy group having 1 to 5 carbon atoms, or an alkenyl group having 2 to 5 carbon atoms.)

The number of compounds that can be used in combination is not particularly limited. An appropriate combination of compounds is used in accordance with the desired performance such as solubility at low temperature, transition temperature, electrical reliability and birefringence. The number of compounds to be used is, for example, one in one embodiment of the present invention, two in another embodiment of the present invention, and three in another embodiment of the present invention.

In the liquid crystal composition of the present invention, the content of the compound represented by general formula (I-1-2) needs to be appropriately adjusted in accordance with the desired performance, such as solubility at low temperature, transition temperature, electrical reliability, birefringence, process compatibility, drop marks, ghosting, and dielectric anisotropy. The lower limit of the preferable content relative to the total amount of the liquid crystal composition of the present invention is, for example, 7% in one embodiment of the present invention, 15% in another embodiment of the present invention, 18% in another embodiment of the present invention, 21% in another embodiment of the present invention, 24% in another embodiment of the present invention, 27% in another embodiment of the present invention, 30% in another embodiment of the present invention, 34% in another embodiment of the present invention, 37% in another embodiment of the present invention, 41% in another embodiment of the present invention, 47% in another embodiment of the present invention, and 50% in another embodiment of the present invention.

The upper limit of the preferable content relative to the total amount of the liquid crystal composition of the present invention is, for example, 60% in one embodiment of the present invention, 55% in another embodiment of the present invention, 45% in another embodiment of the present invention, 40% in another embodiment of the present invention, 35% in another embodiment of the present invention, 30% in another embodiment of the present invention, 25% in another embodiment of the present invention, and 20% in another embodiment of the present invention.

The compound represented by general formula (I-1-2) is preferably a compound selected from a group of compounds represented by formula (2.1) to formula (2.5) and preferably a compound selected from those represented by formula (2.2) to formula (2.5). The compound represented by formula (2.2) is preferable since the response speed of the liquid crystal composition of the present invention is significantly improved. Moreover, if high Tni is more important than response speed, the compound represented by formula (2.3) or formula (2.4) is preferably used. The contents of the compounds represented by formula (2.4) and formula (2.5) are preferably not 30% or more in order to improve solubility at low temperature.

[Chem. 15]

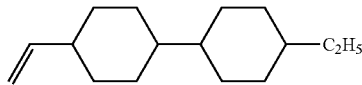
(2.1)

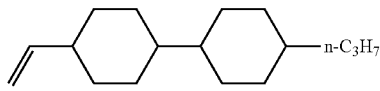
(2.2)

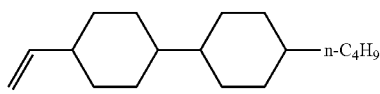
(2.3)

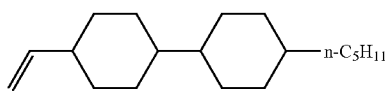
(2.4)

In the liquid crystal composition of the present invention, the content of the compound represented by formula (2.2) relative to the total amount of the liquid crystal composition of the present invention is preferably 5% by mass or more, more preferably 10% by mass, more preferably 14% by mass or more, more preferably 17% by mass or more, more preferably 19% by mass or more, more preferably 22% by mass or more, more preferably 25% by mass or more, more preferably 27% by mass or more, more preferably 30% by mass or more, more preferably 33% by mass or more, and particularly preferably 36% by mass or more. The maximum content is preferably 55% by mass or less, more preferably 50% by mass or less, yet more preferably 45% by mass or less, and most preferably 40% by mass or less.

The liquid crystal composition of the present invention can further contain a compound represented by formula (2.5) having a structure similar to the compound represented by general formula (I-1-2).

[Chem. 16]

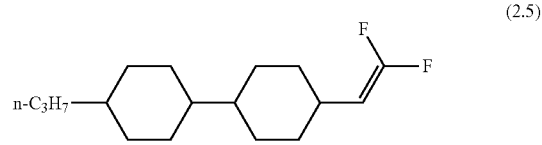
(2.5)

The content of the compound represented by formula (2.5) is preferably adjusted in accordance with the desired performance such as solubility at low temperature, transition temperature, electrical reliability, and birefringence. The content of this compound relative to the total amount of the liquid crystal composition of the present invention is preferably 11% by mass or more, more preferably 15% by mass or more, yet more preferably 23% by mass or more, still more preferably 26% by mass or more, and most preferably 28% by mass or more.

The compound represented by general formula (I) is preferably a compound selected from a group of compounds represented by general formula (I-2).

[Chem. 17]

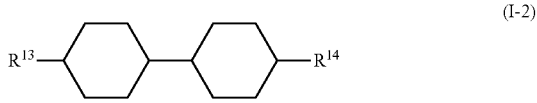
(I-2)

(In the formula, $R^{13}$ and $R^{14}$ each independently represent an alkyl group having 1 to 5 carbon atoms.)

The number of the compounds that can be used in combination is not particularly limited. An appropriate combination of compounds is used in accordance with the desired performance such as solubility at low temperature, transition temperature, electrical reliability, and birefringence. The number of compounds to be used is, for example, one in one embodiment of the present invention, two in another embodiment of the present invention, and three in another embodiment of the present invention.

In the liquid crystal composition of the present invention, the content of the compound represented by general formula (I-2) needs to be appropriately adjusted in accordance with the desired performance, such as solubility at low temperature, transition temperature, electrical reliability, birefringence, process compatibility, drop marks, ghosting, and dielectric anisotropy. The lower limit of the preferable content relative to the total amount of the liquid crystal composition of the present invention is, for example, 3% in one embodiment of the present invention, 4% in another embodiment of the present invention, 15% in another embodiment of the present invention, 25% in another embodiment of the present invention, 30% in another embodiment of the present invention, 35% in another embodiment of the present invention, 38% in another embodiment of the present invention, 40% in another embodiment of the present invention, 42% in another embodiment of the present invention, 45% in another embodiment of the present invention, 47% in another embodiment of the present invention, and 50% in another embodiment of the present invention.

The upper limit of the preferable content relative to the total amount of the liquid crystal composition of the present invention is, for example, 60% in one embodiment of the present invention, 55% in another embodiment of the present invention, 45% in another embodiment of the present invention, 40% in another embodiment of the present invention, 30% in another embodiment of the present invention, 20% in another embodiment of the present invention, 15% in another embodiment of the present invention, and 5% in another embodiment of the present invention. The compound represented by general formula (I-2) is preferably a compound selected from a group of compounds represented by formula (3.1) to formula (3.4) and is preferably a compound represented by formula (3.1), formula (3.3), or formula (3.4). In particular, the compound represented by formula (3.2) is preferable since it particularly improves response speed of the liquid crystal composition of the present invention. If high Tni is more desirable than response speed, the compound represented by formula (3.3) or formula (3.4) is preferably used. The contents of the compounds represented by formula (3.3) and formula (3.4) are preferably not 20% or more in order to improve solubility at low temperature.

The compound represented by general formula (I-2) is preferably a compound selected from a group of compounds represented by formula (3.1) to formula (3.4). The compound represented by formula (3.1), the compound represented by formula (3.3), and/or the compound represented by formula (3.4) are preferable.

[Chem. 18]

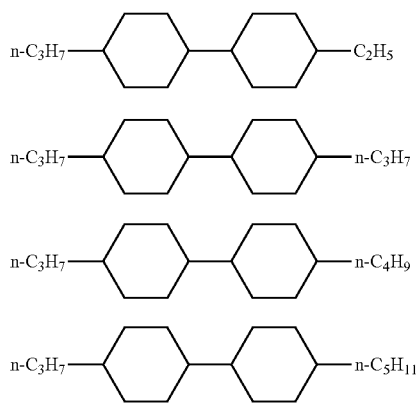

In the liquid crystal composition of the present invention, the content of the compound represented by formula (3.3) relative to the total amount of the liquid crystal composition of the present invention is preferably 2% by mass or more, more preferably 3% by mass, more preferably 4% by mass or more, more preferably 10% by mass or more, more preferably 12% by mass or more, more preferably 14% by mass or more, more preferably 16% by mass or more, more preferably 20% by mass or more, more preferably 23% by mass or more, more preferably 26% by mass or more, and particularly preferably 30% by mass or more. The maximum content is preferably 40% by mass or less, more preferably 37% by mass or less, yet more preferably 34% by mass or less, and most preferably 32% by mass or less.

The compound represented by general formula (I) is preferably a compound selected from a group of compounds represented by general formula (I-3).

[Chem. 19]

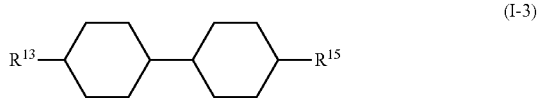

(In the formula, $R^{13}$ represents an alkyl group having 1 to 5 carbon atoms and $R^{15}$ represents an alkoxy group having 1 to 4 carbon atoms.)

The number of the compounds that can be used in combination is not particularly limited. An appropriate combination of compounds is used in accordance with the desired performance such as solubility at low temperature, transition temperature, electrical reliability, and birefringence. The number of compounds to be used is, for example, one in one embodiment of the present invention, two in another embodiment of the present invention, and three in another embodiment of the present invention.

In the liquid crystal composition of the present invention, the content of the compound represented by general formula (I-3) needs to be appropriately adjusted in accordance with the desired performance, such as solubility at low temperature, transition temperature, electrical reliability, birefringence, process compatibility, drop marks, ghosting, and dielectric anisotropy. The lower limit of the preferable content relative to the total amount of the liquid crystal composition of the present invention is, for example, 3% in one embodiment of the present invention, 4% in another embodiment of the present invention, 15% in another embodiment of the present invention, 25% in another embodiment of the present invention, 30% in another embodiment of the present invention, 35% in another embodiment of the present invention, 38% in another embodiment of the present invention, 40% in another embodiment of the present invention, 42% in another embodiment of the present invention, 45% in another embodiment of the present invention, 47% in another embodiment of the present invention, and 50% in another embodiment of the present invention.

The upper limit of the preferable content relative to the total amount of the liquid crystal composition of the present invention is, for example, 60% in one embodiment of the present invention, 55% in another embodiment of the present invention, 45% in another embodiment of the present invention, 40% in another embodiment of the present invention, 30% in another embodiment of the present invention, 20% in another embodiment of the present invention, 15% in another embodiment of the present invention, and 5% in another embodiment of the present invention.

It is effective to set the content to a relatively high value if the solubility at low temperature is important. On the contrary, it is effective to set the content to a relatively low value if the response speed is important. The range of the content is preferably set to an intermediate value when drop marks and ghosting properties are to be improved.

The compound represented by general formula (I-3) is preferably a compound selected from a group of compounds represented by formula (4.1) to formula (4.3) and is preferably a compound represented by formula (4.3).

[Chem. 20]

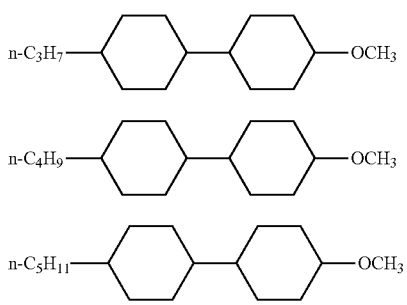

The compound represented by formula (4.3) relative to the total amount of the liquid crystal composition of the present invention is preferably 2% by mass or more, more preferably 4% by mass, more preferably 6% by mass or more, more preferably 8% by mass or more, more preferably 10% by mass or more, more preferably 12% by mass or more, more preferably 14% by mass or more, more preferably 16% by mass or more, more preferably 18% by mass or more, more preferably 20% by mass or more, and particularly preferably 22% by mass or more. The maximum content is preferably 30% by mass or less, more preferably 25% by mass or less, yet more preferably 24% by mass or less, and most preferably 23% by mass or less.

The compound represented by general formula (I) is preferably a compound selected a group of compounds represented by general formula (I-4).

[Chem. 21]

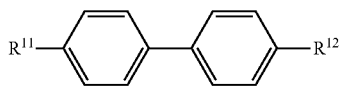

(In the formula, $R^{11}$ and $R^{12}$ each independently represent an alkyl group having 1 to 5 carbon atoms, an alkenyl group having 4 or 5 carbon atoms, or an alkoxy group having 1 to 4 carbon atoms.)

The number of compounds that can be used in combination is not particularly limited. An appropriate combination of compounds is used in accordance with the desired performance such as solubility at low temperature, transition temperature, electrical reliability and birefringence. The number of compounds to be used is, for example, one in one embodiment of the present invention and two in another embodiment of the present invention.

In the liquid crystal composition of the present invention, the content of the compound represented by general formula (I-4) needs to be appropriately adjusted in accordance with the desired performance, such as solubility at low temperature, transition temperature, electrical reliability, birefringence, process compatibility, drop marks, ghosting, and dielectric anisotropy. The lower limit of the preferable content relative to the total amount of the liquid crystal composition of the present invention is, for example, 3% in one embodiment of the present invention, 5% in another embodiment of the present invention, 6% in another embodiment of the present invention, 8% in another embodiment of the present invention, 10% in another embodiment of the present invention, 12% in another embodiment of the present invention, 15% in another embodiment of the present invention, 20% in another embodiment of the present invention, 25% in another embodiment of the present invention, 30% in another embodiment of the present invention, 35% in another embodiment of the present invention, and 40% in another embodiment of the present invention.

The upper limit of the preferable content relative to the total amount of the liquid crystal composition of the present invention is, for example, 50% in one embodiment of the present invention, 40% in another embodiment of the present invention, 35% in another embodiment of the present invention, 30% in another embodiment of the present invention, 20% in another embodiment of the present invention, 15% in another embodiment of the present invention, 10% in another embodiment of the present invention, and 5% in another embodiment of the present invention.

It is effective to set the content to a relatively high value in order to obtain a high birefringence. On the contrary, it is effective to set the content to a relatively low value if high Tni is important. The range of the content is preferably set to an intermediate value when drop marks and ghosting properties are to be improved.

The compound represented by general formula (I-4) is preferably a compound selected from a group of compounds represented by formula (5.1) to formula (5.4) and the compounds represented by formula (5.2) to formula (5.4) are preferable.

[Chem. 22]

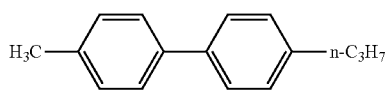

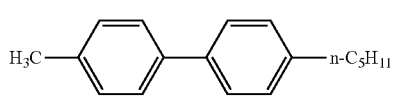

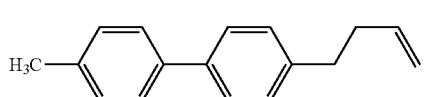

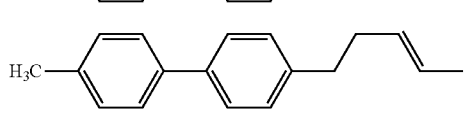

The compound represented by formula (5.4) relative to the total amount of the liquid crystal composition of the present invention is preferably 2% by mass or more, more preferably 4% by mass, more preferably 6% by mass or more, more preferably 8% by mass or more, more preferably 10% by mass or more, more preferably 12% by mass or more, more preferably 14% by mass or more, more preferably 16% by mass or more, more preferably 18% by mass or more, more preferably 20% by mass or more, and particularly preferably 22% by mass or more. The maximum content is preferably 30% by mass or less, more preferably 25% by mass or less, yet more preferably 24% by mass or less, and most preferably 23% by mass or less.

The compound represented by general formula (I) is preferably a compound selected from a group of compounds represented by general formula (I-5).

[Chem. 23]

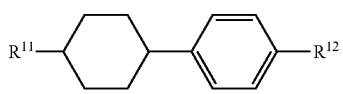
(I-5)

(In the formula, $R^{11}$ and $R^{12}$ each independently represent an alkyl group having 1 to 5 carbon atoms, an alkenyl group having 2 to 5 carbon atoms, or an alkoxy group having 1 to 4 carbon atoms.)

The number of compounds that can be used in combination is not particularly limited. An appropriate combination of compounds is used in accordance with the desired performance such as solubility at low temperature, transition temperature, electrical reliability and birefringence. The number of compounds to be used is, for example, one in one embodiment of the present invention and two in another embodiment of the present invention.

In the liquid crystal composition of the present invention, the content of the compound represented by general formula (I-5) needs to be appropriately adjusted in accordance with the desired performance, such as solubility at low temperature, transition temperature, electrical reliability, birefringence, process compatibility, drop marks, ghosting, and dielectric anisotropy. The lower limit of the preferable content relative to the total amount of the liquid crystal composition of the present invention is, for example, 1% in one embodiment of the present invention, 5% in another embodiment of the present invention, 8% in another embodiment of the present invention, 11% in another embodiment of the present invention, 13% in another embodiment of the present invention, 15% in another embodiment of the present invention, 17% in another embodiment of the present invention, 20% in another embodiment of the present invention, 25% in another embodiment of the present invention, 30% in another embodiment of the present invention, 35% in another embodiment of the present invention, and 40% in another embodiment of the present invention.

The upper limit of the preferable content relative to the total amount of the liquid crystal composition of the present invention is, for example, 50% in one embodiment of the present invention, 40% in another embodiment of the present invention, 35% in another embodiment of the present invention, 30% in another embodiment of the present invention, 20% in another embodiment of the present invention, 15% in another embodiment of the present invention, 10% in another embodiment of the present invention, and 5% in another embodiment of the present invention.

It is effective to set the content to a relatively high value if solubility at low temperature is important. On the contrary, it is effective to set the content to a relatively low value if response speed is important. The range of the content is preferably set to medium when drop marks and ghosting properties are to be improved.

The compound represented by general formula (I-5) is preferably a compound selected from a group of compounds represented by formula (6.1) to formula (6.7) and the compounds represented by formula (6.3), formula (6.4), and formula (6.6) are preferable.

[Chem. 24]

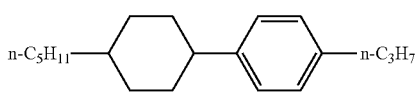
(6.1)

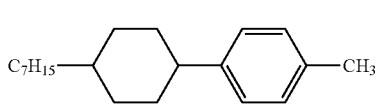
(6.2)

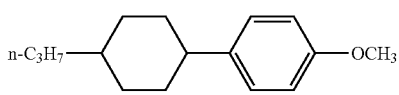
(6.3)

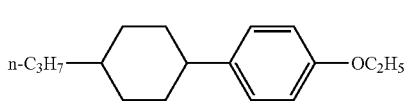
(6.4)

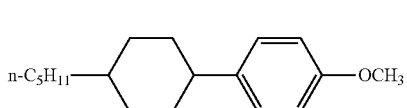
(6.5)

(6.6)

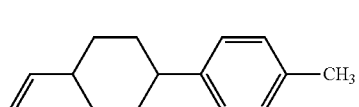
(6.7)

For example, the content of the compound represented by formula (6.6) relative to the total content of the liquid crystal composition of the present invention is preferably 2% by mass or more, more preferably 4% by mass, more preferably 5% by mass or more, more preferably 6% by mass or more, more preferably 9% by mass or more, more preferably 12% by mass or more, more preferably 14% by mass or more, more preferably 16% by mass or more, more preferably 18% by mass or more, more preferably 20% by mass or more, and particularly preferably 22% by mass or more. The maximum content is preferably 30% by mass or less, more preferably 25% by mass or less, yet more preferably 24% by mass or less, and most preferably 23% by mass or less.

The content of the compound represented by formula (6.7) is preferably adjusted in accordance with the desired performance, such as solubility at low temperature, transition temperature, electrical reliability, and birefringence. The content of this compound relative to the total amount of the liquid crystal composition of the present invention is preferably 2% by mass or more, more preferably 3% by mass, yet more preferably 5% by mass, and most preferably 7% by mass or more.

The compound represented by general formula (I) is preferably a compound selected from a group of compounds represented by general formula (I-6).

[Chem. 25]

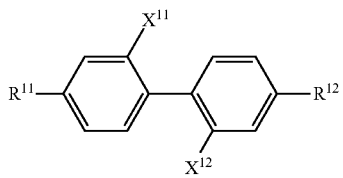

(I-6)

(In the formula, $R^{11}$ and $R^{12}$ each independently represent an alkyl group having 1 to 5 carbon atoms, an alkenyl group having 4 or 5 carbon atoms, or an alkoxy group having 1 to 4 carbon atoms, $X^{11}$ and $X^{12}$ each independently represent a fluorine atom or a hydrogen atom, and one of $X^{11}$ and $X^{12}$ represents a fluorine atom.)

The compound represented by general formula (I-6) relative to the total amount of the liquid crystal composition of the present invention is preferably 2% by mass or more, more preferably 4% by mass, more preferably 5% by mass or more, more preferably 6% by mass or more, more preferably 9% by mass or more, more preferably 12% by mass or more, more preferably 14% by mass or more, more preferably 16% by mass or more, more preferably 18% by mass or more, more preferably 20% by mass or more, and particularly preferably 22% by mass or more. The maximum content is preferably 30% by mass or less, more preferably 25% by mass or less, yet more preferably 24% by mass or less, and most preferably 23% by mass or less.

The compound represented by general formula (I-6) is preferably a compound represented by formula (7.1).

[Chem. 26]

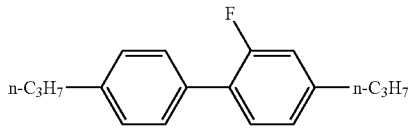

(7.1)

The compound represented by general formula (I) is preferably a compound selected from a group of compounds represented by general formula (I-7).

[Chem. 27]

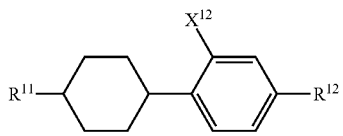

(I-7)

(In the formula, $R^{11}$ and $R^{12}$ each independently represent an alkyl group having 1 to 5 carbon atoms, an alkenyl group having 2 to 5 carbon atoms, or an alkoxy group having 1 to 4 carbon atoms, and $X^{12}$ each independently represents a fluorine atom or chlorine atom.)

The compound represented by general formula (I-7) relative to the total amount of the liquid crystal composition of the present invention is preferably 1% by mass or more, more preferably 2% by mass, more preferably 3% by mass or more, more preferably 4% by mass or more, more preferably 6% by mass or more, more preferably 8% by mass or more, more preferably 10% by mass or more, more preferably 12% by mass or more, more preferably 15% by mass or more, more preferably 18% by mass or more, and particularly preferably 21% by mass or more. The maximum content is preferably 30% by mass or less, more preferably 25% by mass or less, yet more preferably 24% by mass or less, and most preferably 22% by mass or less.

The compound represented by general formula (I-7) is preferably a compound represented by formula (8.1).

[Chem. 28]

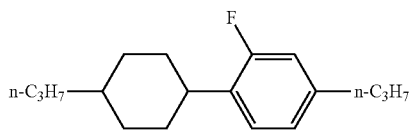

(8.1)

The compound represented by general formula (I) is preferably a compound selected from a group of compounds represented by general formula (I-8).

[Chem. 29]

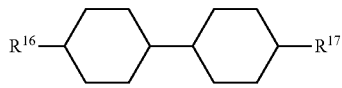

(I-8)

(In the formula, $R^{16}$ and $R^{17}$ each independently represent an alkenyl group having 2 to 5 carbon atoms.)

The number of compounds that can be used in combination is not particularly limited. Preferably, one to three compounds are used in accordance with the desired performance such as solubility at low temperature, transition temperature, electrical reliability and birefringence.

In accordance with the desired performance, such as solubility at low temperature, transition temperature, electrical reliability, birefringence, process compatibility, drop marks, ghosting, and dielectric anisotropy, the content of the compound represented by general formula (1-8) relative to the total amount of the liquid crystal composition of the present invention is preferably 5% by mass or more, more preferably 10% by mass, more preferably 15% by mass or more, more preferably 20% by mass or more, more preferably 25% by mass or more, more preferably 30% by mass or more, more preferably 35% by mass or more, more preferably 40% by mass or more, more preferably 45% by mass or more, more preferably 50% by mass or more, and particularly preferably 55% by mass or more. The maximum content is preferably 65% by mass or less, more preferably 60% by mass or less, yet more preferably 58% by mass or less, and most preferably 56% by mass or less.

The compound represented by general formula (1-8) is preferably a compound selected from a group of compounds represented by formula (9.1) to formula (9.10), and the compounds represented by formula (9.2), formula (9.4), and formula (9.7) are preferable.

[Chem. 30]

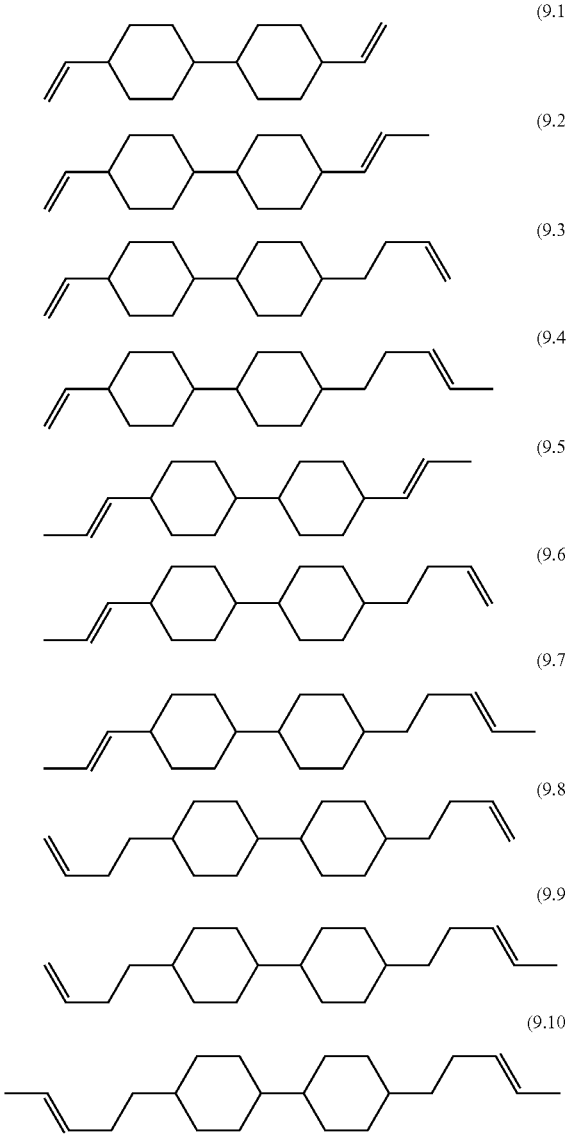

(9.1)
(9.2)
(9.3)
(9.4)
(9.5)
(9.6)
(9.7)
(9.8)
(9.9)
(9.10)

The compound represented by general formula (L) is, for example, preferably a compound selected from compounds represented by general formula (II).

[Chem. 31]

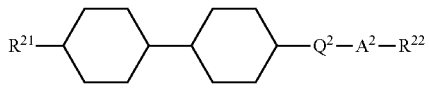

(II)

($R^{21}$ and $R^{22}$ each independently represent an alkenyl group having 2 to 5 carbon atoms, an alkyl group having 1 to 5 carbon atoms, or an alkoxy group having 1 to 4 carbon atoms, $A^2$ represents a 1,4-cyclohexylene group or a 1,4-phenylene group, and $Q^2$ represents a single bond, —COO—, —CH$_2$—CH$_2$—, or —CF$_2$O—.)

The number of compounds that can be used in combination is not particularly limited. An appropriate combination of compounds is used in accordance with the desired performance such as solubility at low temperature, transition temperature, electrical reliability and birefringence. The number of compounds to be used is, for example, one in one embodiment of the present invention, two in another embodiment of the present invention, three in another embodiment of the present invention, and four or more in another embodiment of the present invention.

In the liquid crystal composition of the present invention, the content of the compound represented by general formula (II) needs to be appropriately adjusted in accordance with the desired performance, such as solubility at low temperature, transition temperature, electrical reliability, birefringence, process compatibility, drop marks, ghosting, and dielectric anisotropy. The lower limit of the preferable content relative to the total amount of the liquid crystal composition of the present invention is, for example, 3% in one embodiment of the present invention, 5% in another embodiment of the present invention, 7% in another embodiment of the present invention, 10% in another embodiment of the present invention, 14% in another embodiment of the present invention, 16% in another embodiment of the present invention, 20% in another embodiment of the present invention, 23% in another embodiment of the present invention, 26% in another embodiment of the present invention, 30% in another embodiment of the present invention, 35% in another embodiment of the present invention, and 40% in another embodiment of the present invention.

The upper limit of the preferable content relative to the total amount of the liquid crystal composition of the present invention is, for example, 50% in one embodiment of the present invention, 40% in another embodiment of the present invention, 35% in another embodiment of the present invention, 30% in another embodiment of the present invention, 20% in another embodiment of the present invention, 15% in another embodiment of the present invention, 10% in another embodiment of the present invention, and 5% in another embodiment of the present invention.

The compound represented by general formula (II) is preferably a compound selected from a group of compounds represented by general formula (II-1), for example.

[Chem. 32]

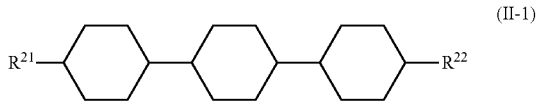

(II-1)

($R^{21}$ and $R^{22}$ each independently represent an alkenyl group having 2 to 5 carbon atoms, an alkyl group having 1 to 5 carbon atoms, or an alkoxy group having 1 to 4 carbon atoms.)

The content of the compound represented by general formula (II-1) is preferably adjusted in accordance with the desired performance such as solubility at low temperature, transition temperature, electrical reliability and birefringence. The content is preferably 4% by mass or more, more preferably 8% by mass or more, and most preferably 12% by mass or more. The maximum content is preferably 24% by mass or less, more preferably 18% by mass or less, and most preferably 14% by mass or less.

The compound represented by general formula (II-1) is preferably a compound represented by formula (10.1), for example.

[Chem. 33]

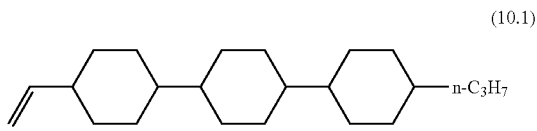
(10.1)

The compound represented by general formula (II) is preferably a compound selected from a group of compounds represented by general formula (II-2), for example.

[Chem. 34]

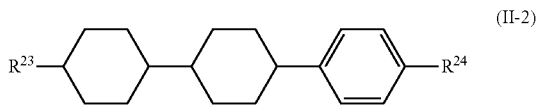
(II-2)

($R^{23}$ represents an alkenyl group having 2 to 5 carbon atoms and $R^{24}$ represents an alkyl group having 1 to 5 carbon atoms or an alkoxy group having 1 to 4 carbon atoms.)

The number of compounds that can be used in combination is not particularly limited. An appropriate combination of compounds is used in accordance with the desired performance such as solubility at low temperature, transition temperature, electrical reliability and birefringence. The number of compounds to be used is, for example, one in one embodiment of the present invention and two or more in another embodiment of the present invention.

In the liquid crystal composition of the present invention, the content of the compound represented by general formula (II-2) needs to be appropriately adjusted in accordance with the desired performance, such as solubility at low temperature, transition temperature, electrical reliability, birefringence, process compatibility, drop marks, ghosting, and dielectric anisotropy. The lower limit of the preferable content relative to the total amount of the liquid crystal composition of the present invention is, for example, 3% in one embodiment of the present invention, 5% in another embodiment of the present invention, 7% in another embodiment of the present invention, 10% in another embodiment of the present invention, 14% in another embodiment of the present invention, 16% in another embodiment of the present invention, 20% in another embodiment of the present invention, 23% in another embodiment of the present invention, 26% in another embodiment of the present invention, 30% in another embodiment of the present invention, 35% in another embodiment of the present invention, and 40% in another embodiment of the present invention.

The upper limit of the preferable content relative to the total amount of the liquid crystal composition of the present invention is, for example, 50% in one embodiment of the present invention, 40% in another embodiment of the present invention, 35% in another embodiment of the present invention, 30% in another embodiment of the present invention, 20% in another embodiment of the present invention, 15% in another embodiment of the present invention, 10% in another embodiment of the present invention, and 5% in another embodiment of the present invention.

The compound represented by general formula (II-2) is preferably compounds represented by formula (11.1) to formula (11.3), for example.

[Chem. 35]

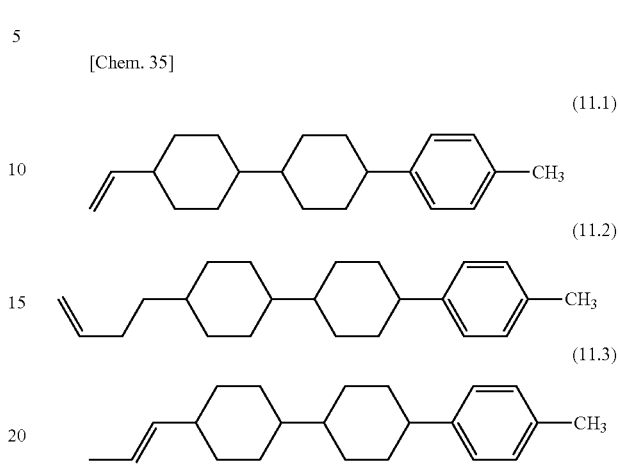

In accordance with the desired performance such as solubility at low temperature, transition temperature, electrical reliability, and birefringence, the compound represented by formula (11.1) may be contained, the compound represented by formula (11.2) may be contained, the compound represented by formula (11.1) and the compound represented by formula (11.2) may both be contained, or the compounds represented by formula (11.1) to formula (11.3) may all be contained. The content of the compound represented by formula (11.1) or formula (11.2) relative to the total amount of the liquid crystal composition of the present invention is preferably 3% by mass, more preferably 5% by mass or more, more preferably 7% by mass or more, more preferably 9% by mass or more, more preferably 11% by mass or more, more preferably 12% by mass or more, more preferably 13% by mass or more, more preferably 18% by mass or more, and particularly preferably 21% by mass or more. The maximum content is preferably 40% by mass or less, more preferably 30% by mass or less, and most preferably 25% by mass or less. The content of the compound represented by formula (11.2) relative to the total amount of the liquid crystal composition of the present invention is preferably 3% by mass, more preferably 5% by mass or more, more preferably 8% by mass or more, more preferably 10% by mass or more, more preferably 12% by mass or more, more preferably 15% by mass or more, more preferably 17% by mass or more, and particularly preferably 19% by mass or more. The maximum content is preferably 40% by mass or less, more preferably 30% by mass or less, and most preferably 25% by mass or less. When the compound represented by formula (11.1) and the compound represented by formula (11.2) are both contained, the total content of the two compounds relative to the total amount of the liquid crystal composition of the present invention is preferably 15% by mass or more, more preferably 19% by mass or more, yet more preferably 24% by mass or more, and particularly preferably 30% by mass or more. The maximum content is preferably 45% by mass or less, more preferably 40% by mass or less, and yet more preferably 35% by mass or less.

The compound represented by general formula (II) is preferably a compound selected from a group of compounds represented by general formula (II-3), for example.

[Chem. 36]

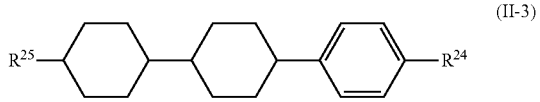

(II-3)

($R^{25}$ represents an alkyl group having 1 to 5 carbon atoms and $R^{24}$ represents an alkyl group having 1 to 5 carbon atoms or an alkoxy group having 1 to 4 carbon atoms.)

The number of compounds that can be used in combination is not particularly limited. In accordance with the desired performance such as solubility at low temperature, transition temperature, electrical reliability and birefringence, one to three compounds selected from these compounds are preferably contained.

The content of the compound represented by general formula (II-3) needs to be appropriately adjusted in accordance with the desired performance such as solubility at low temperature, transition temperature, electrical reliability, birefringence, process compatibility, drop marks, ghosting, and dielectric anisotropy. The lower limit of the preferable content relative to the total amount of the liquid crystal composition of the present invention is, for example, preferably 2%, more preferably 5%, more preferably 8%, more preferably 11%, more preferably 14%, more preferably 17%, more preferably 20%, more preferably 23%, more preferably 26%, and particularly preferably 29%. The upper limit of the preferable content relative to the total amount of the liquid crystal composition of the present invention is, for example, preferably 45%, more preferably 40%, more preferably 35%, more preferably 30%, more preferably 25%, more preferably 20%, more preferably 15%, and particularly preferably 10%.

The compounds represented by general formula (II-3) are, for example, preferably compounds represented by formula (12.1) to formula (12.3).

[Chem. 37]

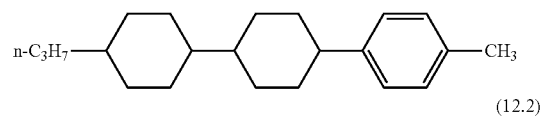

(12.1)

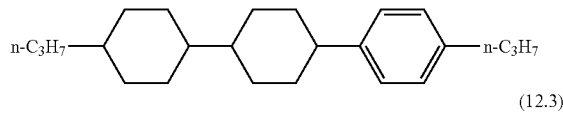

(12.2)

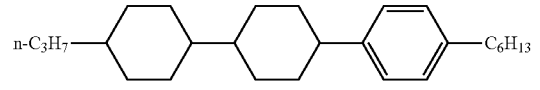

(12.3)

In accordance with the desired performance such as solubility at low temperature, transition temperature, electrical reliability, and birefringence, the compound represented by formula (12.1) may be contained, the compound represented by formula (12.2) may be contained, or the compound represented by formula (12.1) and the compound represented by formula (12.2) may both be contained. The content of the compound represented by formula (12.1) or formula (11.2) relative to the total amount of the liquid crystal composition of the present invention is preferably 3% by mass, more preferably 5% by mass or more, more preferably 7% by mass or more, more preferably 9% by mass or more, more preferably 11% by mass or more, more preferably 12% by mass or more, more preferably 13% by mass or more, more preferably 18% by mass or more, and particularly preferably 21% by mass or more. The maximum content is preferably 40% by mass or less, more preferably 30% by mass or less, and most preferably 25% by mass or less. The content of the compound represented by formula (12.2) relative to the total amount of the liquid crystal composition of the present invention is preferably 3% by mass, more preferably 5% by mass or more, more preferably 8% by mass or more, more preferably 10% by mass or more, more preferably 12% by mass or more, more preferably 15% by mass or more, more preferably 17% by mass or more, and particularly preferably 19% by mass or more. The maximum content is preferably 40% by mass or less, more preferably 30% by mass or less, and most preferably 25% by mass or less. When the compound represented by formula (12.1) and the compound represented by formula (12.2) are both contained, the total content of the two compounds relative to the total amount of the liquid crystal composition of the present invention is preferably 15% by mass or more, more preferably 19% by mass or more, yet more preferably 24% by mass or more, and most preferably 30% by mass or more. The maximum content is preferably 45% by mass or less, more preferably 40% by mass or less, and most preferably 35% by mass or less.

The content of the compound represented by formula (12.3) relative to the total amount of the liquid crystal composition of the present invention is preferably 0.05% by mass or more, more preferably 0.1% by mass or more, and most preferably 0.2% by mass or more. The maximum content is preferably 2% by mass or less, more preferably 1% by mass or less, and most preferably 0.5% by mass or less. The compound represented by formula (12.3) may be an optically active compound.

The compound represented by general formula (II-3) is preferably a compound selected from a group of compounds represented by general formula (II-3-1), for example.

[Chem. 38]

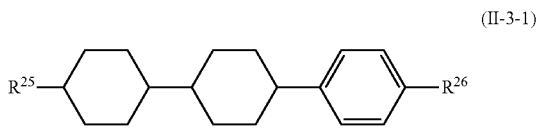

(II-3-1)

($R^{25}$ represents an alkyl group having 1 to 5 carbon atoms and $R^{26}$ represents an alkoxy group having 1 to 4 carbon atoms.)

The number of compounds that can be used in combination is not particularly limited. In accordance with the desired performance such as solubility at low temperature, transition temperature, electrical reliability and birefringence, one to three compounds selected from these compounds are preferably contained.

The content of the compound represented by general formula (II-3-1) is preferably adjusted in accordance with the desired performance, such as solubility at low temperature, transition temperature, electrical reliability and birefringence. The content is preferably 1% by mass or more, more preferably 4% by mass or more, and most preferably 8% by mass or more. The maximum content is preferably 24% by mass or less, more preferably 18% by mass or less, and most preferably 14% by mass or less.

The compounds represented by general formula (II-3-1) are, for example, preferably compounds represented by formula (13.1) to formula (13.4). In particular, the compound represented by formula (13.3) is preferable.

[Chem. 39]

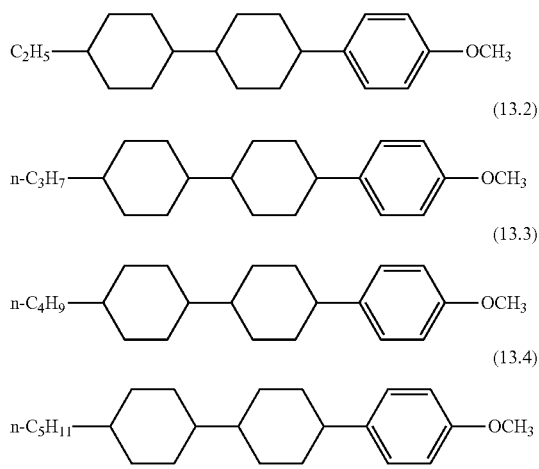

(13.1)
(13.2)
(13.3)
(13.4)

The compound represented by general formula (II) is preferably a compound selected from a group of compounds represented by general formula (II-4), for example.

[Chem. 40]

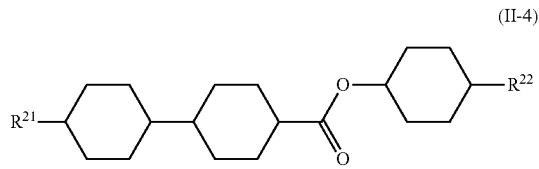

(II-4)

($R^{21}$ and $R^{22}$ each independently represent an alkenyl group having 2 to 5 carbon atoms, an alkyl group having 1 to 5 carbon atoms, or an alkoxy group having 1 to 4 carbon atoms.)

Only one of these compounds or two or more of these compounds may be contained but these compounds are preferably appropriately used in combination in accordance with the desired performance. The number of compounds that can be used in combination is not particularly limited but one or two of these compounds are preferably contained or one to three of these compounds are more preferably contained in accordance with the desired performance such as solubility at low temperature, transition temperature, electrical reliability, and birefringence.

The content of the compound represented by general formula (II-4) relative to the total amount of the liquid crystal composition of the present invention is preferably 1% by mass or more, more preferably 2% by mass or more, more preferably 3% by mass or more, more preferably 4% by mass or more, and particularly preferably 5% by mass or more. The maximum content is preferably 15% by mass or less, more preferably 12% by mass or less, and most preferably 7% by mass or less.

The compounds represented by general formula (II-4) are, for example, preferably compounds represented by formula (14.1) to formula (14.5) and the compound represented by formula (14.2) and/or the compound represented by formula (14.5) is particularly preferable.

[Chem. 41]

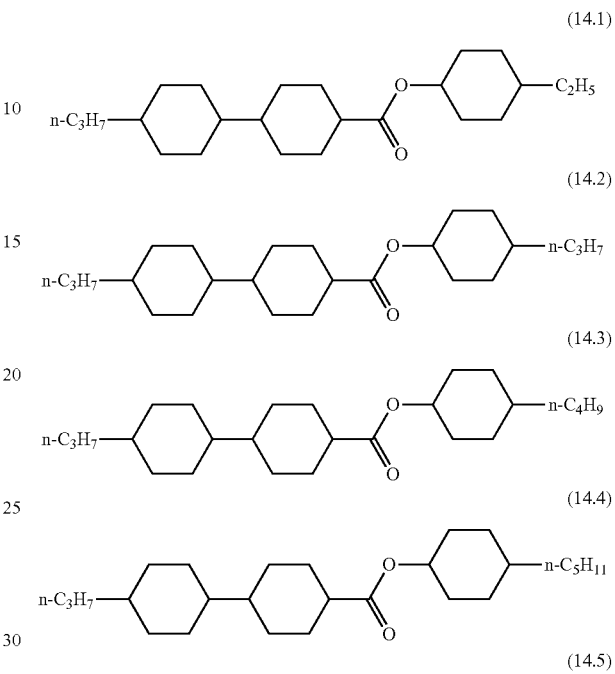

(14.1)
(14.2)
(14.3)
(14.4)
(14.5)

The compound represented by general formula (L) is preferably a compound selected from a group of compounds represented by general formula (III).

[Chem. 42]

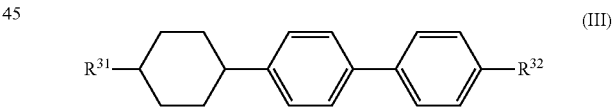

(III)

($R^{31}$ and $R^{32}$ each independently represent an alkenyl group having 2 to 5 carbon atoms, an alkyl group having 1 to 5 carbon atoms, or an alkoxy group having 1 to 4 carbon atoms.)

In view of the desired solubility and birefringence, the content of the compound represented by general formula (III) relative to the total amount of the liquid crystal composition of the present invention is preferably 2% by mass or more, more preferably 3% by mass or more, and most preferably 4% by mass or more. The maximum content is preferably 25% by mass or less, more preferably 20% by mass or less, and most preferably 15% by mass or less.

The compound represented by general formula (III) is, for example, preferably a compound represented by formula (15.1) or formula (15.2), and particularly preferably a compound represented by formula (15.1).

[Chem. 43]

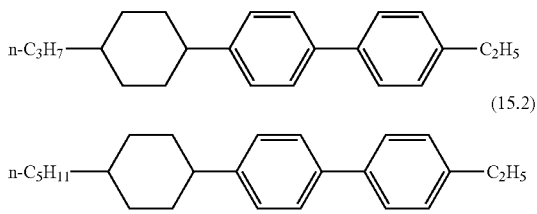

(15.1)

(15.2)

The compound represented by general formula (III) is preferably a compound selected from a group of compounds represented by general formula (III-1).

[Chem. 44]

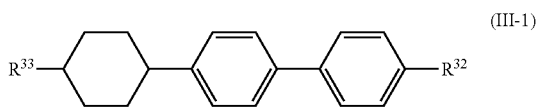

(III-1)

($R^{33}$ represents an alkenyl group having 2 to 5 carbon atoms and $R^{32}$ each independently represents an alkyl group having 1 to 5 carbon atoms or an alkoxy group having 1 to 4 carbon atoms.)

The content is preferably adjusted in accordance with the desired performance such as solubility at low temperature, transition temperature, electrical reliability, and birefringence. The content is preferably 4% by mass or more, more preferably 6% by mass or more, and most preferably 10% by mass or more. The maximum content is preferably 23% by mass or less, more preferably 18% by mass or less, and most preferably 13% by mass or less.

The compound represented by general formula (III-1) is, for example, preferably a compound represented by formula (16.1) or formula (16.2).

[Chem. 45]

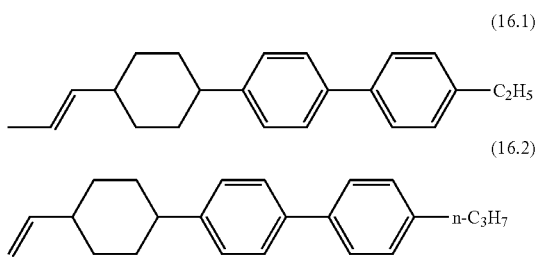

(16.1)

(16.2)

The compound represented by general formula (III) is preferably a compound selected from a group of compounds represented by general formula (III-2).

[Chem. 46]

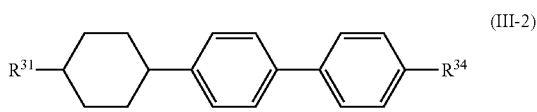

(III-2)

($R^{31}$ represents an alkyl group having 1 to 5 carbon atoms and $R^{34}$ represents an alkoxy group having 1 to 4 carbon atoms.)

The content of the compound represented by general formula (III-2) is preferably adjusted in accordance with the desired performance such as solubility at low temperature, transition temperature, electrical reliability, and birefringence. The content is preferably 2% by mass or more, more preferably 3% by mass or more, and most preferably 4% by mass or more. The maximum content is preferably 23% by mass or less, more preferably 18% by mass or less, and most preferably 13% by mass or less.

The compound represented by general formula (III-2) is preferably a compound selected from a group of compounds represented by formula (17.1) to formula (17.3), and is particularly preferably a compound represented by formula (17.3), for example.

[Chem. 47]

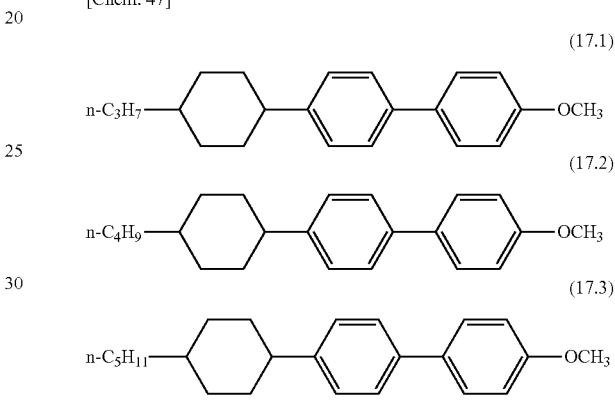

(17.1)

(17.2)

(17.3)

The compound represented by general formula (L) is preferably a compound selected from a group represented by general formula (V).

[Chem. 48]

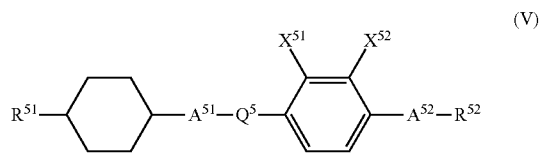

(V)

(In the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms, $A^{51}$ and $A^{52}$ each independently represent a 1,4-cyclohexylene group or a 1,4-phenylene group, $Q^5$ represents a single bond or —COO—, and $X^{51}$ and $X^{52}$ each independently represent a fluorine atom or a hydrogen atom.)

The number of compounds that can be used in combination is not particularly limited. The compounds are used in combination in accordance with the desired performance such as solubility at low temperature, transition temperature, electrical reliability, and birefringence. The number of compounds used is, for example, one in one embodiment of the present invention, two in another embodiment of the present invention, three in another embodiment of the present invention, and four in another embodiment of the present invention.

The lower limit of the preferable content relative to the total amount of the liquid crystal composition of the present invention is, for example, 2% in one embodiment of the present invention, 4% in another embodiment of the present invention, 7% in another embodiment of the present invention, 10% in another embodiment of the present invention, 12% in another embodiment of the present invention, 15% in another embodiment of the present invention, 17% in another embodiment of the present invention, 18% in another embodiment of the present invention, 20% in another embodiment of the present invention, and 22% in another embodiment of the present invention.

The upper limit of the preferable content relative to the total amount of the liquid crystal composition of the present invention is, for example, 40% in one embodiment, 30% in another embodiment of the present invention, 25% in another embodiment of the present invention, 20% in another embodiment of the present invention, 15% in another embodiment of the present invention, 10% in another embodiment of the present invention, 5% in another embodiment of the present invention, and 4% in another embodiment of the present invention.

The compound represented by general formula (V) is preferably a compound represented by general formula (V-1).

[Chem. 49]

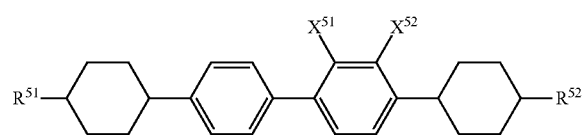

(V-1)

(In the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms and $X^{51}$ and $X^{52}$ each independently represent a fluorine atom or a hydrogen atom.)

The compound represented by general formula (V-1) is preferably a compound represented by general formula (V-1-1).

[Chem. 50]

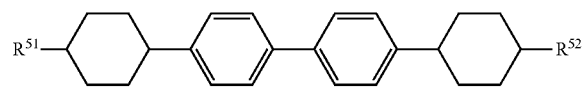

(V-1-1)

(In the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms.)

The content of the compound represented by general formula (V-1-1) relative to the total amount of the liquid crystal composition of the present invention is preferably 1% by mass or more, more preferably 2% by mass or more, yet more preferably 3% by mass or more, and most preferably 4% by mass or more. The maximum content is preferably 15% by mass or less, more preferably 10% by mass or less, and most preferably 8% by mass or less.

The compounds represented by general formula (V-1-1) are preferably compounds represented by formula (20.1) to formula (20.4) and the compound represented by formula (20.2) is particularly preferable.

[Chem. 51]

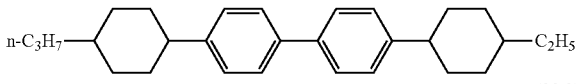

(20.1)

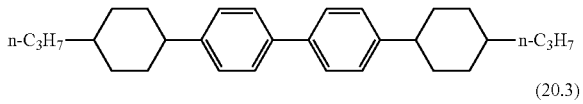

(20.2)

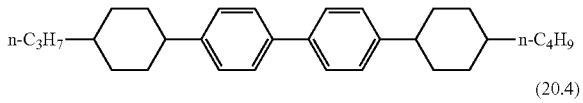

(20.3)

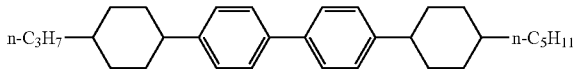

(20.4)

The compound represented by general formula (V-1) is preferably a compound represented by general formula (V-1-2).

[Chem. 52]

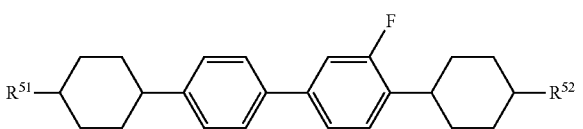

(V-1-2)

(In the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms.)

The content of the compound represented by general formula (V-1-2) relative to the total amount of the liquid crystal composition of the present invention is preferably 1% by mass or more, more preferably 2% by mass or more, yet more preferably 3% by mass or more, and most preferably 4% by mass or more. The maximum content is preferably 15% by mass or less, more preferably 10% by mass or less, and most preferably 8% by mass or less.

The compounds represented by general formula (V-1-2) are preferably compounds represented by formula (21.1) to formula (21.3), and the compound represented by formula (21.1) is particularly preferable.

[Chem. 53]

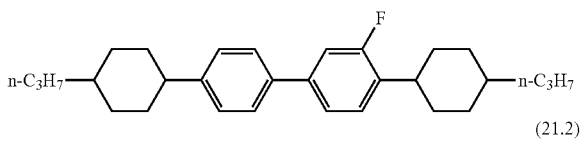

(21.1)

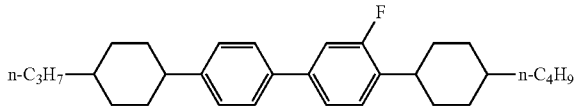

(21.2)

-continued (21.3)

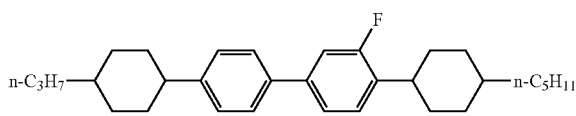

The compound represented by general formula (V-1) is preferably a compound represented by general formula (V-1-3).

[Chem. 54]

(V-1-3)

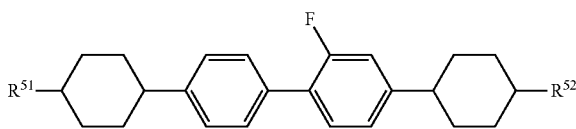

(In the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms.)

The content of the compound represented by general formula (V-1-3) relative to the total amount of the liquid crystal composition of the present invention is preferably 1% by mass or more, more preferably 2% by mass or more, yet more preferably 3% by mass or more, and most preferably 4% by mass or more. The maximum content is preferably 15% by mass or less, more preferably 10% by mass or less, and most preferably 8% by mass or less.

The compounds represented by general formula (V-1-3) are compounds represented by formula (22.1) to formula (22.3), and the compound represented by formula (22.1) is preferable.

[Chem. 55]

(22.1)

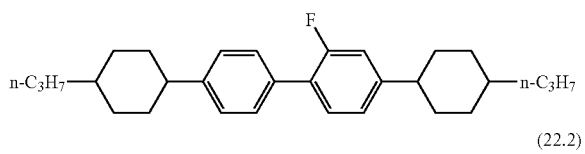

(22.2)

(22.3)

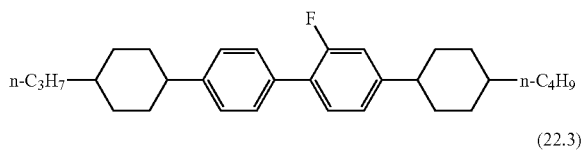

The compound represented by general formula (V) is preferably a compound represented by general formula (V-2).

[Chem. 56]

(V-2)

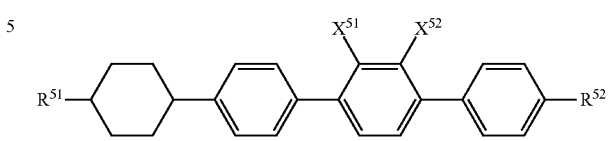

(In the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms and $X^{51}$ and $X^{52}$ each independently represent a fluorine atom or a hydrogen atom.)

The number of compounds that can be used in combination is not particularly limited. The combination is determined accordance with the desired performance such as solubility at low temperature, transition temperature, electrical reliability and birefringence. The number of compounds to be used is, for example, one in an embodiment of the present invention and two or more in another embodiment of the present invention.

The lower limit of the preferable content relative to the total amount of the liquid crystal composition of the present invention is, for example, 2% in one embodiment, 4% in another embodiment of the present invention, 7% in another embodiment of the present invention, 10% in another embodiment of the present invention, 12% in another embodiment of the present invention, 15% in another embodiment of the present invention, 17% in another embodiment of the present invention, 18% in another embodiment of the present invention, 20% in another embodiment of the present invention, and 22% in another embodiment of the present invention.

The upper limit of the preferable content relative to the total amount of the liquid crystal composition of the present invention is, for example, 40% in one embodiment of the present invention, 30% in another embodiment of the present invention, 25% in another embodiment of the present invention, 20% in another embodiment of the present invention, 15% in another embodiment of the present invention, 10% in another embodiment of the present invention, 5% in another embodiment of the present invention, and 4% in another embodiment of the present invention.

If an embodiment of the liquid crystal composition of the present invention is to have high Tni, the content of the compound represented by formula (V-2) is preferably relatively high. If an embodiment with low viscosity is desirable, the content is preferably relatively low.

The compound represented by general formula (V-2) is preferably a compound represented by general formula (V-2-1).

[Chem. 57]

(V-2-1)

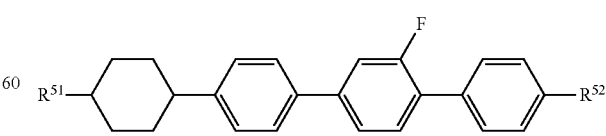

(In the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms.)

The compounds represented by general formula (V-2-1) are preferably compounds represented by formula (23.1) to formula (23.4), and the compound represented by formula (23.1) and/or the compound represented by formula (23.2) is preferable.

[Chem. 58]

(23.1)
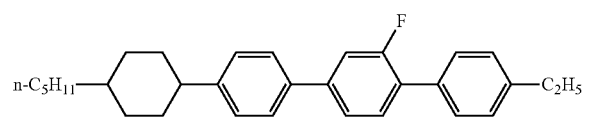

(23.2)
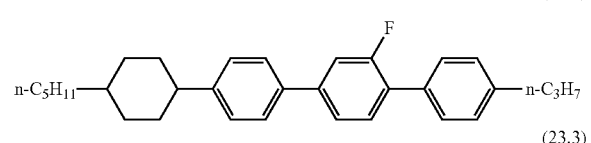

(23.3)
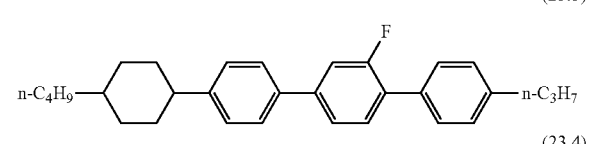

(23.4)
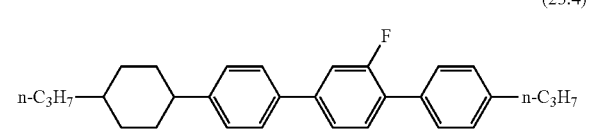

The compound represented by general formula (V-2) is preferably a compound represented by general formula (V-2-2).

[Chem. 59]

(V-2-2)
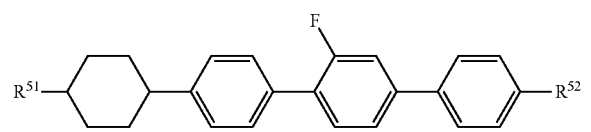

(In the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms.)

The compounds represented by general formula (V-2-2) are preferably compounds represented by formula (24.1) to formula (24.4), and the compound represented by formula (24.1) and/or the compound represented by formula (24.2) is preferable.

[Chem. 60]

(24.1)
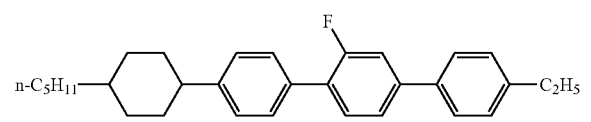

(24.2)
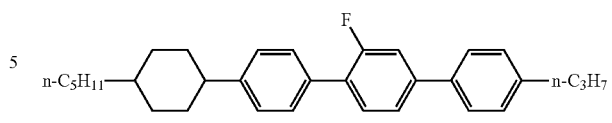

(24.3)
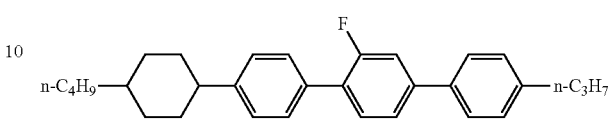

(24.4)
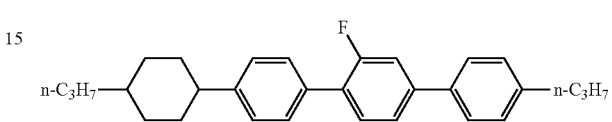

The compound represented by general formula (V) is preferably a compound represented by general formula (V-3).

[Chem. 61]

(V-3)
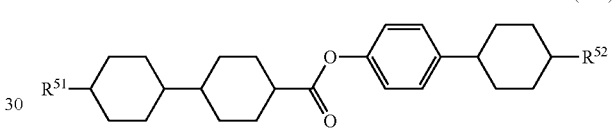

(In the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms.)

The number of compounds that can be used in combination is not particularly limited. An appropriate combination of compounds is used in accordance with the desired performance such as solubility at low temperature, transition temperature, electrical reliability and birefringence. The number of compounds to be used is, for example, one in one embodiment of the present invention, two in another embodiment of the present invention, and three or more in another embodiment of the present invention.

The content of the compound represented by general formula (V-3) relative to the total amount of the liquid crystal composition of the present invention is preferably 2% by mass or more, more preferably 4% by mass or more, yet more preferably 7% by mass or more, and most preferably 8% by mass or more. The maximum content is preferably 16% by mass or less, more preferably 13% by mass or less, and most preferably 11% by mass or less.

The compounds represented by general formula (V-3) are preferably compounds represented by formula (25.1) to formula (24.3).

[Chem. 62]

(25.1)
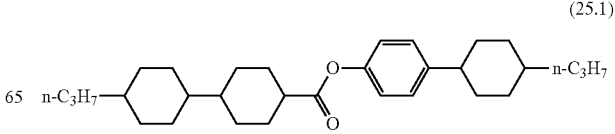

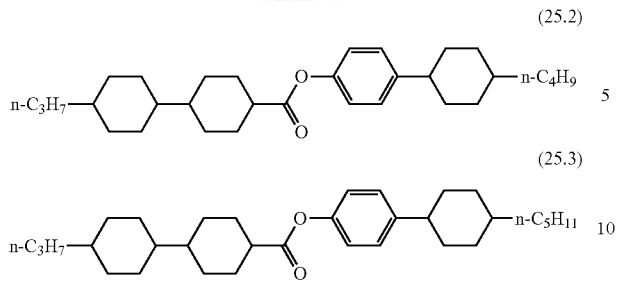

The liquid crystal composition of the present invention may further contain one or more compounds represented by general formula (VI).

[Chem. 63]

(VI)

(In the formula, $R^{61}$ and $R^{62}$ each independently represent a linear alkyl group having 1 to 10 carbon atoms, a linear alkoxy group having 1 to 10 carbon atoms, or a linear alkenyl group having 2 to 10 carbon atoms.)

The number of compounds that can be used in combination is not particularly limited. Among these compounds, one to three compounds are preferably contained, one to four compounds are more preferably contained, and one to five compounds are most preferably contained in accordance with the desired performance such as solubility at low temperature, transition temperature, electrical reliability and birefringence. The maximum content is preferably 35% by mass or less, more preferably 25% by mass or less, and most preferably 15% by mass or less.

In particular, the following compounds are preferable examples of the compounds represented by general formula (VI).

[Chem. 64]

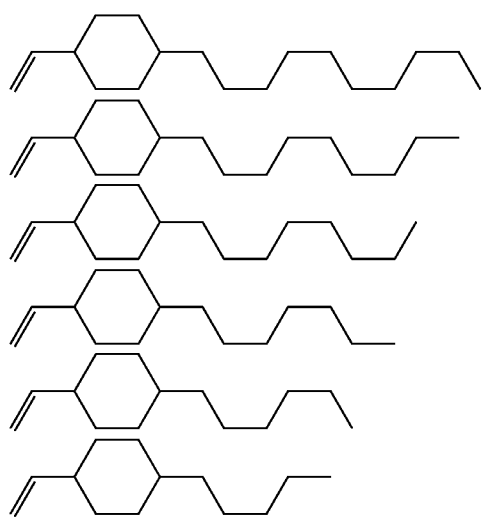

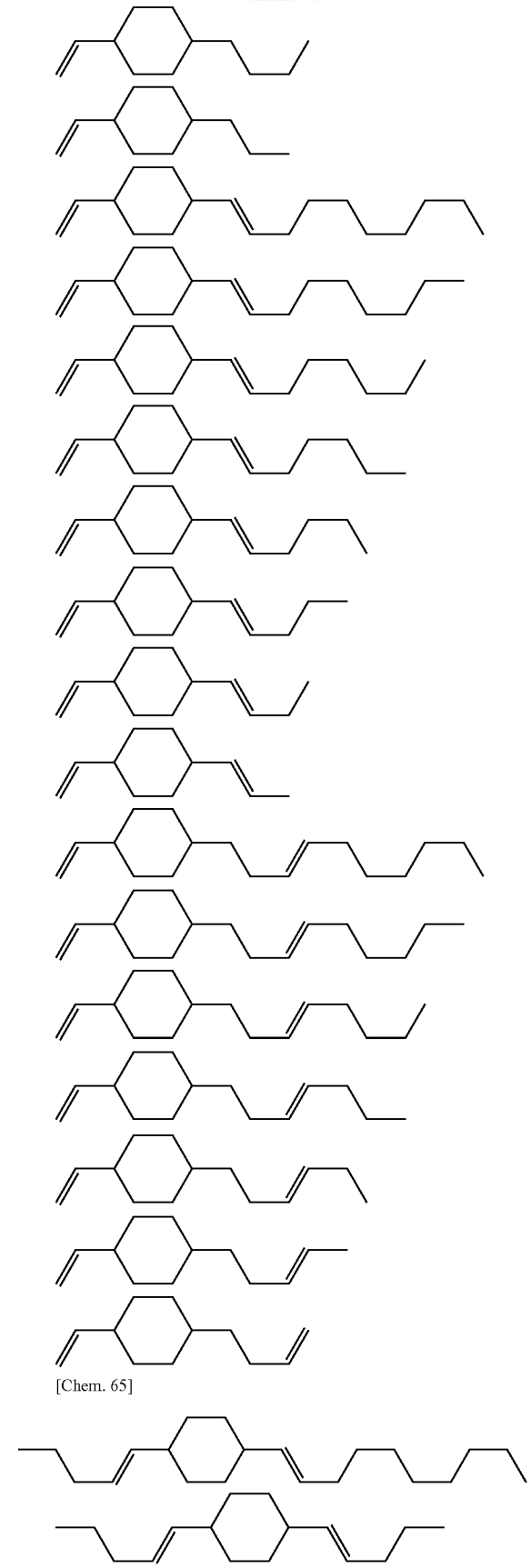

[Chem. 65]

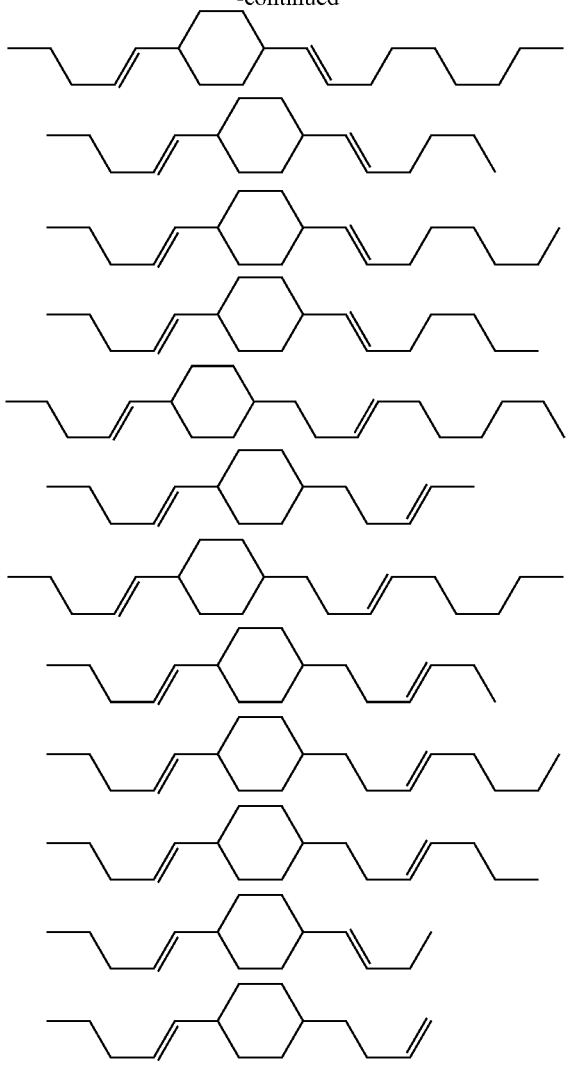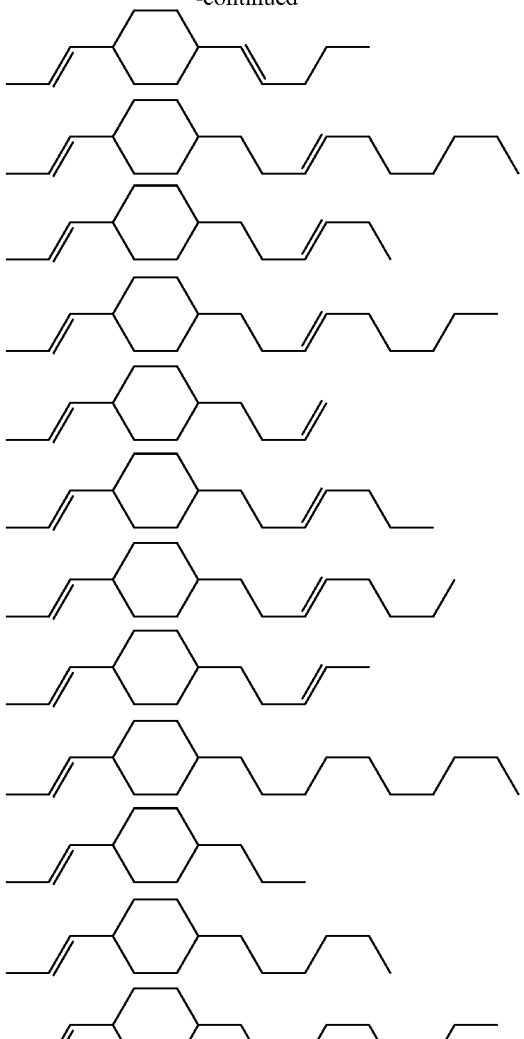
[Chem. 66]
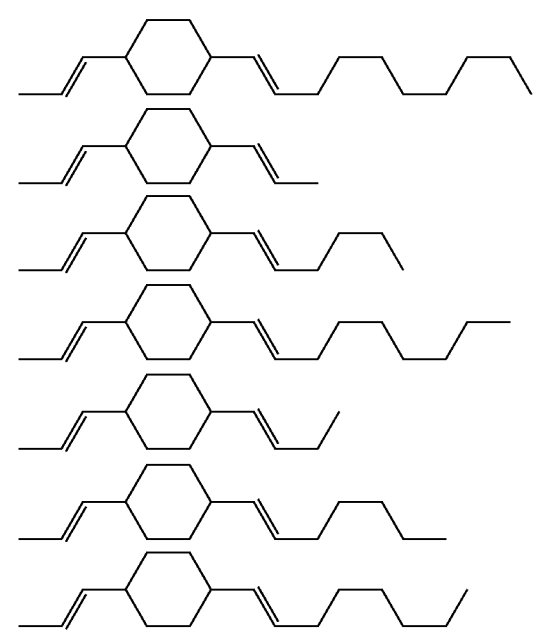
[Chem. 67]
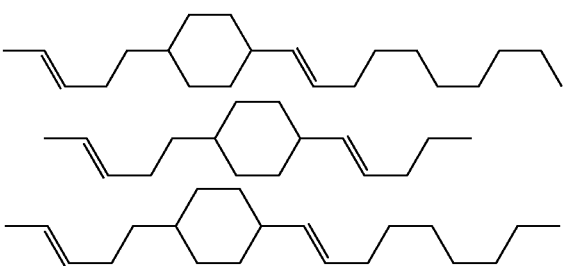

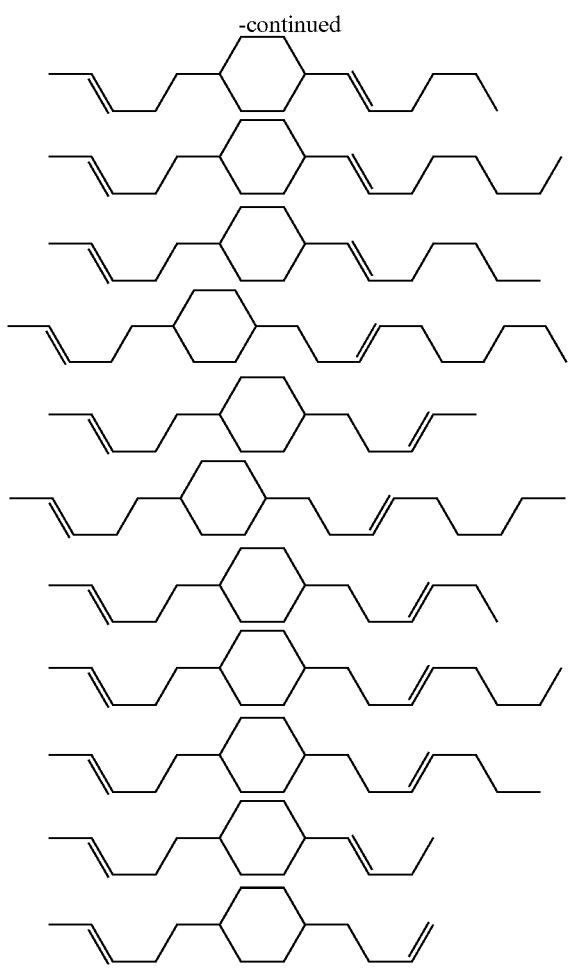

The liquid crystal composition of the present invention may further contain one or more compounds represented by general formula (VII).

[Chem. 68]

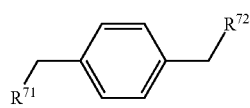

(VII)

(In the formula, $R^{71}$ and $R^{72}$ each independently represent a linear alkyl group having 1 to 10 carbon atoms, a linear alkoxy group having 1 to 10 carbon atoms, or a linear alkenyl group having 4 to 10 carbon atoms.)

The number of compounds that can be used in combination is not particularly limited. Among these compounds, one to three compounds are preferably contained, one to four compounds are more preferably contained, and one to five or more compounds are most preferably contained in accordance with the desired performance such as solubility at low temperature, transition temperature, electrical reliability and birefringence. The maximum content is preferably 35% by mass or less, more preferably 25% by mass or less, and most preferably 15% by mass or less.

In particular, the following compounds are preferable examples of the compounds represented by general formula (VII).

[Chem. 69]

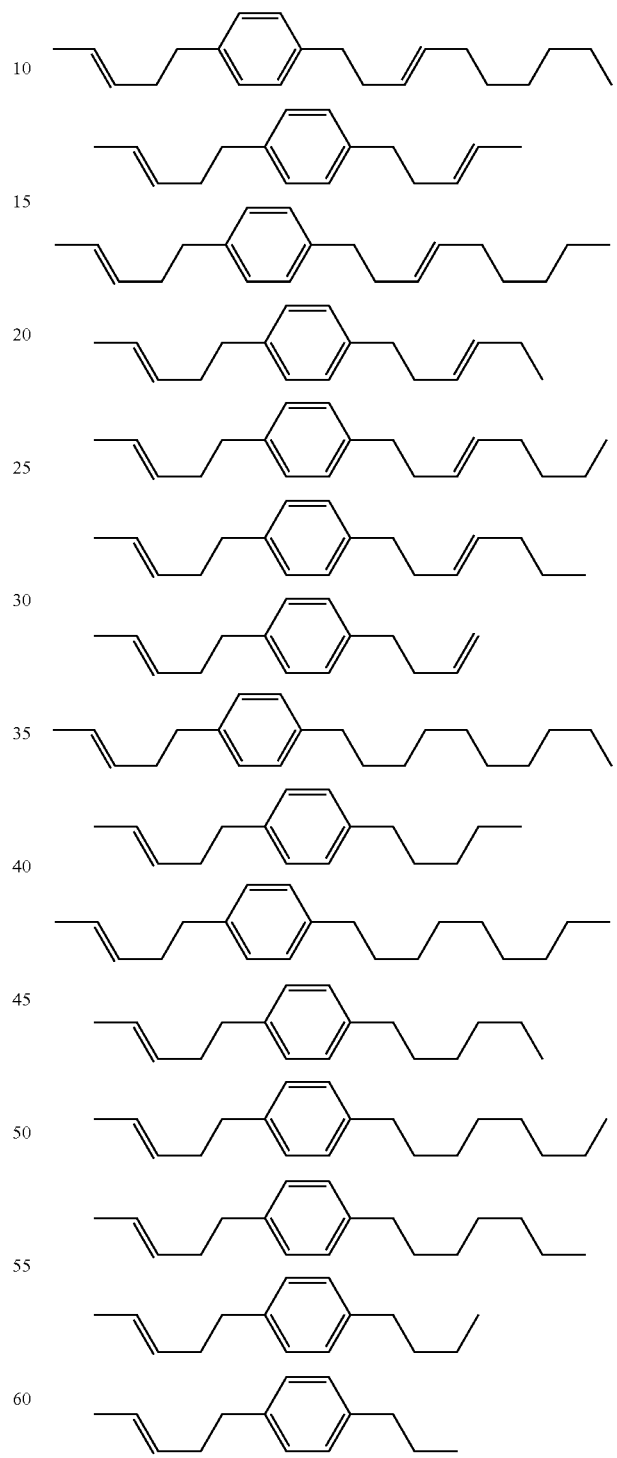

The liquid crystal composition of the present invention preferably also contains a compound represented by general formula (M).

[Chem. 70]

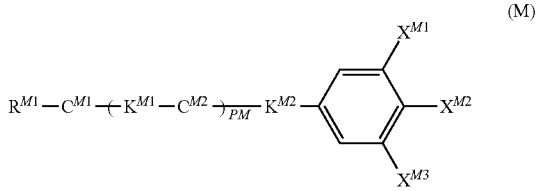

(In the formula, $R^{M1}$ represents an alkyl group having 1 to 8 carbon atoms where one —$CH_2$— or two or more non-adjacent —$CH_2$— in the alkyl group may each independently be substituted with —CH=CH—, —C≡C—, —O—, —CO—, —COO—, or —OCO—, PM represents 0, 1, 2, 3, or 4, $C^{M1}$ and $C^{M2}$ each independently represent a group selected from the group consisting of (d) a 1,4-cyclohexylene group (one —$CH_2$— or two or more non-adjacent —$CH_2$— in this group may be substituted with —O— or —S—) and (e) a 1,4-phenylene group (one —CH= or two or more non-adjacent —CH= in this group may be substituted with —Na=) where the group (d) and the group (e) may each independently be substituted with a cyano group, a fluorine atom, or a chlorine atom, $K^{M1}$ and $K^{M2}$ each independently represent a single bond, —$CH_2CH_2$—, —$(CH_2)_4$—, —$OCH_2$—, —$CH_2O$—, —$OCF_2$—, —$CF_2O$—, —COO—, —OCO—, or —C≡C—, when PM is 2, 3, or 4 and two or more $K^{M1}$ are present, $K^{M1}$ may be the same or different, and when PM is 2, 3, or 4 and two or more $C^{M2}$ are present, $C^{M2}$ may be the same or different, $X^{M1}$ and $X^{M3}$ each independently represent a hydrogen atom, a chlorine atom, or a fluorine atom, and $X^{M2}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group; however, compounds represented by general formula (i) and compounds represented by general formula (ii) are excluded.)

The number of compounds that can be used in combination is not particularly limited. An appropriate combination of compounds is used in accordance with the desired performance such as solubility at low temperature, transition temperature, electrical reliability, and birefringence. The number of compounds to be used is, for example, one in one embodiment of the present invention, two in another embodiment of the present invention, three in another embodiment of the present invention, four in another embodiment of the present invention, five in another embodiment of the present invention, six in another embodiment of the present invention, and seven or more in another embodiment of the present invention.

In the liquid crystal composition of the present invention, the content of the compound represented by general formula (M) needs to be appropriately adjusted in accordance with the desired performance, such as solubility at low temperature, transition temperature, electrical reliability, birefringence, process compatibility, drop marks, ghosting, and dielectric anisotropy.

The lower limit of the preferable content relative to the total amount of the liquid crystal composition of the present invention is, for example, 1% in one embodiment of the present invention, 10% in another embodiment of the present invention, 20% in another embodiment of the present invention, 30% in another embodiment of the present invention, 40% in another embodiment of the present invention, 45% in another embodiment of the present invention, 50% in another embodiment of the present invention, 55% in another embodiment of the present invention, 60% in another embodiment of the present invention, 65% in another embodiment of the present invention, 70% in another embodiment of the present invention, 75% in another embodiment of the present invention, and 80% in another embodiment of the present invention.

The upper limit of the preferable content relative to the total amount of the liquid crystal composition of the present invention is, for example, 95% in one embodiment of the present invention, 85% in another embodiment of the present invention, 75% in another embodiment of the present invention, 65% in another embodiment of the present invention, 55% in another embodiment of the present invention, 45% in another embodiment of the present invention, 35% in another embodiment of the present invention, and 25% in another embodiment of the present invention.

In order to keep the viscosity of the liquid crystal composition of the present invention to a low level or if a liquid crystal composition having high response speed is required, the lower limit is preferably set to a relatively low value and the upper limit is preferably set to a relatively low value. In order to keep the Tni of the liquid crystal composition of the present invention to a high level or if a liquid crystal composition having good temperature stability is required, the lower limit is preferably set to a relatively low value and the upper limit is preferably set to a relatively low value. In order to increase the dielectric anisotropy to keep the drive voltage low, the lower limit is preferably set to a relatively high value and the upper limit is preferably set to a relatively high value.

$R^{M1}$ preferably represents a linear alkyl group having 1 to 5 carbon atoms, a linear alkoxy group having 1 to 4 carbon atoms, or an alkenyl group having 4 or 5 carbon atoms if the cyclic structure to which $R^{M1}$ is bonded is a phenyl group (aromatic). $R^{M1}$ preferably represents a linear alkyl group having 1 to 5 carbon atoms, a linear alkoxy group having 1 to 4 carbon atoms, or an alkenyl group having 2 to 5 carbon atoms if the cyclic structure to which $R^{M1}$ is bonded is a saturated cyclic structure such as cyclohexane, pyran, or dioxane.

If a liquid crystal composition with chemical stability is desired, the compound represented by general formula (M) preferably does not contain chlorine atoms in its molecule. In the liquid crystal composition, the content of the compounds containing chlorine atoms is preferably 5% or less, preferably 3% or less, preferably 1% or less, preferably 0.5% or less, and preferably substantially zero. "Substantially zero" also refers to the instances where unintended chlorine atom-containing compounds such as compounds generated as impurities during compound production have come to contaminate the liquid crystal composition.

The compound represented by general formula (M) is, for example, preferably a compound selected from a group of compounds represented by general formula (VIII).

[Chem. 71]

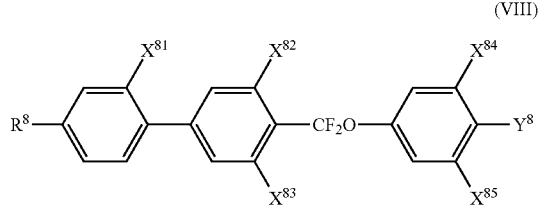

(VIII)

(In the formula, $R^8$ represents an alkyl group having 1 to 5 carbon atoms, an alkenyl group having 2 to 5 carbon atoms, or an alkoxy group having 1 to 4 carbon atoms, $X^{81}$ to $X^{85}$ each independently represent a hydrogen atom or a fluorine atom, and $Y^8$ represents a fluorine atom or —$OCF_3$.)

The number of compounds that can be used in combination is not particularly limited. An appropriate combination of compounds is used in accordance with desired performance, such as solubility at low temperature, transition temperature, electrical reliability, and birefringence. The number of compounds used is, for example, one in an embodiment of the present invention, two in another embodiment of the present invention, and three or more in another embodiment of the present invention.

In the liquid crystal composition of the present invention, the content of the compound represented by general formula (VIII) needs to be appropriately adjusted in accordance with the desired performance such as solubility at low temperature, transition temperature, electrical reliability, birefringence, process compatibility, drop marks, ghosting, and dielectric anisotropy.

The lower limit of the preferable content relative to the total amount of the liquid crystal composition of the present invention is, for example, 2% in one embodiment of the present invention, 4% in another embodiment of the present invention, 5% in another embodiment of the present invention, 6% in another embodiment of the present invention, 7% in another embodiment of the present invention, 8% in another embodiment of the present invention, 9% in another embodiment of the present invention, 10% in another embodiment of the present invention, 11% in another embodiment of the present invention, 12% in another embodiment of the present invention, 14% in another embodiment of the present invention, 15% in another embodiment of the present invention, 21% in another embodiment of the present invention, and 23% in another embodiment of the present invention.

The upper limit of the preferable content relative to the total amount of the liquid crystal composition of the present invention is, for example, 40% in one embodiment of the present invention, 30% in another embodiment of the present invention, 25% in another embodiment of the present invention, 21% in another embodiment of the present invention, 16% in another embodiment of the present invention, 12% in another embodiment of the present invention, 8% In another embodiment of the present invention, and 5% in another embodiment of the present invention.

In order to keep the viscosity of the liquid crystal composition of the present invention to a low level or if a liquid crystal composition having high response speed is required, the lower limit is preferably set to a relatively low value and the upper limit is preferably set to a relatively low value. In order to keep the Tni of the liquid crystal composition of the present invention to a high level or if a liquid crystal composition having good temperature stability is required, the lower limit is preferably set to a relatively low value and the upper limit is preferably set to a relatively low value. In order to increase the dielectric anisotropy to keep the drive voltage low, the lower limit is preferably set to a relatively high value and the upper limit is preferably set to a relatively high value.

The compound represented by general formula (VIII) is preferably a compound represented by general formula (VIII-1).

[Chem. 72]

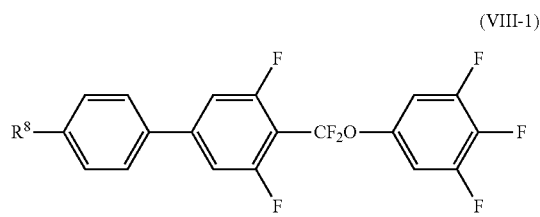

(VIII-1)

(In the formula, $R^8$ represents an alkyl group having 1 to 5 carbon atoms, an alkenyl group having 2 to 5 carbon atoms, or an alkoxy group having 1 to 4 carbon atoms.)

The number of compounds that can be used in combination is not particularly limited. An appropriate combination of compounds is used in accordance with the desired performance such as solubility at low temperature, transition temperature, electrical reliability and birefringence. The number of compounds to be used is, for example, one in an embodiment of the present invention and two or more in another embodiment of the present invention.

The compounds represented by general formula (VIII-1) are preferably compounds represented by formula (26.1) to formula (26.4). The compound represented by formula (26.1) or formula (26.2) is preferable and the compound represented by formula (26.2) is more preferable.

[Chem. 73]

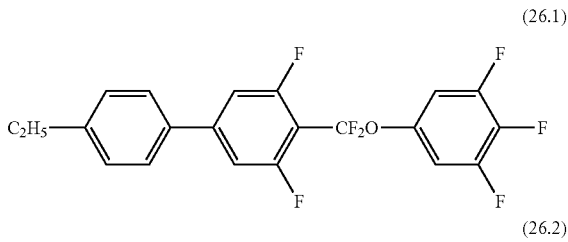

(26.1)

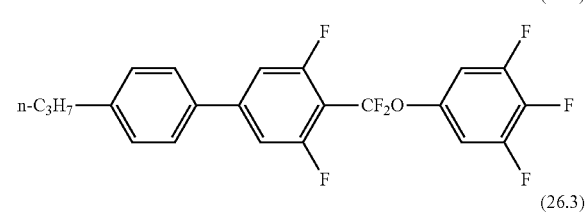

(26.2)

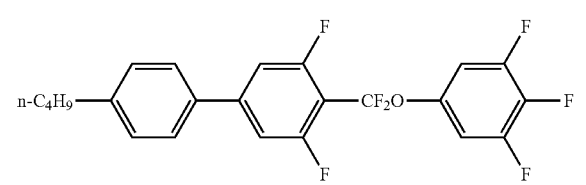

(26.3)

-continued (26.4)
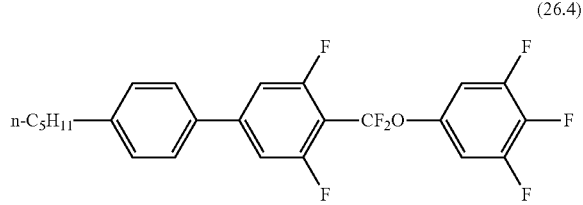

In view of solubility at low temperature, transition temperature, electrical reliability, birefringence, etc., the content of the compound represented by formula (26.2) relative to the total amount of the liquid crystal composition of the present invention is preferably 2% by mass or more, more preferably 4% by mass or more, more preferably 5% by mass or more, more preferably 6% by mass or more, more preferably 7% by mass or more, and particularly preferably 8% by mass or more. In view of the solubility at low temperature, transition temperature, electrical reliability, etc., the maximum content is preferably 40% by mass or less, more preferably 35% by mass or less, yet more preferably 30% by mass or less, and most preferably 25% by mass or less.

The compound represented by general formula (VIII) is preferably a compound represented by general formula (VIII-2).

[Chem. 74]

(VIII-2)
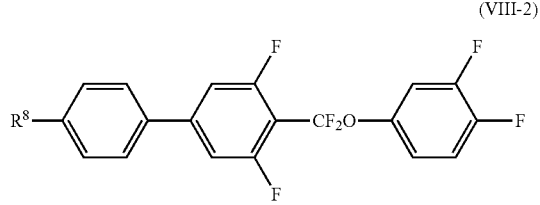

(In the formula, $R^8$ represents an alkyl group having 1 to 5 carbon atoms, an alkenyl group having 2 to 5 carbon atoms, or an alkoxy group having 1 to 4 carbon atoms.)

The number of compounds that can be used in combination is not particularly limited. An appropriate combination of compounds is used in accordance with the desired performance such as solubility at low temperature, transition temperature, electrical reliability and birefringence. The number of compounds to be used is, for example, one in an embodiment of the present invention, two in another embodiment of the present invention, and three or more in another embodiment of the present invention.

In view of solubility at low temperature, transition temperature, electrical reliability, birefringence, etc., the content of the compound represented by general formula (VIII-2) is preferably 2.5% by mass or more, more preferably 8% by mass or more, yet more preferably 10% by mass or more, and most preferably 12% by mass or more. The maximum content is preferably 25% by mass or less, more preferably 20% by mass or less, and most preferably 15% by mass or less.

The compounds represented by general formula (VIII-2) are preferably compounds represented by formula (27.1) to formula (27.4), and the compound represented by formula (27.2) is preferable.

[Chem. 75]

(27.1)
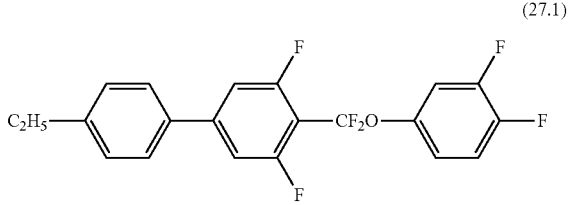

(27.2)
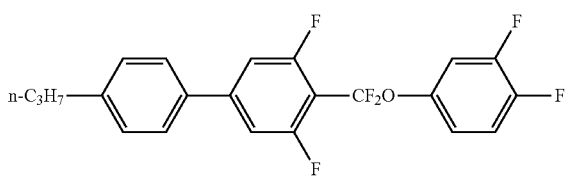

(27.3)
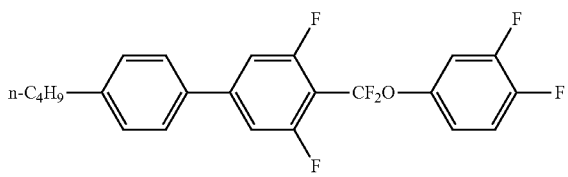

(27.4)
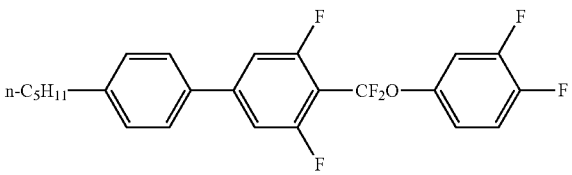

The compound represented by general formula (M) is preferably a compound selected from a group of compounds represented by general formula (IX), for example.

[Chem. 76]

(IX)
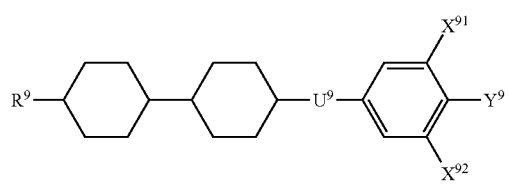

(In the formula, $R^9$ represents an alkyl group having 1 to 5 carbon atoms, an alkenyl group having 2 to 5 carbon atoms, or an alkoxy group having 1 to 4 carbon atoms, $X^{91}$ and $X^{92}$ each independently represent a hydrogen atom or a fluorine atom, $Y^9$ represents a fluorine atom, a chlorine atom, or —$OCF_3$, and $U^9$ represents a single bond, —COO—, or —$CF_2O$—. However, compounds represented by general formula (ii) are excluded.)

The number of compounds that can be used in combination is not particularly limited. An appropriate combination of compounds is used in accordance with the desired performance such as solubility at low temperature, transition temperature, electrical reliability and birefringence. The number of compounds to be used is, for example, one in one embodiment of the present invention, two in another embodiment of the present invention, three in another embodiment of the present invention, four in another embodiment of the present invention, five in another embodiment of the present invention, and six or more in another embodiment of the present invention.

In the liquid crystal composition of the present invention, the content of the compound represented by general formula (IX) needs to be appropriately adjusted in accordance with the desired performance, such as solubility at low temperature, transition temperature, electrical reliability, birefringence, process compatibility, drop marks, ghosting, and dielectric anisotropy.

The lower limit of the preferable content relative to the total amount of the liquid crystal composition of the present invention is, for example, 3% in one embodiment of the present invention, 5% in another embodiment of the present invention, 8% in another embodiment of the present invention, 10% in another embodiment of the present invention, 12% in another embodiment of the present invention, 15% in another embodiment of the present invention, 17% in another embodiment of the present invention, 20% in another embodiment of the present invention, 24% in another embodiment of the present invention, 28% in another embodiment of the present invention, 30% in another embodiment of the present invention, 34% in another embodiment of the present invention, 39% in another embodiment of the present invention, 40% in another embodiment of the present invention, 42% in another embodiment of the present invention, and 45% in another embodiment of the present invention.

The upper limit of the preferable content relative to the total amount of the liquid crystal composition of the present invention is, for example, 70% in one embodiment of the present invention, 60% in another embodiment of the present invention, 55% in another embodiment of the present invention, 50% in another embodiment of the present invention, 45% in another embodiment of the present invention, 40% in another embodiment of the present invention, 35% in another embodiment of the present invention, 30% in another embodiment of the present invention, 25% in another embodiment of the present invention, 20% in another embodiment of the present invention, 15% in another embodiment of the present invention, and 10% in another embodiment of the present invention.

In order to keep the viscosity of the liquid crystal composition of the present invention to a low level or if a liquid crystal composition having high response speed is required, the lower limit is preferably set to a relatively low value and the upper limit is preferably set to a relatively low value. In order to keep the Tni of the liquid crystal composition of the present invention to a high level or if a liquid crystal composition with which ghosting rarely occurs is required, the lower limit is preferably set to a relatively low value and the upper limit is preferably set to a relatively low value. In order to increase the dielectric anisotropy to keep the drive voltage low, the lower limit is preferably set to a relatively high value and the upper limit is preferably set to a relatively high value.

The compound represented by general formula (IX) is preferably a compound represented by general formula (IX-1).

[Chem. 77]

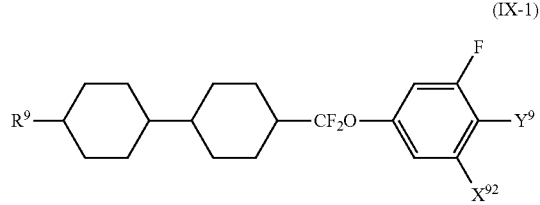

(IX-1)

(In the formula, $R^9$ represents an alkyl group having 1 to 5 carbon atoms, an alkenyl group having 2 to 5 carbon atoms, or an alkoxy group having 1 to 4 carbon atoms, $X^{92}$ represents a hydrogen atom or a fluorine atom, and $Y^9$ represents a fluorine atom or —$OCF_3$. However, compounds represented by general formula (ii) are excluded.)

The number of compounds that can be used in combination is not particularly limited. An appropriate combination of compounds is used in accordance with the desired performance such as solubility at low temperature, transition temperature, electrical reliability and birefringence. The number of compounds to be used is, for example, one in one embodiment of the present invention, two in another embodiment of the present invention, three in another embodiment of the present invention, and four or more in another embodiment of the present invention.

The compound represented by general formula (IX-1) is preferably a compound represented by general formula (IX-1-2).

[Chem. 78]

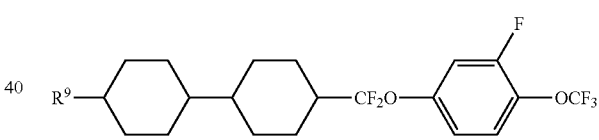

(IX-1-2)

(In the formula, $R^9$ represents an alkyl group having 1 to 5 carbon atoms, an alkenyl group having 2 to 5 carbon atoms, or an alkoxy group having 1 to 4 carbon atoms.)

The number of compounds that can be used in combination is not particularly limited. One to three compounds are preferably used in combination and one to four compounds are more preferably used in combination in view of solubility at low temperature, transition temperature, electrical reliability, birefringence, etc.

The content of the compound represented by general formula (IX-1-2) relative to the total amount of the liquid crystal composition of the present invention is preferably 1% by mass or more, more preferably 5% by mass or more, more preferably 8% by mass or more, more preferably 10% by mass or more, more preferably 14% by mass or more, and particularly preferably 16% by mass or more. In view of solubility at low temperature, transition temperature, electrical reliability, etc., the maximum content is preferably 30% by mass or less, more preferably 25% by mass or less, yet more preferably 22% by mass or less, and most preferably less than 20% by mass.

The compounds represented by general formula (IX-1-2) are preferably compounds represented by formula (29.1) to formula (29.4) and the compound represented by formula (29.2) and/or the compound represented by formula (29.4) is preferable.

[Chem. 79]

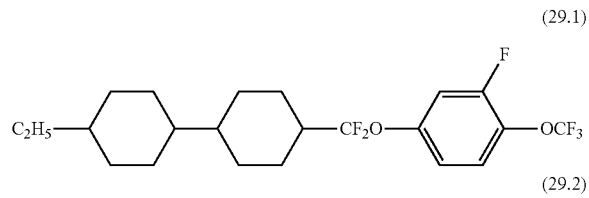
(29.1)

(29.2)

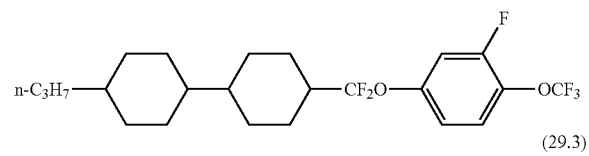

(29.3)

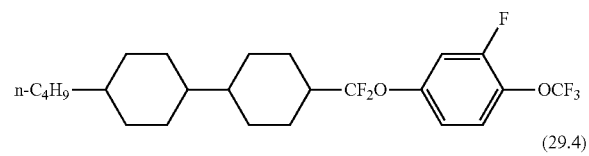

(29.4)

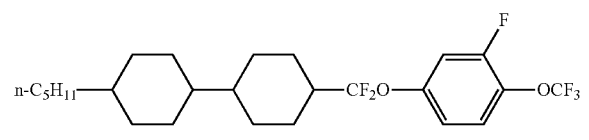

The compound represented by general formula (IX) is preferably a compound represented by general formula (IX-2).

[Chem. 80]

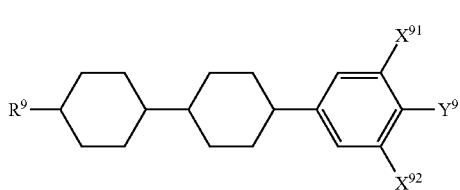
(IX-2)

(In the formula, $R^9$ represents an alkyl group having 1 to 5 carbon atoms, an alkenyl group having 2 to 5 carbon atoms, or an alkoxy group having 1 to 4 carbon atoms, $X^{91}$ and $X^{92}$ each independently represent a hydrogen atom or a fluorine atom, and $Y^9$ represents a fluorine atom, a chlorine atom, or —$OCF_3$.)

The number of compounds that can be used in combination is not particularly limited. An appropriate combination for each embodiment is used in accordance with the desired performance such as solubility at low temperature, transition temperature, electrical reliability, and birefringence. For example, the number of compounds to be used is one in one embodiment of the present invention, two in another embodiment of the present invention, three in another embodiment of the present invention, four in another embodiment of the present invention, five in another embodiment of the present invention, and six or more in another embodiment of the present invention.

The compound represented by general formula (IX-2) is preferably a compound represented by general formula (IX-2-1).

[Chem. 81]

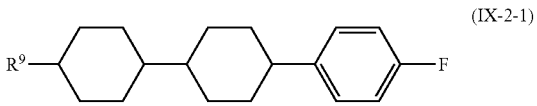
(IX-2-1)

(In the formula, $R^9$ represents an alkyl group having 1 to 5 carbon atoms, an alkenyl group having 2 to 5 carbon atoms, or an alkoxy group having 1 to 4 carbon atoms.)

The number of compounds that can be used in combination is not limited. In view of solubility at low temperature, transition temperature, electrical reliability, birefringence, etc., one to three compounds are preferably used.

The content of the compound represented by general formula (IX-2-1) has an upper limit and a lower limit preferred for each embodiment in view of the properties such as solubility at low temperature, transition temperature, electrical reliability, birefringence, etc. The lower limit of the content relative to the total amount of the liquid crystal composition of the present invention is, for example, 1% in one embodiment of the present invention, 2% in another embodiment, 4% in another embodiment, 10% in another embodiment, 14% in another embodiment, 16% in another embodiment, and 21% in another embodiment. The upper limit of the content is, for example, 40% in one embodiment of the present invention, 35% in another embodiment, 30% in another embodiment, 25% in another embodiment, 22% in another embodiment, 20% in another embodiment, 10% in another embodiment, 7% in another embodiment, and 5% in another embodiment.

The compounds represented by general formula (IX-2-1) are preferably compounds represented by formula (30.1) to formula (30.4). The compounds represented by formula (30.1) and formula (30.2) are preferable.

[Chem. 82]

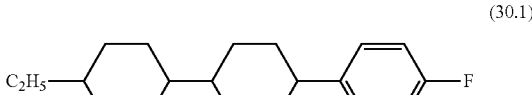
(30.1)

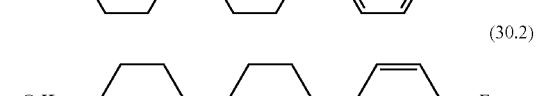
(30.2)

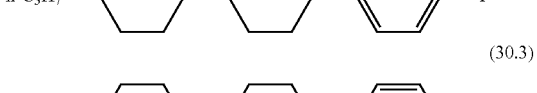
(30.3)

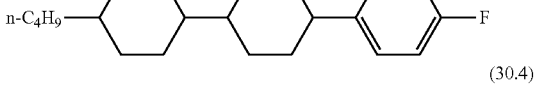
(30.4)

The compound represented by general formula (IX-2) is preferably a compound represented by general formula (IX-2-2).

[Chem. 83]

(IX-2-2)

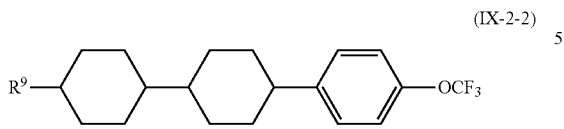

(In the formula, $R^9$ represents an alkyl group having 1 to 5 carbon atoms, an alkenyl group having 2 to 5 carbon atoms, or an alkoxy group having 1 to 4 carbon atoms.)

The number of compounds that can be used in combination is not limited. In view of solubility at low temperature, transition temperature, electrical reliability, birefringence, etc., one to three compounds are preferably used in combination and one to four compounds are more preferably used in combination.

The content of the compound represented by general formula (IX-2-2) has an upper limit and a lower limit preferred for each embodiment in view of the properties such as solubility at low temperature, transition temperature, electrical reliability, birefringence, etc. The lower limit of the content relative to the total amount of the liquid crystal composition of the present invention is, for example, 1% in one embodiment of the present invention, 2% in another embodiment, 4% in another embodiment, 10% in another embodiment, 14% in another embodiment, 16% in another embodiment, and 21% in another embodiment. The upper limit of the content is, for example, 40% in one embodiment of the present invention, 35% in another embodiment, 30% in another embodiment, 25% in another embodiment, 22% in another embodiment, 15% in another embodiment, 12% in another embodiment, 8% in another embodiment, and 4% in another embodiment.

The compounds represented by general formula (IX-2-2) are preferably compounds represented by formula (31.1) to formula (31.4). The compounds represented by formula (31.1) to formula (31.4) are preferable.

[Chem. 84]

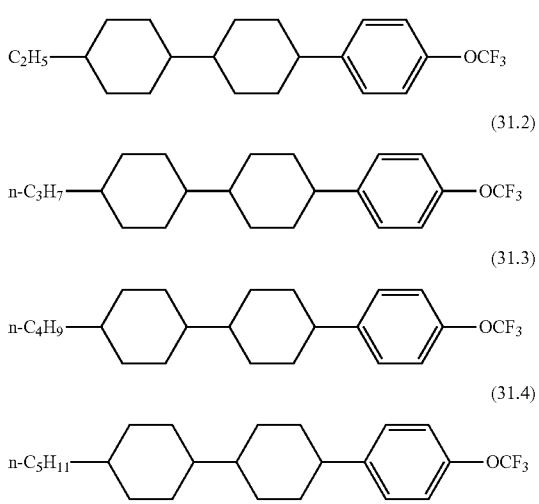

(31.1)

(31.2)

(31.3)

(31.4)

The compound represented by general formula (IX-2) is preferably a compound represented by general formula (IX-2-3).

[Chem. 85]

(IX-2-3)

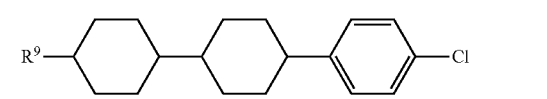

(In the formula, $R^9$ represents an alkyl group having 1 to 5 carbon atoms, an alkenyl group having 2 to 5 carbon atoms, or an alkoxy group having 1 to 4 carbon atoms.)

The number of compounds that can be used in combination is not limited. However, in view of solubility at low temperature, transition temperature, electrical reliability, birefringence, etc., one or two compounds are preferably used.

The content of the compound represented by general formula (IX-2-3) relative to the total amount of the liquid crystal composition of the present invention is preferably 1% by mass or more, more preferably 3% by mass or more, yet more preferably 6% by mass or more, yet more preferably 8% by mass or more, and most preferably 15% by mass or more. In view of the solubility at low temperature, transition temperature, electrical reliability, etc., the maximum content is preferably 30% by mass or less, more preferably less than 20% by mass, more preferably 15% by mass or less, and most preferably less than 10% by mass.

The compounds represented by general formula (IX-2-3) are preferably compounds represented by formula (32.1) to formula (32.4). The compound represented by formula (32.2) and/or the compound represented by formula (32.4) is preferable.

[Chem. 86]

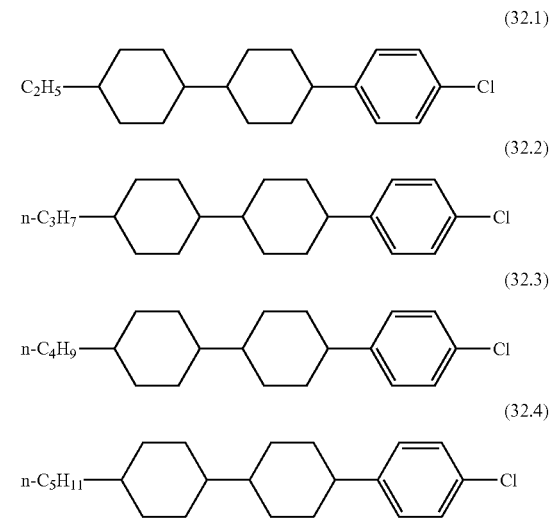

(32.1)

(32.2)

(32.3)

(32.4)

The compound represented by general formula (IX-2) is preferably a compound represented by general formula (IX-2-4).

[Chem. 87]

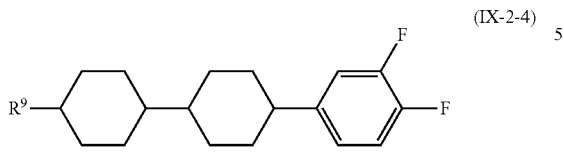
(IX-2-4)

(In the formula, $R^9$ represents an alkyl group having 1 to 5 carbon atoms, an alkenyl group having 2 to 5 carbon atoms, or an alkoxy group having 1 to 4 carbon atoms.)

The content of the compound represented by general formula (IX-2-4) relative to the total amount of the liquid crystal composition of the present invention is preferably 1% by mass or more, more preferably 3% by mass or more, yet more preferably 6% by mass or more, and most preferably 8% by mass or more. In view of solubility at low temperature, transition temperature, electrical reliability, etc., the maximum content is preferably 30% by mass or less, more preferably 20% by mass or less, yet more preferably 15% by mass or less, and most preferably less than 10% by mass.

The compounds represented by general formula (IX-2-4) are preferably compounds represented by formula (33.1) to formula (33.5). The compounds represented by formula (33.1) and/or formula (33.3) are preferable.

[Chem. 88]

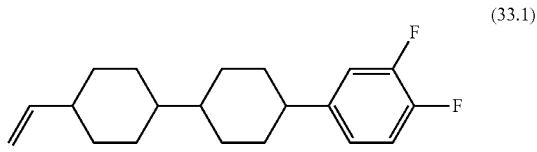
(33.1)

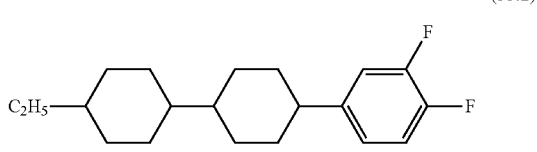
(33.2)

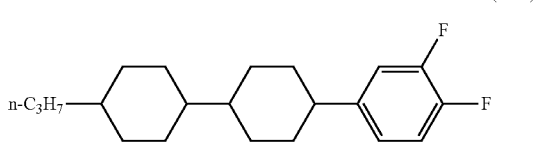
(33.3)

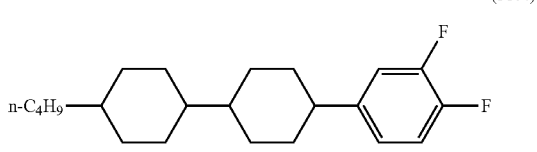
(33.4)

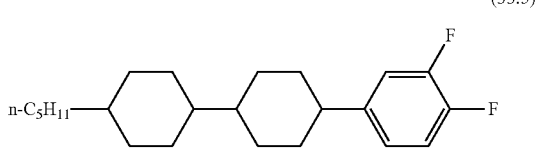
(33.5)

The compound represented by general formula (IX-2) is preferably a compound represented by general formula (IX-2-5).

[Chem. 89]

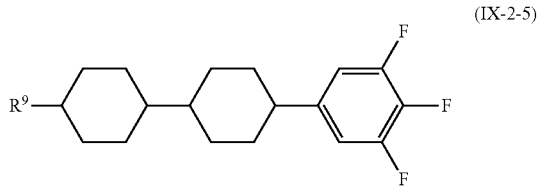
(IX-2-5)

(In the formula, $R^9$ represents an alkyl group having 1 to 5 carbon atoms, an alkenyl group having 2 to 5 carbon atoms, or an alkoxy group having 1 to 4 carbon atoms.)

The number of compounds that can be used in combination is not limited. An appropriate combination for each embodiment is used in accordance with desired performance, such as solubility at low temperature, transition temperature, electrical reliability, and birefringence. For example, the number of compounds is one in one embodiment, two in another embodiment, three in another embodiment, and four or more in another embodiment.

The content of the compound represented by general formula (IX-2-5) has an upper limit and a lower limit preferred for each embodiment in view of the properties such as solubility at low temperature, transition temperature, electrical reliability, birefringence, etc. The lower limit of the content relative to the total amount of the liquid crystal composition of the present invention is, for example, 4% in one embodiment of the present invention, 8% in another embodiment, 12% in another embodiment, 21% in another embodiment, 30% in another embodiment, 31% in another embodiment, and 34% in another embodiment. The upper limit of the content is, for example, 45% in one embodiment of the present invention, 40% in another embodiment, 35% in another embodiment, 32% in another embodiment, 22% in another embodiment, 13% in another embodiment, 9% in another embodiment, 8% in another embodiment, and 5% in another embodiment.

In order to keep the viscosity of the liquid crystal composition of the present invention to a low level or if a liquid crystal composition having high response speed is required, the lower limit is preferably set to a relatively low value and the upper limit is preferably set to a relatively low value. In order to keep the Tni of the liquid crystal composition of the present invention to a high level or if a liquid crystal composition with which ghosting rarely occurs is required, the lower limit is preferably set to a relatively low value and the upper limit is preferably set to a relatively low value. In order to increase the dielectric anisotropy to keep the drive voltage low, the lower limit is preferably set to a relatively high value and the upper limit is preferably set to a relatively high value.

The compounds represented by general formula (IX-2-5) are preferably compounds represented by formula (34.1) to formula (34.5). The compound represented by formula (34.1), the compound represented by formula (34.2), the compound represented by formula (34.3), and/or the compound represented by formula (34.5) is preferable.

[Chem. 90]

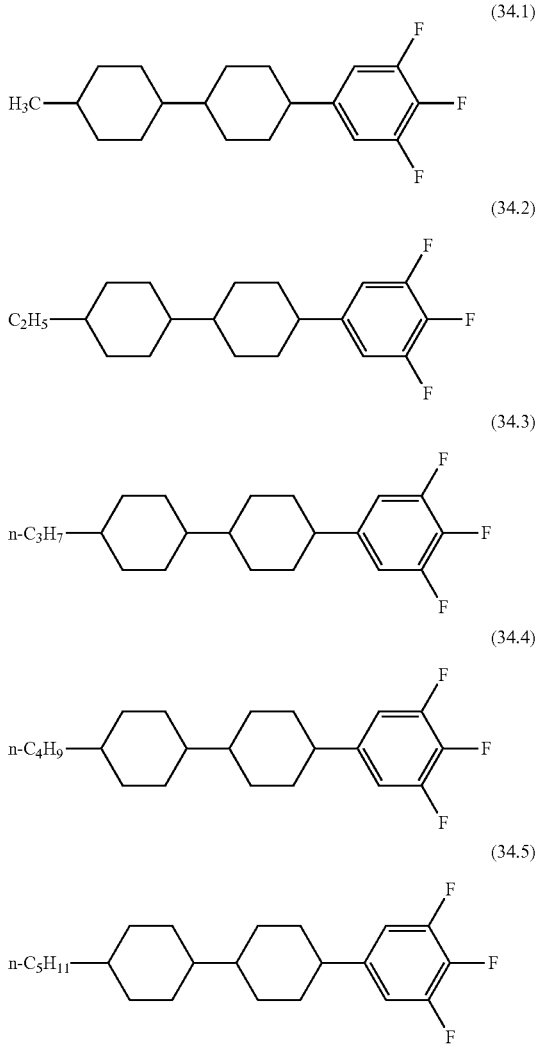

The compound represented by general formula (IX) is preferably a compound represented by general formula (IX-3).

[Chem. 91]

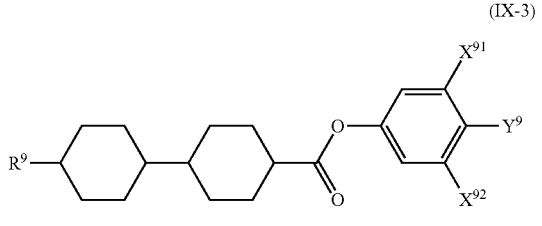

(In the formula, $R^9$ represents an alkyl group having 1 to 5 carbon atoms, an alkenyl group having 2 to 5 carbon atoms, or an alkoxy group having 1 to 4 carbon atoms, $X^{91}$ and $X^{92}$ each independently represent a hydrogen atom or a fluorine atom, and $Y^9$ represents a fluorine atom, a chlorine atom, or —$OCF_3$.)

The compound represented by general formula (IX-3) is preferably a compound represented by general formula (IX-3-1).

[Chem. 92]

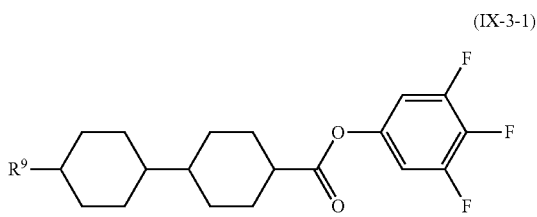

(In the formula, $R^9$ represents an alkyl group having 1 to 5 carbon atoms, an alkenyl group having 2 to 5 carbon atoms, or an alkoxy group having 1 to 4 carbon atoms.)

The number of compounds that can be used in combination is not limited. Preferably, one or two compounds are used considering solubility at low temperature, transition temperature, electrical reliability, birefringence, etc.

The content of the compound represented by general formula (IX-3-1) relative to the total amount of the liquid crystal composition of the present invention is preferably 3% by mass or more, more preferably 7% by mass or more, yet more preferably 13% by mass or more, and most preferably 15% by mass or more. Considering solubility at low temperature, transition temperature, electrical reliability, etc., the maximum content is preferably 30% by mass or less, more preferably 20% by mass or less, yet more preferably 18% or less, and most preferably less than 10% by mass.

The compounds represented by general formula (IX-3-1) are preferably compounds represented by formula (35.1) to formula (35.4). The compound represented by formula (35.1) and/or the compound represented by formula (35.2) is preferable.

[Chem. 93]

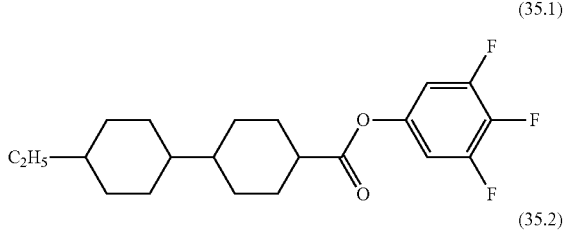

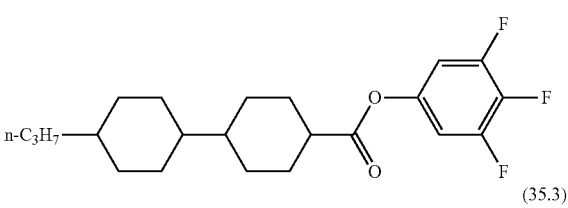

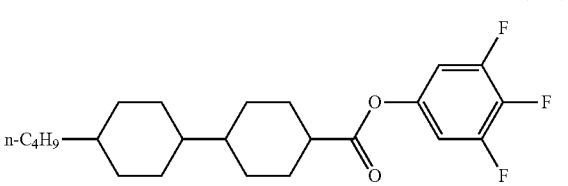

-continued (35.4)

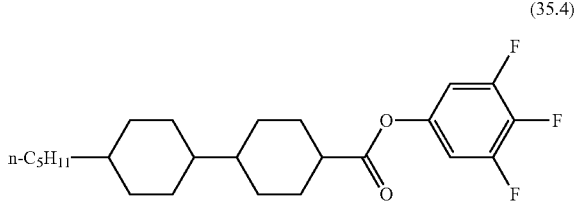

The compound represented by general formula (M) is preferably a compound represented by general formula (X).

[Chem. 94]

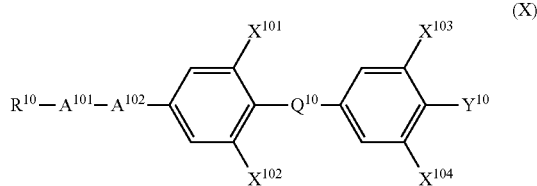

(X)

(In the formula, $X^{101}$ to $X^{104}$ each independently represent a fluorine atom or a hydrogen atom, $Y^{10}$ represents a fluorine atom, a chlorine atom, or —$OCF_3$, $Q^{10}$ represents a single bond or —$CF_2O$—, $R^{10}$ represents an alkyl group having 1 to 5 carbon atoms, an alkenyl group having 2 to 5 carbon atoms, or an alkoxy group having 1 to 4 carbon atoms, $A^{101}$ and $A^{102}$ each independently represent a 1,4-cyclohexylene group, a 1,4-phenylene group, or

[Chem. 95]

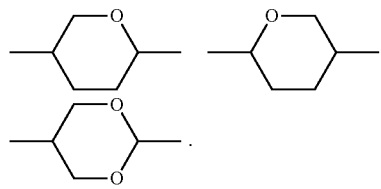

Hydrogen atoms in the 1,4-phenylene group may be substituted with fluorine atoms.)

The number of compounds that can be used in combination is not particularly limited. A combination suitable for each embodiment is used in view of solubility at low temperature, transition temperature, electrical reliability, birefringence, etc. For example, one compound is used in one embodiment of the present invention. Two compounds are used in another embodiment of the present invention. Three compounds are used in another embodiment of the present invention. Four compounds are used in another embodiment of the present invention. Five or more compounds are used in another embodiment of the present invention.

The content of the compound represented by general formula (X) has an upper limit and a lower limit for each embodiment in view of the properties such as solubility at low temperature, transition temperature, electrical reliability, birefringence, etc. The lower limit of the content relative to the total amount of the liquid crystal composition of the present invention is, for example, 2% in one embodiment of the present invention, 3% in another embodiment, 6% in another embodiment, 8% in another embodiment, 9% in another embodiment, 11% in another embodiment, 12% in another embodiment, 18% in another embodiment, 19% in another embodiment, 23% in another embodiment, and 25% in another embodiment. The upper limit of the content is, for example, 45% in one embodiment of the present invention, 35% in another embodiment, 30% in another embodiment, 25% in another embodiment, 20% in another embodiment, 13% in another embodiment, 9% in another embodiment, 6% in another embodiment, and 3% in another embodiment.

In order to keep the viscosity of the liquid crystal composition of the present invention to a low level or if a liquid crystal composition having high response speed is required, the lower limit is preferably set to a relatively low value and the upper limit is preferably set to a relatively low value. If a liquid crystal composition with which ghosting rarely occurs is required, the lower limit is preferably set to a relatively low value and the upper limit is preferably set to a relatively low value. In order to increase the dielectric anisotropy to keep the drive voltage low, the lower limit is preferably set to a relatively high value and the upper limit is preferably set to a relatively high value.

The compound represented by general formula (X) used in the liquid crystal composition of the present invention is preferably a compound represented by general formula (X-1).

[Chem. 96]

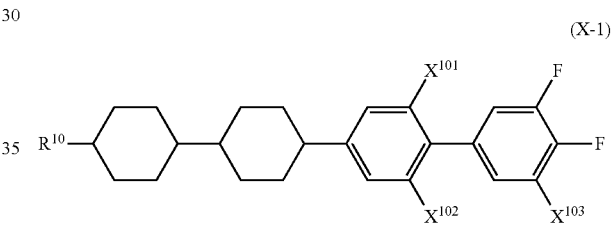

(X-1)

(In the formula, $X^{101}$ to $X^{103}$ each independently represent a fluorine atom or a hydrogen atom, and $R^{10}$ represents an alkyl group having 1 to 5 carbon atoms, an alkenyl group having 2 to 5 carbon atoms, or an alkoxy group having 1 to 4 carbon atoms.)

The number of compounds that can be used in combination is not particularly limited and an appropriate combination for each embodiment is used in view of solubility at low temperature, transition temperature, electrical reliability, birefringence, etc. For example, one compound is used in one embodiment of the present invention. Two compounds are used in another embodiment of the present invention. Three compounds are used in another embodiment of the present invention. Four compounds are used in another embodiment of the present invention. Five or more compounds are used in another embodiment of the present invention.

The content of the compound represented by general formula (X-1) has an upper limit and a lower limit for each embodiment in view of properties such as solubility at low temperature, transition temperature, electrical reliability, birefringence, etc. The lower limit of the content relative to the total amount of the liquid crystal composition of the present invention is, for example, 2% in one embodiment of the present invention, 3% in another embodiment, 5% in another embodiment, 6% in another embodiment, 7% in another embodiment, 8% in another embodiment, 9% in another embodiment, 13% in another embodiment, 18% in another embodiment, and 23% in another embodiment.

The upper limit of the content is, for example, 40% in one embodiment of the present invention, 30% in another embodiment, 25% in another embodiment, 20% in another embodiment, 15% in another embodiment, 10% in another embodiment, 6% in another embodiment, 4% in another embodiment, and 2% in another embodiment.

The compound represented by general formula (X-1) used in the liquid crystal composition of the present invention is preferably a compound represented by general formula (X-1-1).

[Chem. 97]

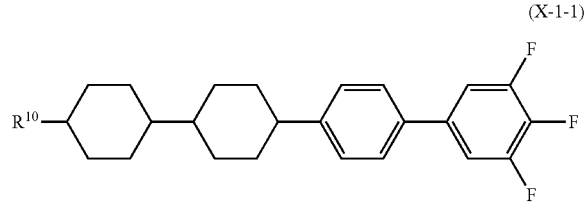

(X-1-1)

(In the formula, $R^{10}$ represents an alkyl group having 1 to 5 carbon atoms, an alkenyl group having 2 to 5 carbon atoms, or an alkoxy group having 1 to 4 carbon atoms.)

The number of compounds that can be used in combination is not particularly limited. A combination suitable for each embodiment is used in view of solubility at low temperature, transition temperature, electrical reliability, birefringence, etc. For example, one compound is used in one embodiment of the present invention. Two compounds are used in another embodiment of the present invention. Three compounds are used in another embodiment. Four or more compounds are used in another embodiment.

The content of the compound represented by general formula (X-1-1) has an upper limit and a lower limit for each embodiment in view of the properties such as solubility at low temperature, transition temperature, electrical reliability, birefringence, etc. The lower limit of the content relative to the total amount of the liquid crystal composition of the present invention is, for example, 3% in one embodiment of the present invention, 4% in another embodiment, 6% in another embodiment, 9% in another embodiment, 12% in another embodiment, 15% in another embodiment, 18% in another embodiment, and 21% in another embodiment.

The upper limit of the content is, for example, 30% in one embodiment of the present invention, 20% in another embodiment, 13% in another embodiment, 10% in another embodiment, 7% in another embodiment, and 3% in another embodiment.

The compounds represented by general formula (X-1-1) used in the liquid crystal composition of the present invention are specifically preferably compounds represented by formula (36.1) to formula (36.4). Among these, the compound represented by formula (36.1) and/or the compound represented by formula (36.2) is preferably contained.

[Chem. 98]

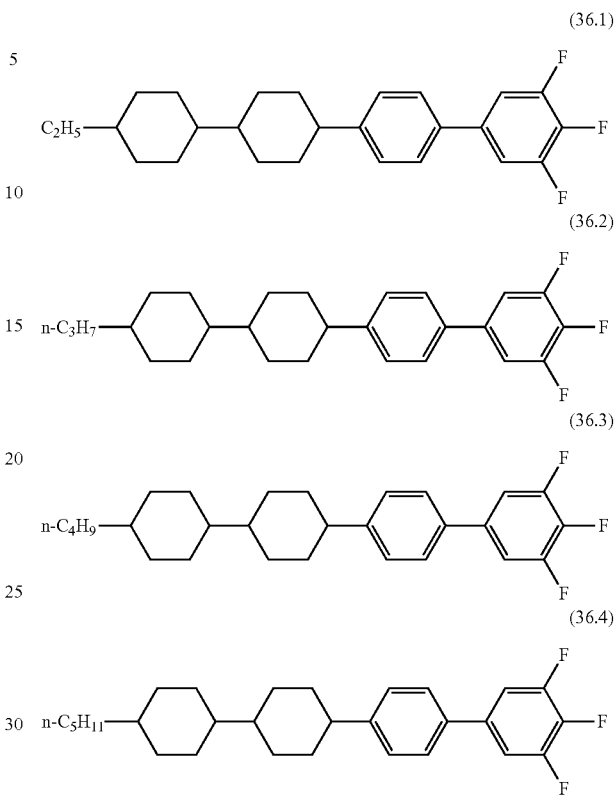

The compound represented by general formula (X-1) used in the liquid crystal composition of the present invention is preferably a compound represented by general formula (X-1-2).

[Chem. 99]

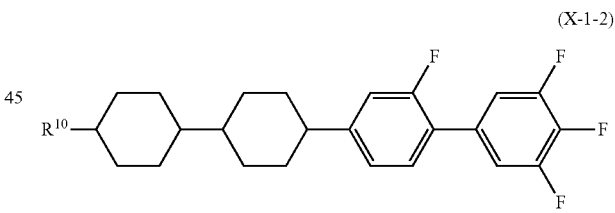

(X-1-2)

(In the formula, $R^{10}$ represents an alkyl group having 1 to 5 carbon atoms, an alkenyl group having 2 to 5 carbon atoms, or an alkoxy group having 1 to 4 carbon atoms.)

The content of the compound represented by general formula (X-1-2) relative to the total amount of the liquid crystal composition of the present invention is preferably 1% by mass or more, more preferably 2% by mass or more, and most preferably 6% by mass or more. In view of solubility at low temperature, transition temperature, electrical reliability, etc., the maximum content is preferably 20% by mass or less, more preferably 16% by mass or less, yet more preferably 12% by mass or less, and most preferably 10% by mass or less.

The compounds represented by general formula (X-1-2) used in the liquid crystal composition of the present invention are specifically preferably compounds represented by formula (37.1) to formula (37.4). Among these, the compound represented by formula (37.2) is preferably contained.

[Chem. 100]

(37.1)
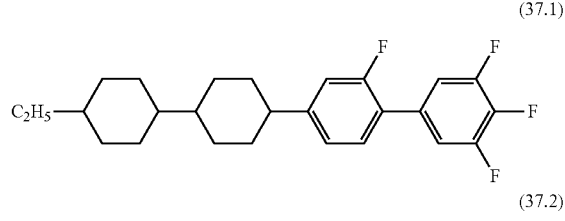

(37.2)
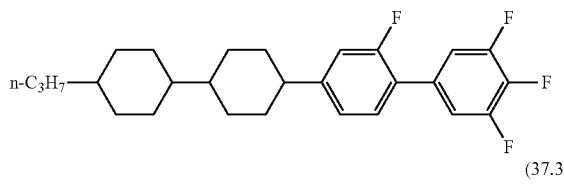

(37.3)
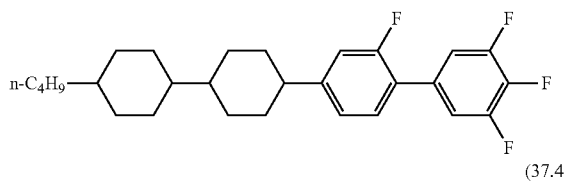

(37.4)
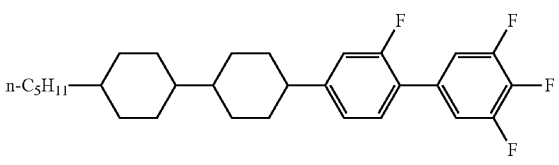

The compound represented by general formula (X-1) used in the liquid crystal composition of the present invention is preferably a compound represented by general formula (X-1-3).

[Chem. 101]

(X-1-3)
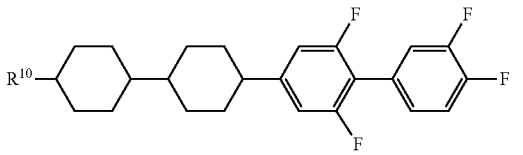

(In the formula, $R^{10}$ represents an alkyl group having 1 to 5 carbon atoms, an alkenyl group having 2 to 5 carbon atoms, or an alkoxy group having 1 to 4 carbon atoms.)

The compounds that can be used in combination are not particularly limited. One or more compounds are preferably used considering solubility at low temperature, transition temperature, electrical reliability, birefringence, etc.

The content of the compound represented by general formula (X-1-3) relative to the total amount of the liquid crystal composition is preferably 1% by mass or more, more preferably 2% by mass or more, and most preferably 6% by mass or more. In view of solubility at low temperature, transition temperature, electrical reliability, etc., the maximum content is preferably 20% by mass or less, more preferably 16% by mass or less, yet more preferably 12% by mass or less, and most preferably 10% by mass or less.

The compounds represented by general formula (X-1-3) used in the liquid crystal composition of the present invention are specifically preferably compounds represented by formula (38.1) to formula (38.4). Among these, the compound represented by formula (38.2) is preferably contained.

[Chem. 102]

(38.1)
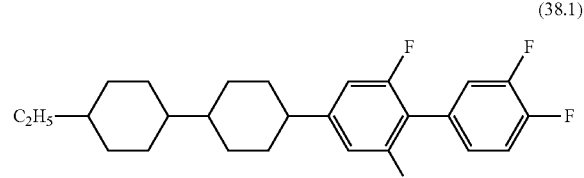

(38.2)
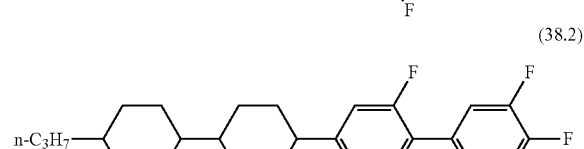

(38.3)
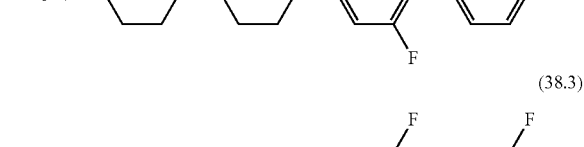

(38.4)
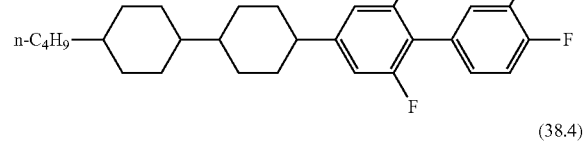

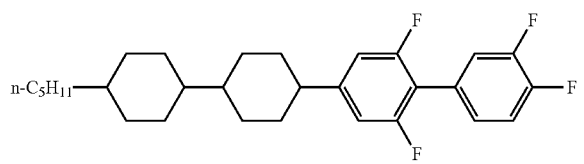

The compound represented by general formula (X) used in the liquid crystal composition of the present invention is preferably a compound represented by general formula (X-2).

[Chem. 103]

(X-2)
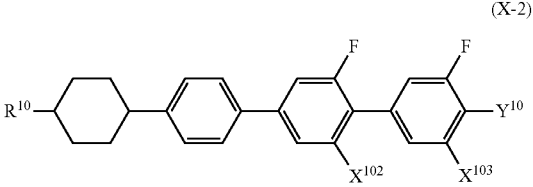

(In the formula, $X^{102}$ and $X^{103}$ each independently represent a fluorine atom or a hydrogen atom, $Y^{10}$ represents a fluorine atom, a chlorine atom, or —$OCF_3$, and $R^{10}$ represents an alkyl group having 1 to 5 carbon atoms, an alkenyl group having 2 to 5 carbon atoms, or an alkoxy group having 1 to 4 carbon atoms.)

The compounds that can be used in combination are not particularly limited. In view of solubility at low temperature, transition temperature, electrical reliability, birefringence, etc., one or more compounds are preferably used.

The compound represented by general formula (X-2) used in the liquid crystal composition of the present invention is preferably a compound represented by general formula (X-2-1).

[Chem. 104]

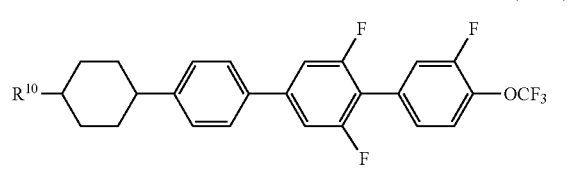
(X-2-1)

(In the formula, $R^{10}$ represents an alkyl group having 1 to 5 carbon atoms, an alkenyl group having 2 to 5 carbon atoms, or an alkoxy group having 1 to 4 carbon atoms.)

The compounds that can be used in combination are not particularly limited. One or more compounds are preferably used and one to three or more compounds are more preferably used in view of solubility at low temperature, transition temperature, electrical reliability, birefringence, etc.

The content of the compound represented by general formula (X-2-1) relative to the total amount of the liquid crystal composition of the present invention is preferably 3% by mass or more, more preferably 6% by mass or more, and most preferably 9% by mass or more. In view of solubility at low temperature, transition temperature, electrical reliability, etc., the maximum content is preferably 20% by mass or less, more preferably 16% by mass or less, yet more preferably 12% by mass or less, and most preferably 10% by mass or less.

The compounds represented by general formula (X-2-1) used in the liquid crystal composition of the present invention are specifically preferably compounds represented by formula (39.1) to formula (39.4). Among these, the compound represented by formula (39.2) is preferably contained.

[Chem. 105]

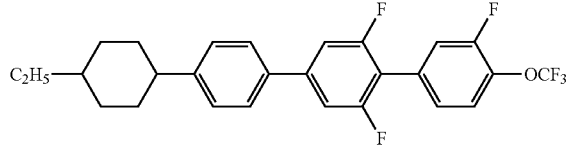
(39.1)

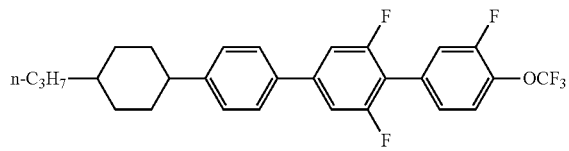
(39.2)

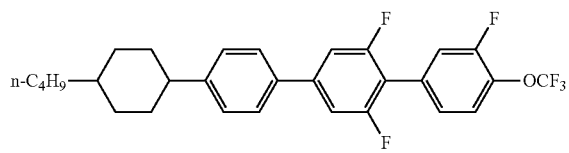
(39.3)

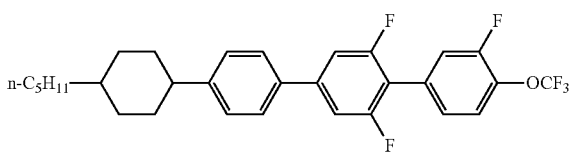
(39.4)

The compound represented by general formula (X-2) used in the liquid crystal composition of the present invention is preferably a compound represented by general formula (X-2-2).

[Chem. 106]

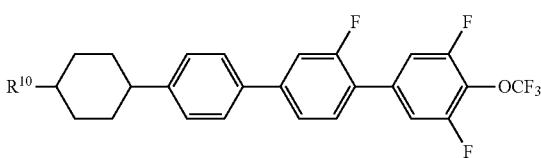
(X-2-2)

(In the formula, $R^{10}$ represents an alkyl group having 1 to 5 carbon atoms, an alkenyl group having 2 to 5 carbon atoms, or an alkoxy group having 1 to 4 carbon atoms.)

The compounds that can be used in combination are not particularly limited. In view of solubility at low temperature, transition temperature, electrical reliability, birefringence, etc., one or more compounds are preferably used.

The content of the compound represented by general formula (X-2-2) relative to the total amount of the liquid crystal composition of the present invention is preferably 3% by mass or more, more preferably 6% by mass or more, and most preferably 9% by mass or more. Considering solubility at low temperature, transition temperature, electrical reliability, etc., the maximum content is preferably 20% by mass or less, more preferably 16% by mass or less, yet more preferably 12% by mass or less, and most preferably 10% by mass or less.

The compounds represented by general formula (X-2-2) used in the liquid crystal composition of the present invention are specifically preferably compounds represented by formula (40.1) to formula (40.4). Among these, the compound represented by formula (40.2) is preferably contained.

[Chem. 107]

(40.1)
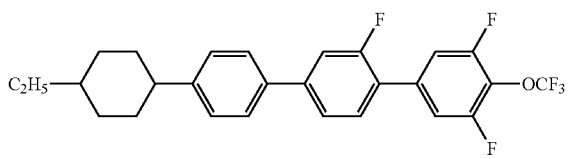

(40.2)
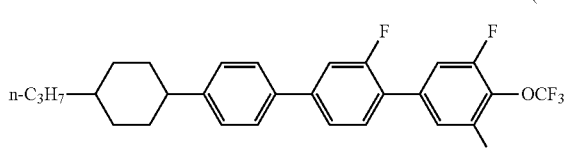

(40.3)
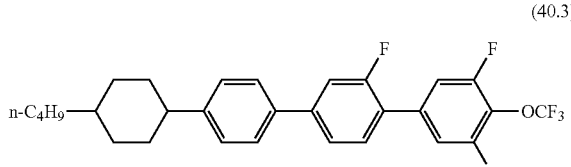

(40.4)

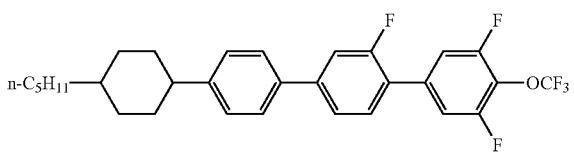

The compound represented by general formula (X) is preferably a compound represented by general formula (X-3).

[Chem. 108]

(X-3)

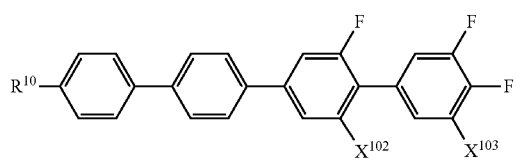

(In the formula, $X^{102}$ and $X^{103}$ each independently represent a fluorine atom or a hydrogen atom, $R^{10}$ represents an alkyl group having 1 to 5 carbon atoms, an alkenyl group having 2 to 5 carbon atoms, or an alkoxy group having 1 to 4 carbon atoms.)

The compounds that can be used in combination are not particularly limited. Considering solubility at low temperature, transition temperature, electrical reliability, birefringence, etc., one or more compounds are preferably used.

The compound represented by general formula (X-3) used in the liquid crystal composition of the present invention is preferably a compound represented by general formula (X-3-1).

[Chem. 109]

(X-3-1)

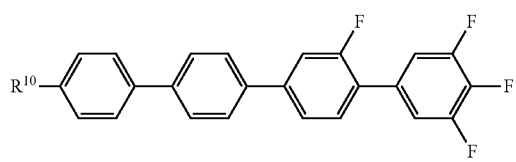

(In the formula, $R^{10}$ represents an alkyl group having 1 to 5 carbon atoms, an alkenyl group having 2 to 5 carbon atoms, or an alkoxy group having 1 to 4 carbon atoms.)

The compounds that can be used in combination are not particularly limited. Considering solubility at low temperature, transition temperature, electrical reliability, birefringence, etc., one or more compounds are preferably used.

The content of the compound represented by general formula (X-3-1) relative to the total amount of the liquid crystal composition of the present invention is preferably 1% by mass or more, more preferably 2% by mass or more, and most preferably 3% by mass or more. Considering solubility at low temperature, transition temperature, electrical reliability, etc., the maximum content is preferably 10% by mass or less, more preferably 8% by mass or less, yet more preferably 6% by mass or less, and most preferably 4% by mass or less.

The compounds represented by general formula (X-3-1) used in the liquid crystal composition of the present invention are specifically preferably compounds represented by formula (41.1) to formula (41.4). Among these, the compound represented by formula (41.2) is preferably contained.

[Chem. 110]

(41.1)

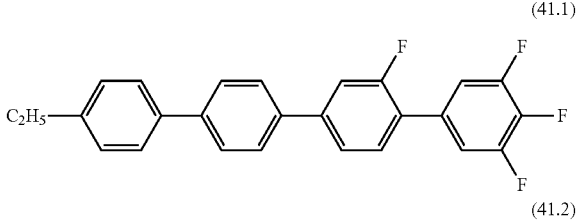

(41.2)

(41.3)

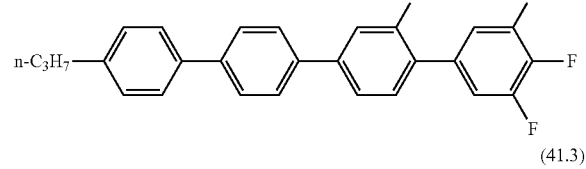

(41.4)

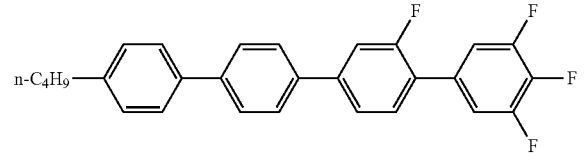

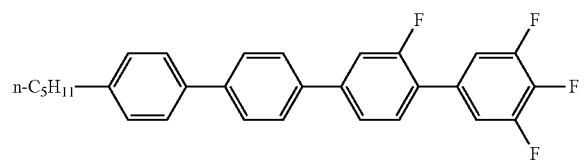

The compound represented by general formula (X) is preferably a compound represented by general formula (X-4).

[Chem. 111]

(X-4)

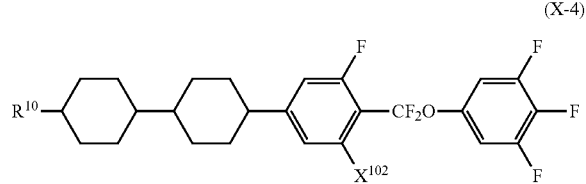

(In the formula, $X^{102}$ represents a fluorine atom or a hydrogen atom and $R^{10}$ represents an alkyl group having 1 to 5 carbon atoms, an alkenyl group having 2 to 5 carbon atoms, or an alkoxy group having 1 to 4 carbon atoms.)

The compounds that can be used in combination are not particularly limited. One or more compounds are preferably used and one to three or more compounds are more preferably used considering solubility at low temperature, transition temperature, electrical reliability, birefringence, etc.

The compound represented by general formula (X-4) used in the liquid crystal composition of the present invention is preferably a compound represented by general formula (X-4-1).

[Chem. 112]

(X-4-1)

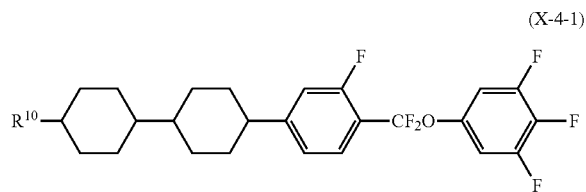

(In the formula, $R^{10}$ represents an alkyl group having 1 to 5 carbon atoms, an alkenyl group having 2 to 5 carbon atoms, or an alkoxy group having 1 to 4 carbon atoms.)

The compounds that can be used in combination are not particularly limited. One or more compounds are preferably used and one to three or more compounds are more preferably used considering solubility at low temperature, transition temperature, electrical reliability, birefringence, etc.

The content of the compound represented by general formula (X-4-1) relative to the total amount of the liquid crystal composition of the present invention is preferably 2% by mass or more, more preferably 5% by mass or more, and most preferably 10% by mass or more. Considering solubility at low temperature, transition temperature, electrical reliability, etc., the maximum content is preferably 20% by mass or less, more preferably 17% by mass or less, yet more preferably 15% by mass or less, and most preferably 13% by mass or less.

The compounds represented by general formula (X-4-1) used in the liquid crystal composition of the present invention are specifically preferably compounds represented by formula (42.1) to formula (42.4). Among these, the compound represented by formula (42.3) is preferably contained.

[Chem. 113]

(42.1)

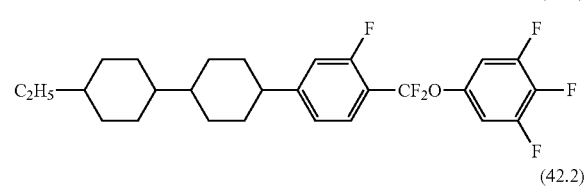

(42.2)

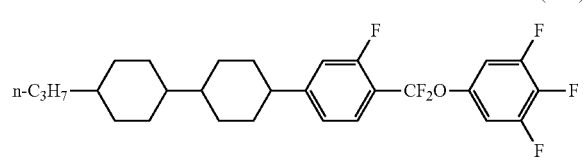

(42.3)

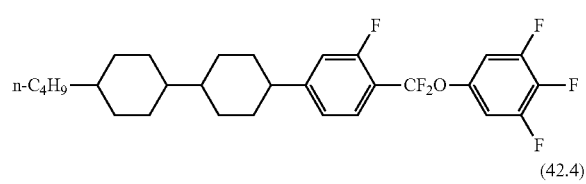

(42.4)

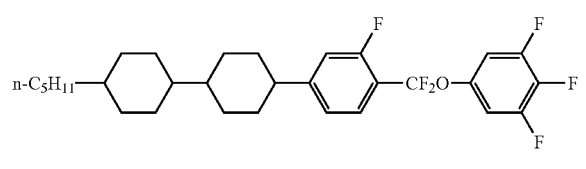

The compound represented by general formula (X) is preferably a compound represented by general formula (X-5).

[Chem. 114]

(X-5)

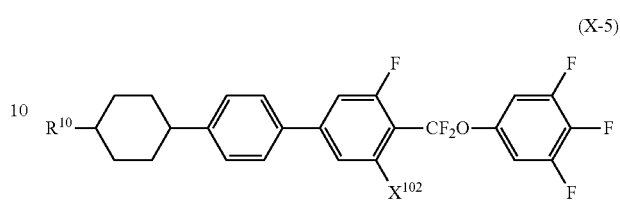

(In the formula, $X^{102}$ represents a fluorine atom or a hydrogen atom and $R^{10}$ represents an alkyl group having 1 to 5 carbon atoms, an alkenyl group having 2 to 5 carbon atoms, or an alkoxy group having 1 to 4 carbon atoms.)

The compounds that can be used in combination are not particularly limited. One or more compounds are preferably used and one to three or more compounds are more preferably used considering solubility at low temperature, transition temperature, electrical reliability, birefringence, etc.

The compound represented by general formula (X-5) used in the liquid crystal composition of the present invention is preferably a compound represented by general formula (X-5-1).

[Chem. 115]

(X-5-1)

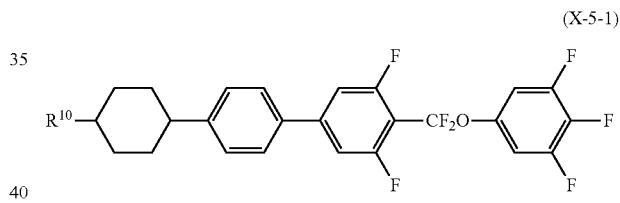

(In the formula, $R^{10}$ represents an alkyl group having 1 to 5 carbon atoms, an alkenyl group having 2 to 5 carbon atoms, or an alkoxy group having 1 to 4 carbon atoms.)

The compounds that can be used in combination are not particularly limited. One or more compounds are preferably used and one to three or more compounds are more preferably used considering solubility at low temperature, transition temperature, electrical reliability, birefringence, etc.

The compounds represented by general formula (X-5-1) used in the liquid crystal composition of the present invention are specifically preferably compounds represented by formula (43.1) to formula (43.4). Among these, the compound represented by formula (43.2) is preferably contained.

[Chem. 116]

(43.1)

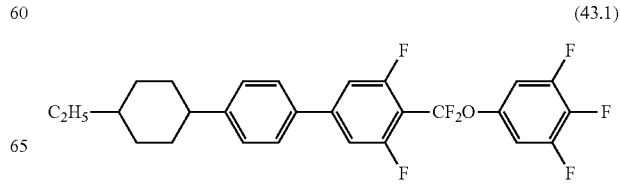

-continued (43.2)
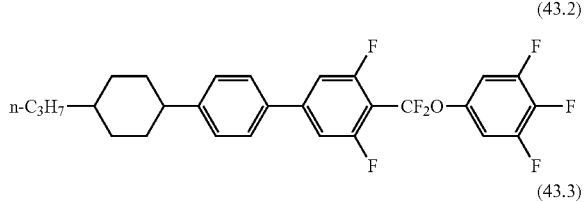

(43.3)
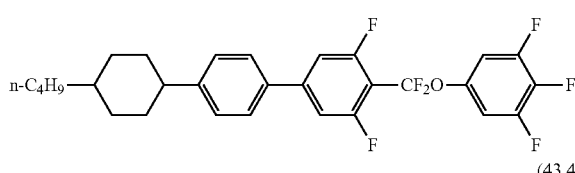

(43.4)
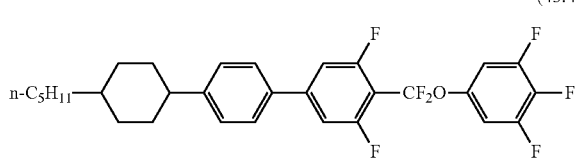

The compound represented by general formula (X) used in the liquid crystal composition of the present invention is preferably a compound represented by general formula (X-6).

[Chem. 117]

(X-6)
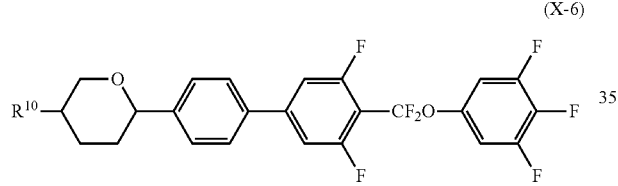

(In the formula, $R^{10}$ represents an alkyl group having 1 to 5 carbon atoms, an alkenyl group having 2 to 5 carbon atoms, or an alkoxy group having 1 to 4 carbon atoms.)

The compounds that can be used in combination are not particularly limited. One or more compounds are preferably used considering solubility at low temperature, transition temperature, electrical reliability, birefringence, etc.

The content of the compound represented by general formula (X-6) has an upper limit and a lower limit for each embodiment in view of the properties such as solubility at low temperature, transition temperature, electrical reliability, birefringence, etc. The lower limit of the content relative to the total amount of the liquid crystal composition of the present invention is, for example, 4% in one embodiment of the present invention, 5% in another embodiment, 6% in another embodiment, 8% in another embodiment, 9% in another embodiment, 11% in another embodiment, 14% in another embodiment, and 18% in another embodiment.

The upper limit of the content is, for example, 30% in one embodiment of the present invention, 20% in another embodiment, 13% in another embodiment, 10% in another embodiment, 7% in another embodiment, and 3% in another embodiment.

The compounds represented by general formula (X-6) used in the liquid crystal composition of the present invention are specifically preferably compounds represented by formula (44.1) to formula (44.4). Among these, the compound represented by formula (44.1) and/or the compound represented by formula (44.2) is preferably contained.

[Chem. 118]

(44.1)
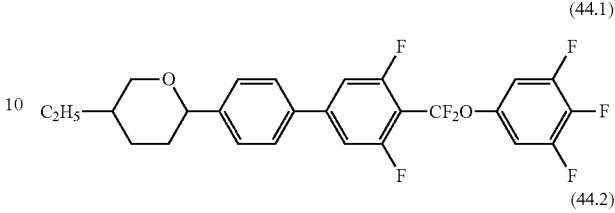

(44.2)
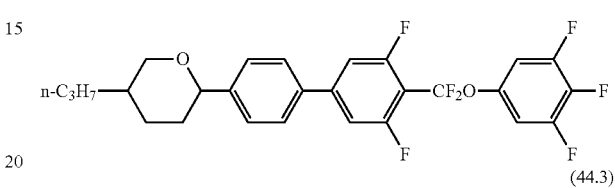

(44.3)
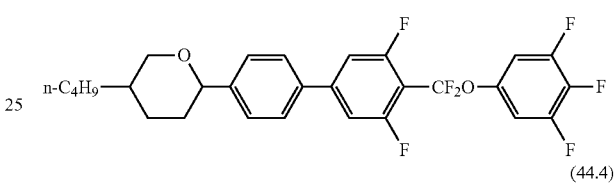

(44.4)

The compound represented by represented by general formula (L) or the compound represented by general formula (x) is preferably a compound selected from a group represented by general formula (XI).

[Chem. 119]

(XI)
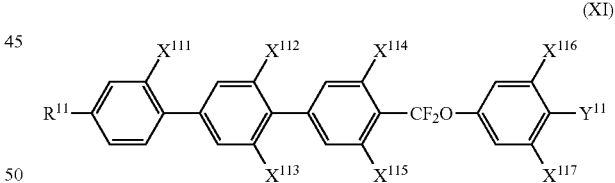

(In the formula, $X^{111}$ to $X^{117}$ each independently represent a fluorine atom or a hydrogen atom, at least one of $X^{111}$ to $X^{117}$ represents a fluorine atom, $R^{11}$ represents an alkyl group having 1 to 5 carbon atoms, an alkenyl group having 2 to 5 carbon atoms, or an alkoxy group having 1 to 4 carbon atoms, and $Y^{11}$ represents a fluorine atom or —$OCF_3$.)

The compounds that can be used in combination are not particularly limited. Considering solubility at low temperature, transition temperature, electrical reliability, birefringence, etc., one to three or more compounds are preferably used.

The content of the compound represented by general formula (XI) has an upper limit and a lower limit for each embodiment in view of the properties such as solubility at low temperature, transition temperature, electrical reliability, birefringence, etc. The lower limit of the content relative to the total amount of the liquid crystal composition of the present invention is, for example, 2% in one embodiment, 4% in another embodiment, 5% in another embodiment, 7% in another embodiment, 9% In another embodiment, 10% in another embodiment, 12% in another embodiment, 13% in another embodiment, 15% in another embodiment, and 18% in another embodiment.

The upper limit of the content is, for example, 30% in one embodiment, 25% in another embodiment, 20% in another embodiment, 15% in another embodiment, 10% in another embodiment, and 5% in anther embodiment.

In the case where the liquid crystal composition of the present invention is to be used in a liquid crystal display device with a small cell gap, it is suitable to appropriately adjust the content of the compound represented by represented by general formula (XI) to a relatively high level. In the case where the liquid crystal composition is to be used in a liquid crystal display device with low drive voltage, it is suitable to appropriately adjust the content of the compound represented by general formula (XI) to a relatively high level. In the case where the liquid crystal composition is to be used in a liquid crystal display device for use in low-temperature environments, it is suitable to adjust the content of the compound represented by general formula (XI) to a relatively low level. In the case where the liquid crystal composition is to be used in a liquid crystal display device with high response speed, it is suitable to adjust the content of the compound represented by general formula (XI) to a relatively low level.

The compound represented by general formula (XI) used in the liquid crystal composition of the present invention is preferably a compound represented by general formula (XI-1).

[Chem. 120]

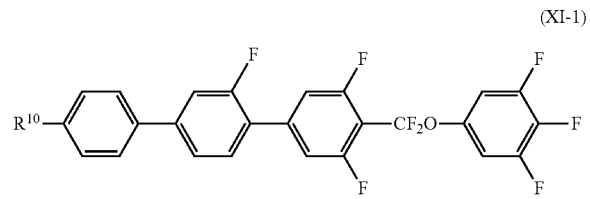

(XI-1)

(In the formula, $R^{11}$ represents an alkyl group having 1 to 5 carbon atoms, an alkenyl group having 2 to 5 carbon atoms, or an alkoxy group having 1 to 4 carbon atoms.)

The compounds that can be used in combination are not particularly limited. Considering solubility at low temperature, transition temperature, electrical reliability, birefringence, etc., compounds are appropriately combined for each embodiment. For example, one compound is used in one embodiment of the present invention, two compounds are used in another embodiment, and three or more compounds are used in another embodiment.

The content of the compound represented by general formula (XI-1) relative to the total amount of the liquid crystal composition of the present invention is preferably 1% by mass or more, more preferably 3% by mass or more, yet more preferably 4% by mass or more, yet more preferably 6% by mass or more, and most preferably 8% by mass or more. Considering the solubility at low temperature, transition temperature, electrical reliability, etc., the maximum content is preferably 30% by mass or less, more preferably 28% by mass or less, yet more preferably 26% by mass or less, and most preferably 24% by mass or less.

The compounds represented by general formula (XI-1) used in the liquid crystal composition of the present invention are specifically preferably compounds represented by formula (45.1) to formula (45.4). Among these, the compounds represented by formula (45.2) to formula (45.4) are preferably contained and the compound represented by formula (45.2) is more preferably contained.

[Chem. 121]

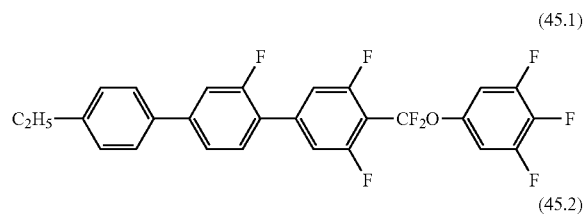

(45.1)

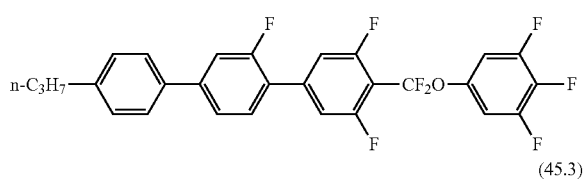

(45.2)

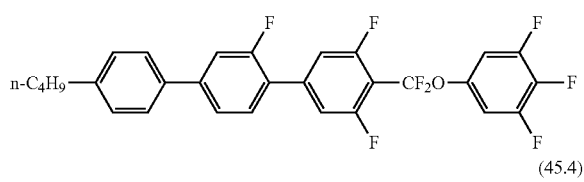

(45.3)

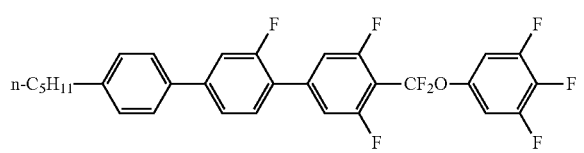

(45.4)

The compound represented by general formula (L) or the compound represented by general formula (X) is preferably a compound selected from a group represented by general formula (XII).

[Chem. 122]

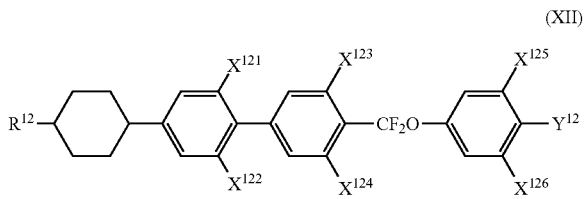

(XII)

(In the formula, $X^{121}$ to $X^{126}$ each independently represent a fluorine atom or a hydrogen atom, $R^{12}$ represents an alkyl group having 1 to 5 carbon atoms, an alkenyl group having 2 to 5 carbon atoms, or an alkoxy group having 1 to 4 carbon atoms, and $Y^{12}$ represents a fluorine atom or —$OCF_3$.)

The compounds that can be used in combination are not particularly limited. Considering solubility at low temperature, transition temperature, electrical reliability, birefringence, etc., one to three or more compounds are preferably used and one to four or more compounds are more preferably used.

The compound represented by general formula (XII) used in the liquid crystal composition of the present invention is preferably a compound represented by general formula (XII-1).

[Chem. 123]

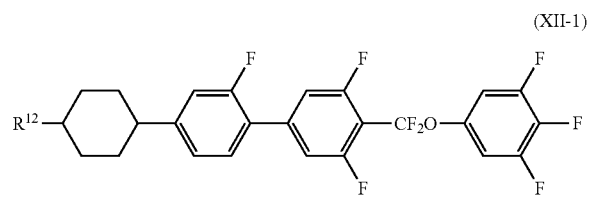

(XII-1)

(In the formula, $R^{12}$ represents an alkyl group having 1 to 5 carbon atoms, an alkenyl group having 2 to 5 carbon atoms, or an alkoxy group having 1 to 4 carbon atoms.)

The compounds that can be used in combination are not particularly limited. In view of solubility at low temperature, transition temperature, electrical reliability, birefringence, etc., one or more compounds are preferably used and one to three or more compounds are more preferably used.

The content of the compound represented by general formula (XII-1) relative to the total amount of the liquid crystal composition of the present invention is preferably 1% by mass or more, more preferably 2% by mass or more, yet more preferably 3% by mass or more, and most preferably 4% by mass or more. Considering solubility at low temperature, transition temperature, electrical reliability, etc., the maximum content is preferably 15% by mass or less, more preferably 10% by mass or less, yet more preferably 8% by mass or less, and most preferably 6% by mass or less.

The compounds represented by general formula (XII-1) used in the liquid crystal composition of the present invention are preferably compounds represented by formula (46.1) to formula (46.4). Among these, the compounds represented by formula (46.2) to formula (46.4) are preferably contained.

[Chem. 124]

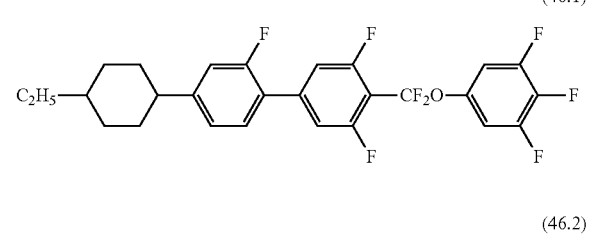

(46.1)

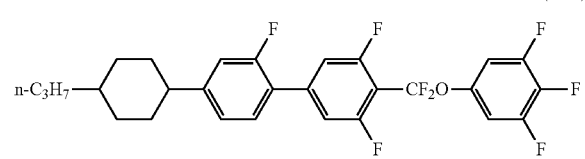

(46.2)

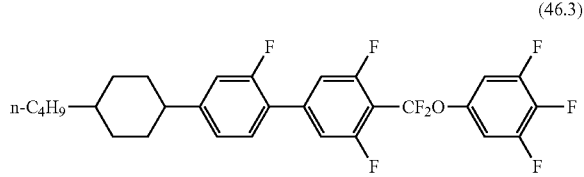

(46.3)

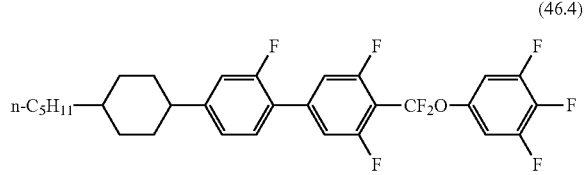

(46.4)

The compound represented by general formula (XII) is preferably a compound represented by general formula (XII-2).

[Chem. 125]

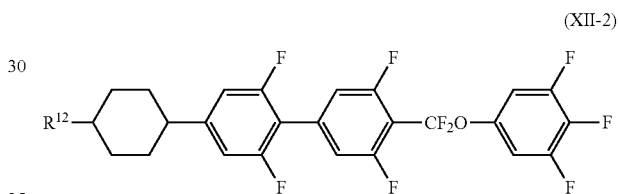

(XII-2)

(In the formula, $R^{12}$ represents an alkyl group having 1 to 5 carbon atoms, an alkenyl group having 2 to 5 carbon atoms, or an alkoxy group having 1 to 4 carbon atoms.)

The compounds that can be used in combination are not particularly limited. Considering solubility at low temperature, transition temperature, electrical reliability, birefringence, etc., one or more compounds are preferably used and one to three or more compounds are more preferably used.

The content of the compound represented by general formula (XII-2) relative to the total amount of the liquid crystal composition of the present invention is preferably 1% by mass or more, more preferably 3% by mass or more, yet more preferably 4% by mass or more, still more preferably 6% by mass or more, and most preferably 9% by mass or more. Considering solubility at low temperature, transition temperature, electrical reliability, etc., the maximum content is preferably 20% by mass or less, more preferably 17% by mass or less, yet more preferably 15% by mass or less, and most preferably 13% by mass or less.

The compounds represented by general formula (XII-2) used in the liquid crystal composition of the present invention are specifically preferably compounds represented by formula (47.1) to formula (47.4). Among these, the compounds represented by formula (47.2) to formula (47.4) are preferably contained.

[Chem. 126]

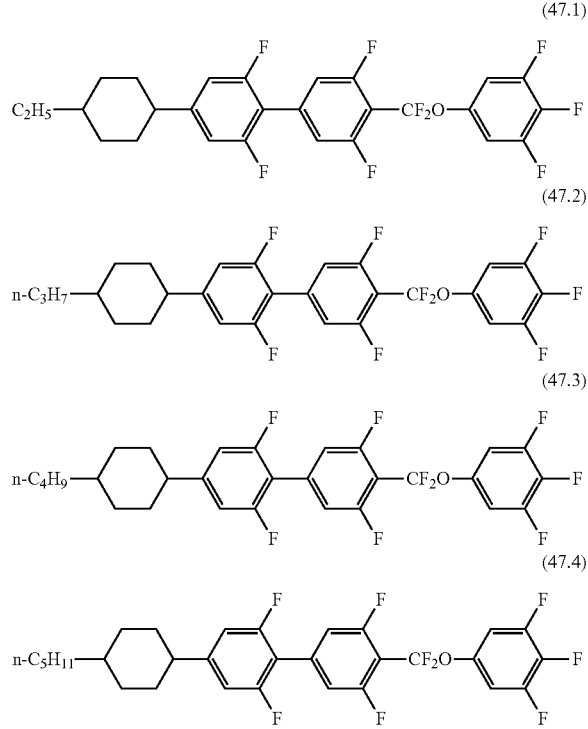

The compound represented by general formula (M) is preferably a compound selected from a group of compounds represented by general formula (XIII).

[Chem. 127]

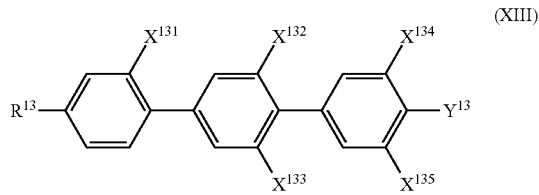

(In the formula, $X^{131}$ to $X^{135}$ each independently represent a fluorine atom or a hydrogen atom, $R^{13}$ represents an alkyl group having 1 to 5 carbon atoms, an alkenyl group having 2 to 5 carbon atoms, or an alkoxy group having 1 to 4 carbon atoms, and $Y^{13}$ represents a fluorine atom or —OCF$_3$.)

The number of compounds that can be used in combination is not particularly limited. One or two compounds selected from these compounds are preferably contained, one to three compounds selected from these compounds are more preferably contained, and one to four compounds selected from these compounds are most preferably contained.

The content of the compound represented by general formula (XIII) has an upper limit and a lower limit for each embodiment in view of properties such as solubility at low temperature, transition temperature, electrical reliability, and birefringence. For example, the lower limit of the content relative to the total amount of the liquid crystal composition of the present invention is 2% in one embodiment of the present invention, 4% in another embodiment, 5% in another embodiment, 7% in another embodiment, 9% in another embodiment, 11% in another embodiment, 13% in another embodiment, 14% in another embodiment, 16% in another embodiment, and 20% in another embodiment.

The upper limit of the content is, for example, 30% in one embodiment of the present invention, 25% in another embodiment, 20% in another embodiment, 15% in another embodiment, 10% in another embodiment, and 5% in another embodiment.

In the case where the liquid crystal composition of the present invention is to be used in a liquid crystal display device with a small cell gap, it is suitable to appropriately adjust the content of the compound represented by represented by general formula (XIII) to a relatively high level. In the case where the liquid crystal composition is to be used in a liquid crystal display device with low drive voltage, it is suitable to appropriately adjust the content of the compound represented by general formula (XIII) to a relatively high level. In the case where the liquid crystal composition is to be used in a liquid crystal display device for use in low-temperature environments, it is suitable to adjust the content of the compound represented by general formula (XIII) to a relatively low level. In the case where the liquid crystal composition is to be used in a liquid crystal display device with high response speed, it is suitable to adjust the content of the compound represented by general formula (XIII) to a relatively low level.

The compound represented by general formula (XIII) is preferably a compound represented by general formula (XIII-1).

[Chem. 128]

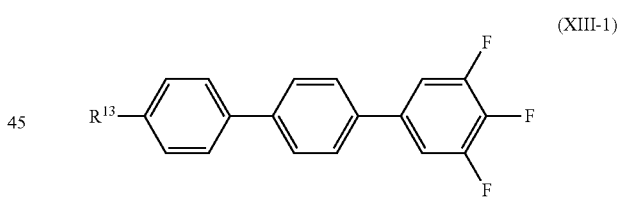

(In the formula, $R^{13}$ represents an alkyl group having 1 to 5 carbon atoms, an alkenyl group having 2 to 5 carbon atoms, or an alkoxy group having 1 to 4 carbon atoms.)

The content of the compound represented by general formula (XIII-1) relative to the total amount of the liquid crystal composition of the present invention is preferably 1% by mass or more, more preferably 3% by mass or more, yet more preferably 5% by mass or more, and most preferably 10% by mass or more. The maximum content is preferably 25% by mass or less, more preferably 20% by mass or less, and most preferably 15% by mass or less.

The compounds represented by general formula (XIII-1) are more preferably compounds represented by formula (48.1) to formula (48.4). The compound represented by formula (48.2) is preferable.

[Chem. 129]

(48.1)
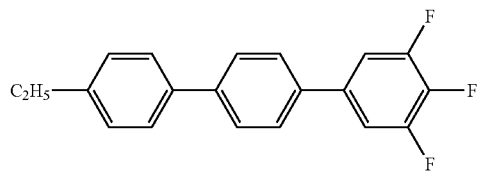

(48.2)
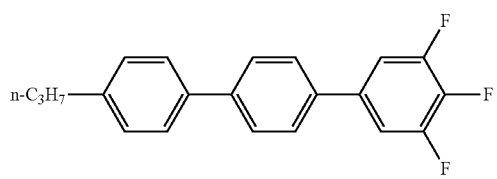

(48.3)
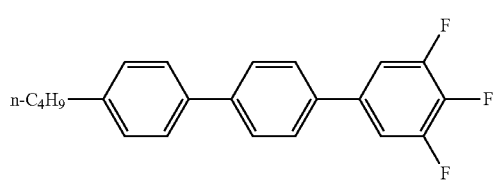

(48.4)
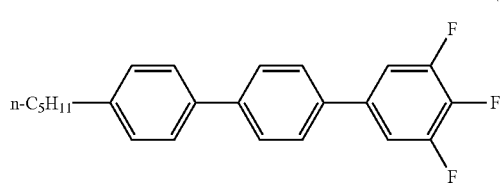

The compound represented by general formula (XIII) is preferably a compound represented by general formula (XIII-2).

[Chem. 130]

(XIII-2)
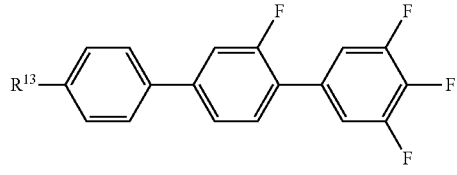

(In the formula, $R^{13}$ represents an alkyl group having 1 to 5 carbon atoms, an alkenyl group having 2 to 5 carbon atoms, or an alkoxy group having 1 to 4 carbon atoms.)

The number of compounds that can be used in combination is not particularly limited. One or more of these compounds are preferably contained.

The content of the compound represented by general formula (XIII-2) relative to the total amount of the liquid crystal composition of the present invention is preferably 5% by mass or more, more preferably 6% by mass or more, yet more preferably 8% by mass or more, and most preferably 10% by mass or more. The maximum content is preferably 25% by mass or less, more preferably 20% by mass or less, and most preferably 15% by mass or less.

The compounds represented by general formula (XIII-2) are preferably compounds represented by formula (49.1) to formula (49.4). The compound represented by formula (49.1) and/or the compound represented by formula (49.2) is preferable.

[Chem. 131]

(49.1)
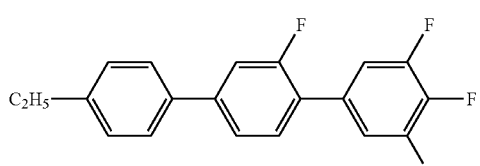

(49.2)
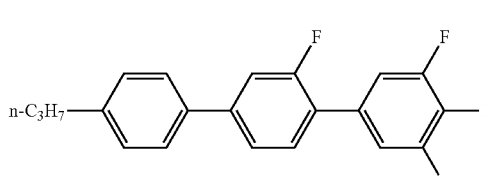

(49.3)
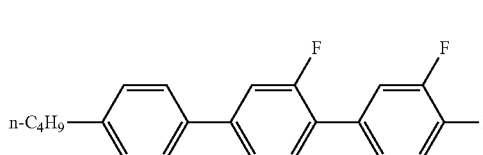

(49.4)
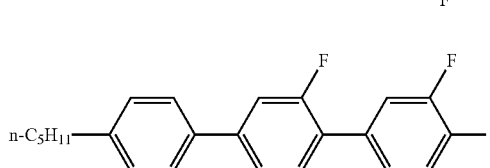

The compound represented by general formula (XIII) is preferably a compound represented by general formula (XIII-3).

[Chem. 132]

(XIII-3)
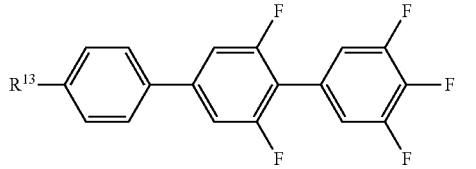

(In the formula, $R^{13}$ represents an alkyl group having 1 to 5 carbon atoms, an alkenyl group having 2 to 5 carbon atoms, or an alkoxy group having 1 to 4 carbon atoms.)

The number of compounds that can be used in combination is not particularly limited. One or two selected from these compounds are preferably contained.

The content of the compound represented by general formula (XIII-3) relative to the total amount of the liquid crystal composition of the present invention is preferably 2% by mass or more, more preferably 4% by mass or more, yet more preferably 9% by mass or more, and most preferably 11% by mass or more. The maximum content is preferably 20% by mass or less, more preferably 17% by mass or less, and most preferably 14% by mass or less.

The compounds represented by general formula (XIII-3) are preferably compounds represented by formula (50.1) to formula (50.4). The compound represented by formula (50.1) and/or the compound represented by formula (50.2) is preferable.

[Chem. 133]

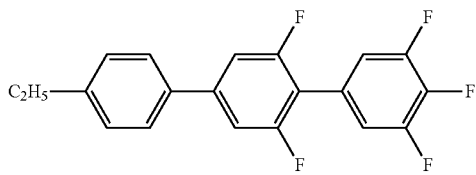

(50.1)

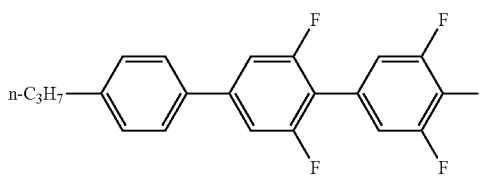

(50.2)

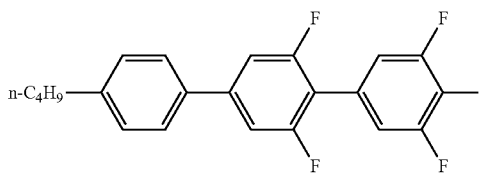

(50.3)

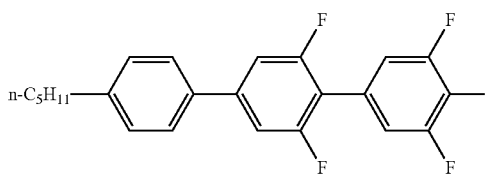

(50.4)

The compound represented by general formula (M) is preferably a compound selected from a group of compounds represented by general formula (XIV).

[Chem. 134]

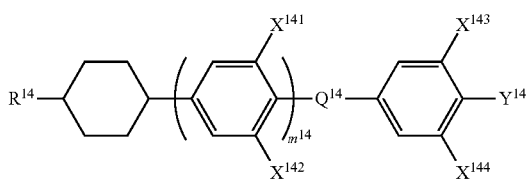

(XIV)

(In the formula, $R^{14}$ represents an alkyl group having 1 to 7 carbon atoms, an alkenyl group having 2 to 7 carbon atoms, or an alkoxy group having 1 to 7 carbon atoms, $X^{141}$ to $X^{144}$ each independently represent a fluorine atom or a hydrogen atom, $Y^{14}$ represents a fluorine atom, a chlorine atom, or —$OCF_3$, $Q^{14}$ represents a single bond, —COO—, or —$CF_2O$—, and $m^{14}$ represents 0 or 1.)

The number of the compounds that can be used in combination is not limited. An appropriate combination is used for each embodiment in view of solubility at low temperature, transition temperature, electrical reliability, birefringence, etc. For example, one compound is used in one embodiment of the present invention. Two compounds are used in another embodiment of the present invention. Three compounds are used in another embodiment of the present invention. Four compounds are used in another embodiment of the present invention. Five compounds are used in another embodiment of the present invention. Six or more compounds are used in another embodiment of the present invention.

The content of the compound represented by general formula (XIV) has an upper limit and a lower limit for each embodiment in view of the properties such as solubility at low temperature, transition temperature, electrical reliability, and birefringence. The lower limit of the content relative to the total amount of the liquid crystal composition of the present invention is, for example, 3% in one embodiment of the present invention, 7% in another embodiment, 8% in another embodiment, 11% in another embodiment, 12% in another embodiment, 16% in another embodiment, 18% in another embodiment, 19% in another embodiment, 22% in another embodiment, and 25% in another embodiment.

The upper limit of the content is, for example 40% in one embodiment of the present invention, 35% in another embodiment, 30% in another embodiment, 25% in another embodiment, 20% in another embodiment, and 15% in another embodiment.

In the case where the liquid crystal composition of the present invention is to be used in a liquid crystal display device with low drive voltage, it is suitable to appropriately adjust the content of the compound represented by general formula (XIV) to a relatively high level. In the case where the liquid crystal composition is to be used in a liquid crystal display device with high response speed, it is suitable to adjust the content of the compound represented by general formula (XIV) to a relatively low level.

The compound represented by general formula (XIV) is preferably a compound represented by general formula (XIV-1).

[Chem. 135]

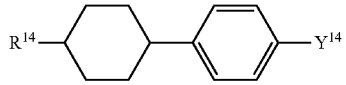

(XIV-1)

(In the formula, $R^{14}$ represents an alkyl group having 1 to 7 carbon atoms, an alkenyl group having 2 to 7 carbon atoms, or an alkoxy group having 1 to 7 carbon atoms and $Y^{14}$ represents a fluorine atom, a chlorine atom, or —$OCF_3$.)

The number of compounds that can be used in combination is not particularly limited. Considering solubility at low temperature, transition temperature, electrical reliability, birefringence, etc., one to three compounds are preferably used.

The compound represented by general formula (XIV-1) is preferably a compound represented by general formula (XIV-1-1).

[Chem. 136]

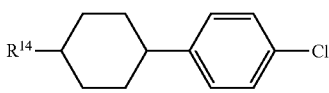
(XIV-1-1)

(In the formula, $R^{14}$ represents an alkyl group having 1 to 7 carbon atoms, an alkenyl group having 2 to 7 carbon atoms, or an alkoxy group having 1 to 7 carbon atoms.)

The content of the compound represented by general formula (XIV-1) relative to the total amount of the liquid crystal composition of the present invention is preferably 2% by mass or more, more preferably 4% by mass or more, yet more preferably 7% by mass or more, still more preferably 10% by mass or more, and most preferably 18% by mass or more. Considering the solubility at low temperature, transition temperature, electrical reliability, etc., the maximum content is preferably 30% by mass or less, more preferably 27% by mass or less, yet more preferably 24% by mass or less, and most preferably less than 21% by mass.

The compounds represented by general formula (XIV-1-1) are specifically preferably compounds represented by formula (51.1) to formula (51.4). Preferably, the compound represented by formula (51.1) is contained.

[Chem. 137]

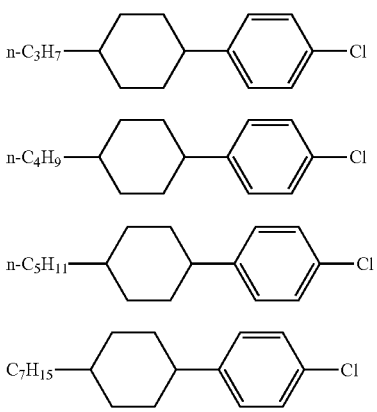

(51.1)
(51.2)
(51.3)
(51.4)

The compound represented by general formula (XIV-1) is preferably a compound represented by general formula (XIV-1-2).

[Chem. 138]

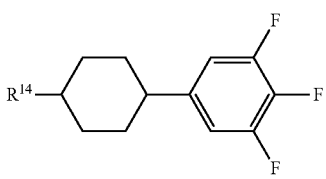
(XIV-1-2)

(In the formula, $R^{14}$ represents an alkyl group having 1 to 7 carbon atoms, an alkenyl group having 2 to 7 carbon atoms, or an alkoxy group having 1 to 7 carbon atoms.)

The content of the compound represented by general formula (XIV-1-2) relative to the total amount of the liquid crystal composition of the present invention is preferably 1% by mass or more, more preferably 3% by mass or more, yet more preferably 5% by mass or more, and most preferably 7% by mass or more. Considering the solubility at low temperature, transition temperature, electrical reliability, etc., the maximum content is preferably 15% by mass or less, more preferably 13% by mass or less, yet more preferably 11% by mass or less, and most preferably less than 9% by mass.

The compounds represented by general formula (XIV-1-2) are specifically preferably compounds represented by formula (52.1) to formula (52.4). Of these, the compound represented by formula (52.4) is preferably contained.

[Chem. 139]

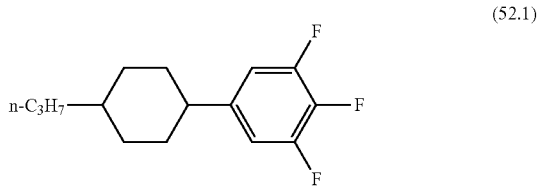
(52.1)

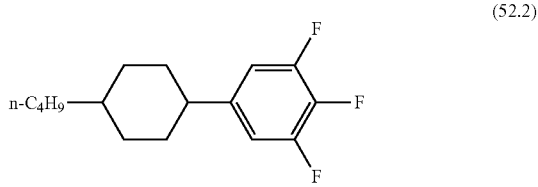
(52.2)

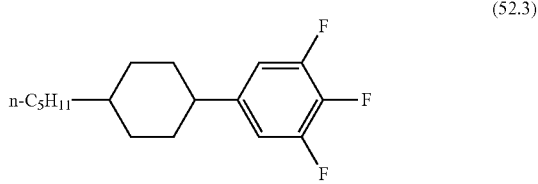
(52.3)

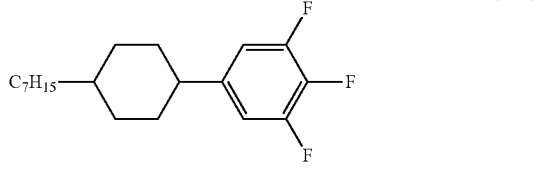
(52.4)

The compound represented by general formula (XIV) is preferably a compound represented by general formula (XIV-2).

[Chem. 140]

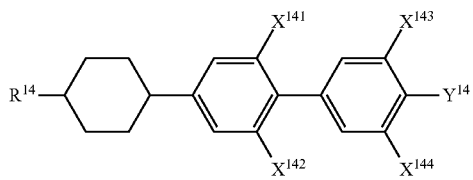
(XIV-2)

(In the formula, $R^{14}$ represents an alkyl group having 1 to 5 carbon atoms, an alkenyl group having 2 to 5 carbon atoms, or an alkoxy group having 1 to 4 carbon atoms, $X^{141}$ to $X^{144}$ each independently represent a fluorine atom or a hydrogen atom, and $Y^{14}$ represents a fluorine atom, a chlorine atom, or —$OCF_3$.)

The number of compounds that can be used in combination is not particularly limited. In view of solubility at low temperature, transition temperature, electrical reliability, birefringence, etc., an appropriate combination is used for each embodiment. For example, one compound is used in one embodiment of the present invention. Two compounds are combined in another embodiment of the present invention. Three compounds are used in another embodiment of the present invention. Four compounds are used in another embodiment of the present invention. Five or more compounds are used in another embodiment of the present invention.

The content of the compound represented by general formula (XIV-2) has an upper limit and a lower limit for each embodiment in view of the properties such as solubility at low temperature, transition temperature, electrical reliability, and birefringence. The lower limit of the content relative to the total amount of the liquid crystal composition of the present invention is, for example, 3% in one embodiment of the present invention, 7% in another embodiment, 8% in another embodiment, 10% in another embodiment, 11% in another embodiment, 12% in another embodiment, 18% in another embodiment, 19% in another embodiment, 21% in another embodiment, and 22% in another embodiment.

The upper limit of the content is, for example, 40% in one embodiment of the present invention, 35% in another embodiment, 25% in another embodiment, 20% in another embodiment, 15% in another embodiment, and 10% in another embodiment.

In the case where the liquid crystal composition of the present invention is to be used for a liquid crystal display device with a low drive voltage, it is suitable to adjust the content of the compound represented by general formula (XIV-2) to a relatively high value. In the case of a liquid crystal composition for use in a liquid crystal display device with high response speed, it is suitable to adjust the content of the compound represented by general formula (XIV-2) to a relatively low value.

The compound represented by general formula (XIV-2) is preferably a compound represented by general formula (XIV-2-1).

[Chem. 141]

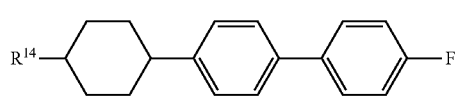

(XIV-2-1)

(In the formula, $R^{14}$ represents an alkyl group having 1 to 5 carbon atoms, an alkenyl group having 2 to 5 carbon atoms, or an alkoxy group having 1 to 4 carbon atoms.)

The content of the compound represented by general formula (XIV-2-1) relative to the total amount of the liquid crystal composition of the present invention is preferably 1% by mass or more, more preferably 3% by mass or more, yet more preferably, still more preferably 5% by mass or more, and most preferably 7% by mass or more. Considering the solubility at low temperature, transition temperature, electrical reliability, etc., the maximum content is preferably 15% by mass or less, more preferably 13% by mass or less, yet more preferably 11% by mass or less, and most preferably less than 9% by mass.

The compounds represented by general formula (XIV-2-1) are specifically preferably compounds represented by formula (53.1) to formula (53.4). Of these, the compound represented by formula (53.4) is preferably contained.

[Chem. 142]

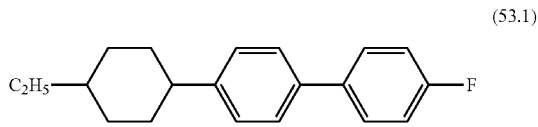

(53.1)

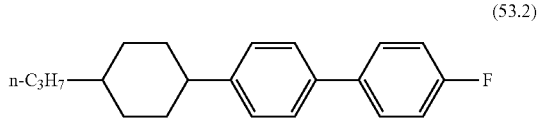

(53.2)

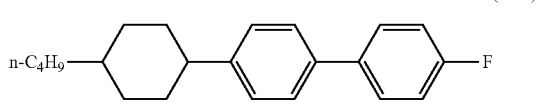

(53.3)

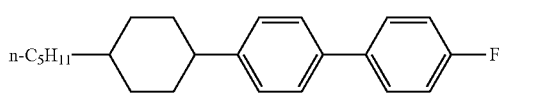

(53.4)

The compound represented by general formula (XIV-2) is preferably a compound represented by general formula (XIV-2-2).

[Chem. 143]

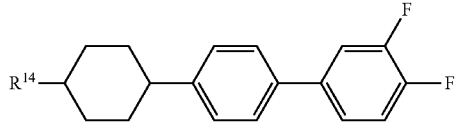

(XIV-2-2)

(In the formula, $R^{14}$ represents an alkyl group having 1 to 5 carbon atoms, an alkenyl group having 2 to 5 carbon atoms, or an alkoxy group having 1 to 4 carbon atoms.)

The content of the compound represented by general formula (XIV-2-2) relative to the total amount of the liquid crystal composition of the present invention is preferably 3% by mass or more, more preferably 6% by mass or more, yet more preferably 8% by mass or more, and most preferably 10% by mass or more. Considering the solubility at low temperature, transition temperature, electrical reliability, etc., the maximum content is preferably 20% by mass or less, more preferably 17% by mass or less, yet more preferably 15% by mass or less, and most preferably 14% by mass or less.

The compounds represented by general formula (XIV-2-2) are specifically preferably compounds represented by formula (54.1) to formula (54.4). Among these, compound represented by formula (54.2) and/or the compound represented by formula (54.4) is preferably contained.

[Chem. 144]

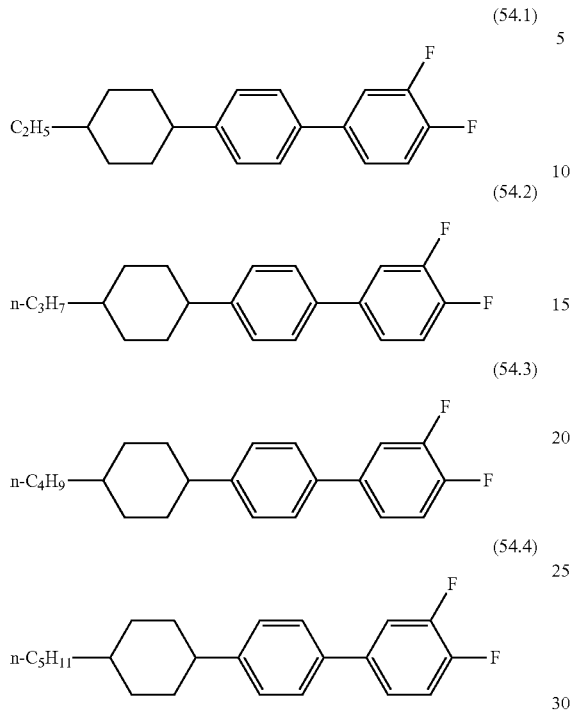

The compound represented by general formula (XIV-2) is preferably a compound represented by general formula (XIV-2-3).

[Chem. 145]

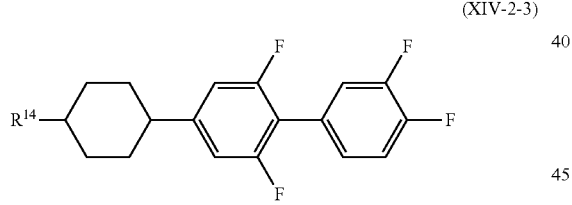

(In the formula, $R^{14}$ represents an alkyl group having 1 to 5 carbon atoms, an alkenyl group having 2 to 5 carbon atoms, or an alkoxy group having 1 to 4 carbon atoms.)

The content of the compound represented by general formula (XIV-2-3) relative to the total amount of the liquid crystal composition of the present invention is preferably 5% by mass or more, more preferably 9% by mass or more, and most preferably 12% by mass or more. Considering solubility at low temperature, transition temperature, electrical reliability, etc., the maximum content is preferably 30% by mass or less, more preferably less than 27% by mass, yet more preferably 24% by mass or less, and most preferably less than 20% by mass.

The compounds represented by general formula (XIV-2-3) are specifically preferably compounds represented by formula (55.1) to formula (55.4). Of these, the compound represented by formula (55.2) and/or the compound represented by formula (55.4) is preferably contained.

[Chem. 146]

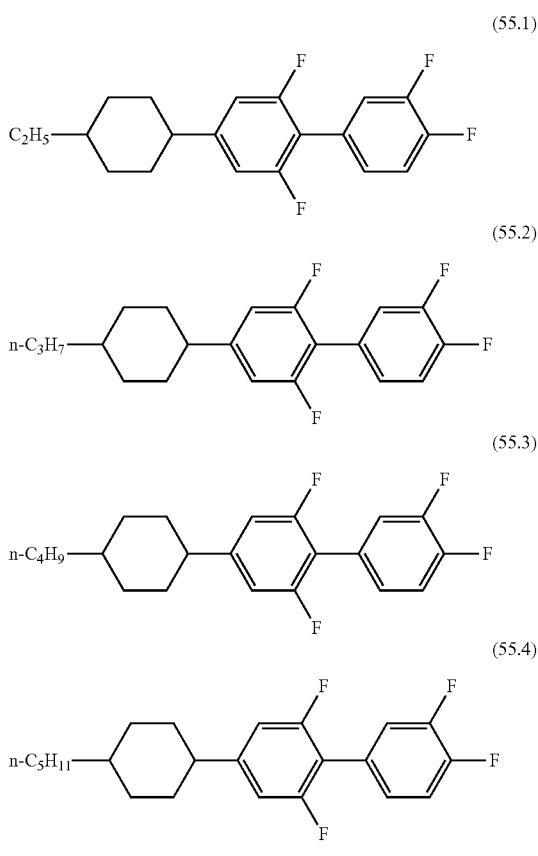

The compound represented by general formula (XIV-2) is preferably a compound represented by general formula (XIV-2-4).

[Chem. 147]

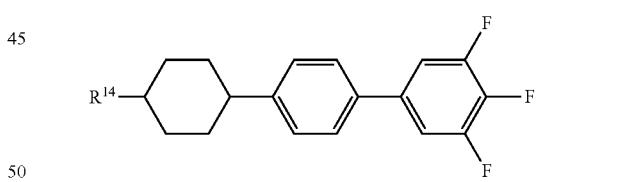

(In the formula, $R^{14}$ represents an alkyl group having 1 to 5 carbon atoms, an alkenyl group having 2 to 5 carbon atoms, or an alkoxy group having 1 to 4 carbon atoms.)

The number of compounds that can be used in combination is not limited. An appropriate combination is used for each embodiment in view of solubility at low temperature, transition temperature, electrical reliability, birefringence, etc. For example, one compound is used in one embodiment of the present invention. Two compounds are used in another embodiment of the present invention. Three or more compounds are used in another embodiment of the present invention.

The content of the compound represented by general formula (XIV-2-4) has an upper limit and a lower limit for each embodiment in view of the properties such as solubility at low temperature, transition temperature, electrical reliability, and birefringence. The lower limit of the content relative to the total amount of the liquid crystal composition of the present invention is, for example, 2% in one embodiment of the present invention, 5% in another embodiment, 8% in another embodiment, 9% in another embodiment, 10% in another embodiment, 18% in another embodiment, 21% in another embodiment, 22% in another embodiment, and 24% in another embodiment.

The upper limit of the content is, for example, 35% in one embodiment of the present invention, 30% in another embodiment, 25% in another embodiment, 20% in another embodiment, 15% in another embodiment, and 10% in another embodiment.

In the case where the liquid crystal composition of the present invention is used in a liquid crystal device with a low drive voltage, it is suitable to adjust the content of the compound represented by general formula (XIV-2-4) to a relatively high value. In the case of the liquid crystal composition used in a liquid crystal display with high response speed, it is suitable to adjust the content of the compound represented by general formula (XIV-2-4) to a relatively low value.

The compounds represented by general formula (XIV-2-4) are specifically preferably compounds represented by formula (56.1) to formula (56.4). Of these, the compounds represented by formula (56.1), formula (56.2), and formula (56.4) are preferably contained.

[Chem. 148]

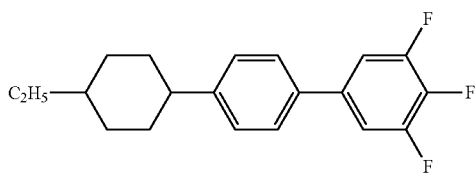

(56.1)

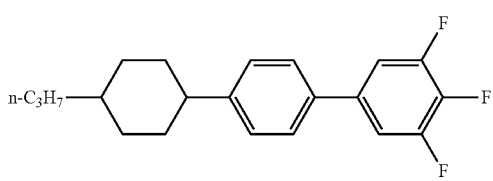

(56.2)

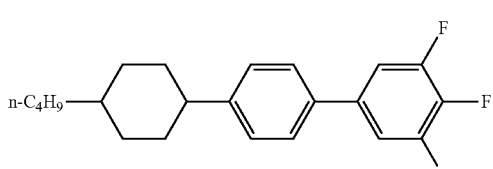

(56.3)

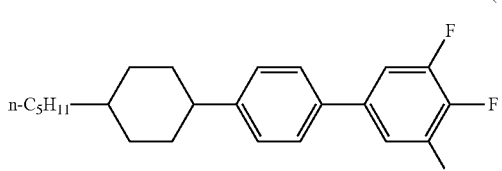

(56.4)

The compound represented by general formula (XIV-2) is preferably a compound represented by general formula (XIV-2-5).

[Chem. 149]

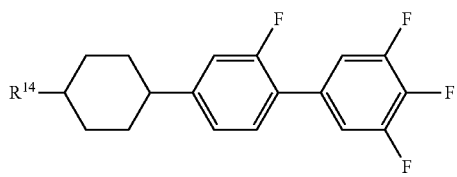

(XIV-2-5)

(In the formula, $R^{14}$ represents an alkyl group having 1 to 5 carbon atoms, an alkenyl group having 2 to 5 carbon atoms, or an alkoxy group having 1 to 4 carbon atoms.)

The content of the compound represented by general formula (XIV-2-5) relative to the total amount of the liquid crystal composition of the present invention is preferably 5% by mass or more, more preferably 10% by mass or more, and most preferably 13% by mass or more. Considering the solubility at low temperature, transition temperature, electrical reliability, etc., the maximum content is preferably 25% by mass or less, more preferably less than 22% by mass, yet more preferably 18% by mass or less, and most preferably less than 15% by mass.

The compounds represented by general formula (XIV-2-5) are specifically compounds represented by formula (57.1) to formula (57.4). Of these, the compound represented by formula (57.1) is preferably contained.

[Chem. 150]

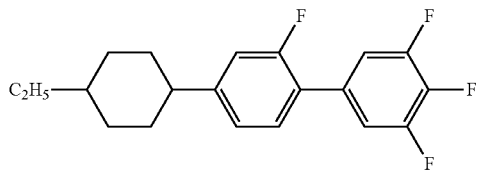

(57.1)

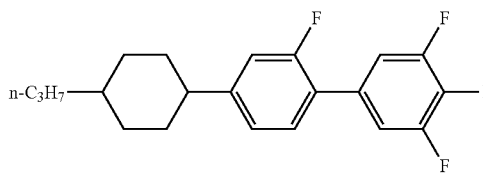

(57.2)

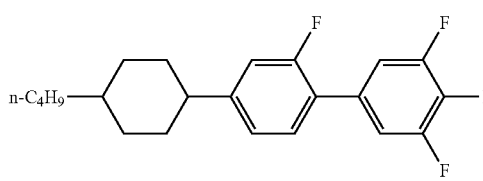

(57.3)

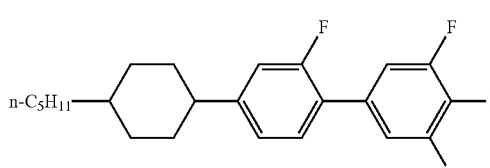

(57.4)

The compound represented by general formula (XIV-2) is preferably a compound represented by general formula (XIV-2-6).

[Chem. 151]

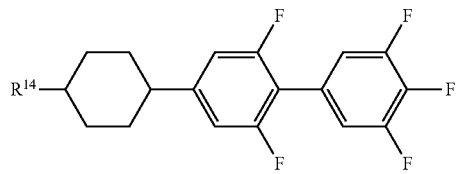

(XIV-2-6)

(In the formula, $R^{14}$ represents an alkyl group having 1 to 5 carbon atoms, an alkenyl group having 2 to 5 carbon atoms, or an alkoxy group having 1 to 4 carbon atoms.)

The content of the compound represented by general formula (XIV-2-6) relative to the total amount of the liquid crystal composition of the present invention is preferably 5% by mass or more, more preferably 10% by mass or more, and most preferably 15% by mass or more. Considering solubility at low temperature, transition temperature, electrical reliability, etc., the maximum content is preferably 25% by mass or less, more preferably 22% by mass or less, yet more preferably 20% by mass or less, and most preferably less than 17% by mass.

The compounds represented by general formula (XIV-2-6) are specifically preferably compounds represented by formula (58.1) to formula (58.4). Among these, the compound represented by formula (58.2) is preferably contained.

[Chem. 152]

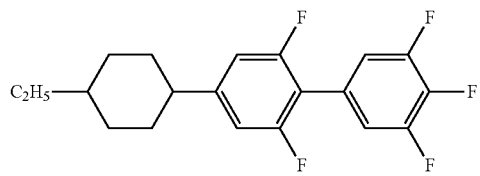

(58.1)

[Chem. 153]

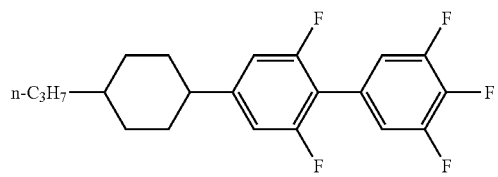

(58.2)

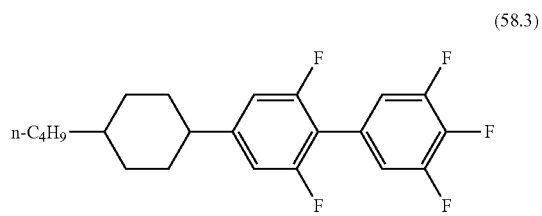

(58.3)

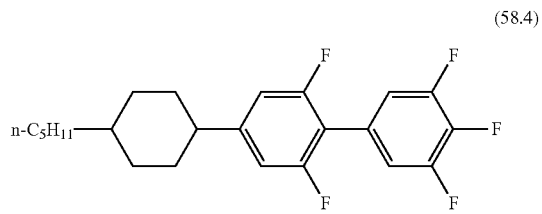

(58.4)

The compounds used in the present invention have no peroxide (—CO—OO—) structures in the molecules. In the case where reliability and long-term stability of the liquid crystal composition are important, it is preferable not to use any compound having a carbonyl group. In the case where stability for UV irradiation is important, it is preferable not to use a chlorine-substituted compound.

The liquid crystal composition of the present invention can contain a polymerizable compound so as to enable production of liquid crystal display devices of PS mode, horizontal electric field PSA mode, horizontal electric field PSVA mode, etc. Examples of the polymerizable compound that can be used include a photopolymerizable monomer polymerization of which proceeds by an energy ray such as light and a polymerizable compound having a liquid crystal skeleton constituted by plural six-membered rings linked with one another, such as a biphenyl derivative or a terphenyl derivative. Particularly preferred are difunctional monomers represented by general formula (XX)

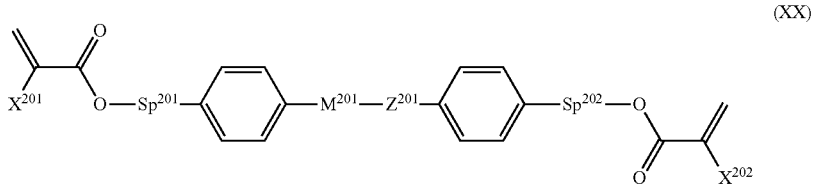

(XX)

(In the formula, $X^{201}$ and $X^{202}$ each independently represent a hydrogen atom or a methyl group, $Sp^{201}$ and $Sp^{202}$ each independently represent a single bond, an alkylene group having 1 to 8 carbon atoms, or —O—$(CH_2)_s$— (in the formula, s represents an integer in the range of 2 to 7 and the oxygen atom is linked to the aromatic ring.), $Z^{201}$ represents —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$=CY$^2$— (in the formula, Y$^1$ and Y$^2$ each independently represent a fluorine atom or a hydrogen atom), —C≡C—, or a single bond, and $M^{201}$ represents a 1,4-phenylene group, a trans-1,4-cyclohexylene group, or a single bond, in which all of 1,4-phenylene groups in the formula may have any hydrogen substituted with a fluorine atom).

A diacrylate derivative with $X^{201}$ and $X^{202}$ both representing a hydrogen atom, a dimethacrylate derivative with $X^{201}$ and $X^{202}$ both representing a methyl group, or a compound with one of $X^{201}$ and $X^{202}$ representing a hydrogen atom and the other representing a methyl group is preferable. Of these, the diacrylate derivative has the highest polymerization rate, the dimethacrylate derivative has the lowest polymerization rate, and the asymmetric compound has a medium polymerization rate. A compound suitable for usage can be used. For PSA display devices, dimethacrylate derivatives are particularly preferable.

$Sp^{201}$ and $Sp^{202}$ each independently represent a single bond, an alkylene group having 1 to 8 carbon atoms, or —O—$(CH_2)_s$—. For a PSA display device, at least one of $Sp^{201}$ and $Sp^{202}$ is preferably a single bond, a compound with both of $Sp^{201}$ and $Sp^{202}$ representing a single bond or an embodiment in which one of $Sp^{201}$ and $Sp^{202}$ represents a single bond and the other represents an alkylene group having 1 to 8 carbon atoms or —O—$(CH_2)_s$— is preferable. In such a case, an alkyl having with 1 to 4 is preferred and s is preferably 1 to 4.

$Z^{201}$ preferably represents —OCH$_2$—, —CH$_2$O—, —COO—, —OCO—, —CF$_2$O—, —OCF$_2$—, —CH$_2$CH$_2$—, —CF$_2$CF$_2$—, or a single bond, more preferably represents —COO—, —OCO—, or a single bond, and most preferably represents a single bond.

$M^{201}$ represents a 1,4-phenylene group which may have any hydrogen atom substituted with a fluorine atom, a trans-1,4-cyclohexylene group, or a single bond but preferably represents a 1,4-phenylene group or a single bond. In the case where C represents a ring structure and not a single bond, $Z^{201}$ is preferably a linking group other than a single bond and in the case where $M^{201}$ represents a single bond, $Z^{201}$ preferably represents a single bond.

From these viewpoints, the cyclic structure between $Sp^{201}$ and $Sp^{202}$ in general formula (XX) is specifically preferably a structure described below.

In the case where $M^{201}$ in general formula (XX) represents a single bond and the cyclic structure is constituted by two rings, the cyclic structures represented by formula (XXa-1) to formula (XXa-5) are preferable, those represented by formula (XXa-1) to formula (XXa-3) are more preferable, and one represented by formula (XXa-1) is most preferable.

[Chem. 154]

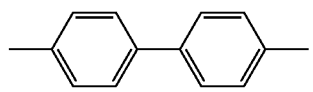
(XXa-1)

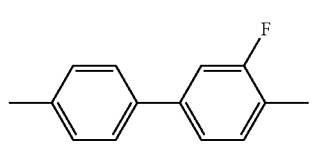
(XXa-2)

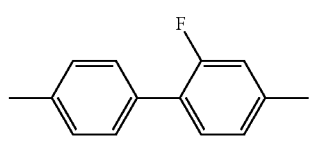
(XXa-3)

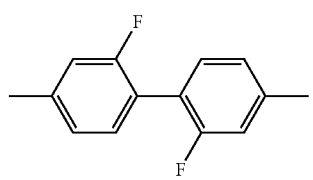
(XXa-4)

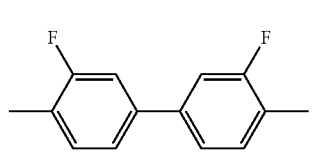
(XXa-5)

(In the formulae, each end is bonded to $Sp^{201}$ or $Sp^{202}$.)

Polymerizable compounds containing these skeletons are optimum for PSA liquid crystal display devices because of their anchoring force after polymerization and an excellent alignment state can be obtained. Thus, nonuniformity in display is suppressed or completely prevented.

Accordingly, those represented by general formula (XX-1) to general formula (XX-4) are particularly preferred as the polymerizable monomer. Among these, one represented by general formula (XX-2) is most preferable.

[Chem. 155]

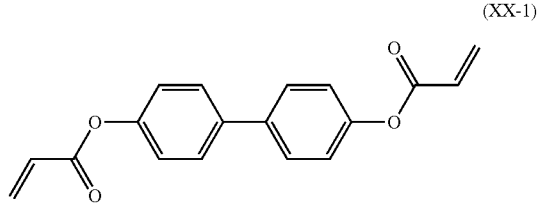
(XX-1)

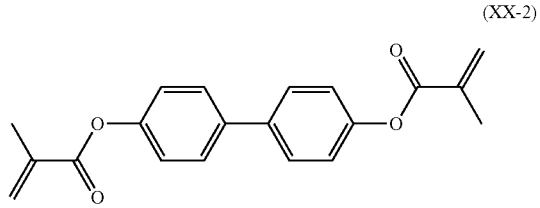
(XX-2)

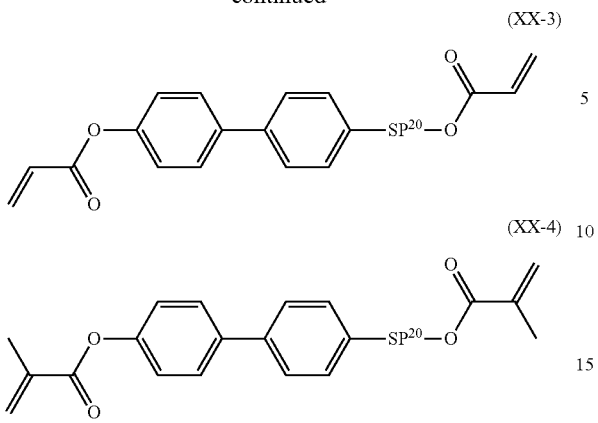

(In the formulae, Sp$^{20}$ represents an alkylene group having 2 to 5 carbon atoms.)

In the case where the monomer is added to the liquid crystal composition of the present invention, polymerization proceeds in the absence of a polymerization initiator but a polymerization initiator may be added to accelerate polymerization. Examples of the polymerization initiator include benzoin ethers, benzophenones, acetophenones, benzyl ketals, and acylphosphine oxides.

The liquid crystal composition of the present invention may further contain a compound represented by general formula (Q).

[Chem. 156]

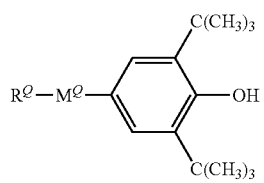

(Q)

(In the formula, R$^Q$ represents a linear or branched alkyl group having 1 to 22 carbon atoms in which one or more CH$_2$ groups in the alkyl group may each be substituted with —O—, —CH═CH—, —CO—, —OCO—, —COO—, —C≡C—, —CF$_2$O—, or —OCF$_2$— so that oxygen atoms are not directly adjacent to each other, and M$^Q$ represents a trans-1,4-cyclohexylene group, a 1,4-phenylene group, or a single bond.)

R$^Q$ represents a linear or branched alkyl group having 1 to 22 carbon atoms in which one or more CH$_2$ groups in the alkyl group may each be substituted with —O—, —CH═CH—, —CO—, —OCO—, —COO—, —C≡C—, —CF$_2$O—, or —OCF$_2$— so that oxygen atoms are not directly adjacent to each other. Preferable are a linear alkyl group having 1 to 10 carbon atoms, a linear alkoxy group, a linear alkyl group with one CH$_2$ group substituted with —OCO— or —COO—, a branched alkyl group, a branched alkoxy group, and a branched alkyl group with one CH$_2$ group substituted with —OCO— or —COO—. More preferable are a linear alkyl group having 1 to 20 carbon atoms, a linear alkyl group with one CH$_2$ group substituted with —OCO— or —COO—, a branched alkyl group, a branched alkoxy group, and a branched alkyl group with one CH$_2$ group substituted with —OCO— or —COO—. M$^Q$ represents a trans-1,4-cyclohexylene group, a 1,4-phenylene group, or a single bond; however, a trans-1,4-cyclohexylene group or a 1,4-phenylene group is preferable.

The compounds represented by general formula (Q) are specifically preferably compounds represented by general formula (Q-a) to general formula (Q-d) described below.

[Chem. 157]

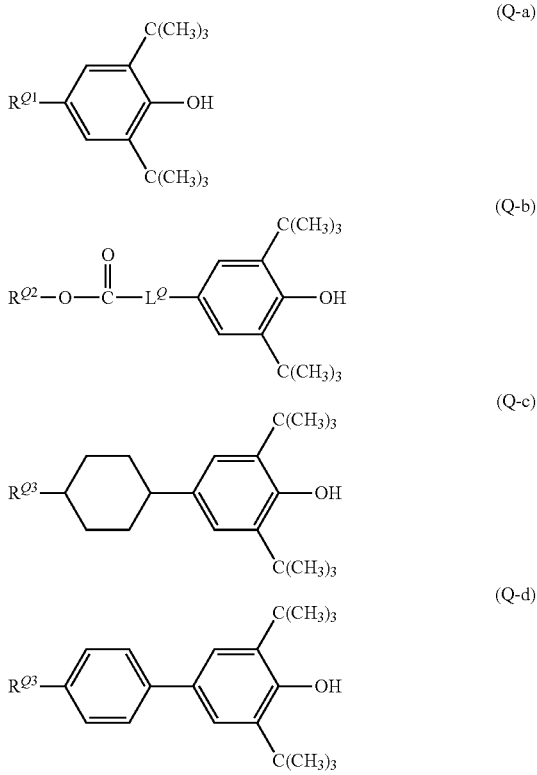

In the formulae, R$^{Q1}$ preferably represents a linear or branched alkyl group having 1 to 10 carbon atoms, R$^{Q2}$ preferably represents a linear or branched alkyl group having 1 to 20 carbon atoms, R$^{Q3}$ preferably represents a linear or branched alkyl or linear or branched alkoxy group having 1 to 8 carbon atoms, and L$^Q$ preferably represents a linear or branched alkylene group having 1 to 8 carbon atoms. Of the compounds represented by general formula (Q-a) to general formula (Q-d), the compounds represented by general formula (Q-c) and general formula (Q-d) are more preferable.

The liquid crystal composition of the present invention preferably contains one or two compounds and more preferably contains one to five compounds represented by general formula (Q). The content thereof is preferably 0.001% to 1% by mass, more preferably 0.001% to 0.1% by mass, and most preferably 0.001% to 0.05% by mass.

The liquid crystal composition of the present invention containing a polymerizable compound exhibits liquid crystal aligning ability once the polymerizable compound is polymerized through UV irradiation and is used in a liquid crystal display device in which the amount of transmitted light is controlled based on birefringence. The liquid crystal composition is particularly useful in liquid crystal display devices such as AM-LCD (active matrix liquid crystal display device), TN (nematic liquid crystal display device), STN-LCD (super twisted nematic crystal display device), OCB- LCD, IPS-LCD (in-plane switching liquid crystal display device), and FFS (fringe field switching mode liquid crystal display device). The liquid crystal composition is particularly useful for AM-LCD. The liquid crystal composition can be used in a transmission-type or reflection-type liquid crystal display device.

Two substrates of a liquid crystal cell used in a liquid crystal display device can be composed of a flexible transparent material such as glass or plastic. One of the substrates may be composed of a nontransparent material such as silicon. A transparent substrate having a transparent electrode layer can be obtained by, for example, sputter-depositing indium tin oxide (ITO) on a transparent substrate such as a glass plate.

A color filter can be formed by, for example, a pigment dispersion method, a printing method, an electrodeposition method, or a dyeing method. For example, according to a method for making a color filter by a pigment dispersion method, a curable color composition for a color filter is applied to a transparent substrate, subjected to a patterning process, and cured by heating or irradiation with light. This process is performed for three colors, namely, red, green and blue, so as to make a pixel portion for a color filter. In addition, pixel electrodes including active elements such as TFTs, thin film diodes, and metal-insulator-metal resistivity elements, may be disposed on the substrate.

The substrates were arranged to face each other with the transparent electrode layers on the inner side. At this stage, the distance between the substrates may be adjusted by using spacers. This adjustment may be made so that the thickness of the light control layer to be obtained is 1 to 100 µm. More preferably, the thickness is 1.5 to 10 µm. In the case where a polarizing plate is used, the product of the refractive index anisotropy Δn of the liquid crystals and the cell thickness d is preferably adjusted so as to maximize the contrast. When there are two polarizing plates, the polarizing axis of each polarizing plate may be adjusted so as to improve the viewing angle and contrast. A phase difference film for widening the viewing angle can also be used. Examples of the spacers include glass particles, plastic particles, alumina particles, and columnar spacers composed of a photoresist material or the like. Then a sealing agent such as an epoxy-based heat-curable composition is screen-printed onto the substrate while forming a liquid crystal inlet port. The substrates are then bonded to each other and the sealing agent is heated so as to be thermally cured.

A polymerizable compound-containing liquid crystal composition is placed between the two substrates by a common vacuum injection method, an ODF method, or the like. In a vacuum injection method, although dropping marks do not occur, the trace of injection remains, which is a problem. However, the present invention is more useful in display devices produced by an ODF method. In the liquid crystal display device production process by an ODF method, a closed loop bank is formed on one substrate selected from the backplane and the frontplane by using a dispenser and a sealing agent such as an epoxy-based photothermal dual curing sealing agent. Within the bank, a particular amount of the liquid crystal composition is dropped while performing evacuation, and then the frontplane and the backplane are bonded to each other so as to form a liquid crystal display device. The liquid crystal composition of the present invention is useful since dropping of the liquid crystal composition can be stably performed in the ODF process.

In order for the liquid crystals to obtain favorable aligning properties, an appropriate polymerization rate is desirable; thus, the method for polymerizing the polymerizable compound is preferably a polymerization method that includes applying a single active energy ray such as an ultraviolet ray or an electron beam, plural active rays simultaneously, or plural active energy rays sequentially. When ultraviolet rays are used, a polarized light source may be used or an unpolarized light source may be used. In the case where polymerization is performed while holding the polymerizable compound-containing liquid crystal composition between two substrates, at least the substrate on the irradiation side must have transparency appropriate for the active energy ray. Alternatively, a particular portion only may be polymerized by using a mask during irradiation with light, then the alignment state of the unpolymerized portion may be changed by changing the conditions such as electric field, magnetic field, or temperature, and then an active energy ray may be applied to perform polymerization. In particular, when ultraviolet light exposure is to be conducted, it is preferable to perform ultraviolet ray exposure while applying an alternating electric field to the polymerizable compound-containing liquid crystal composition. The alternating electric field to be applied is preferably an alternating current having a frequency of 10 Hz to 10 kHz and more preferably an alternating current having a frequency of 60 Hz to 10 kHz. The voltage is selected according to the desired pretilt angle of the liquid crystal display device. In other words, the pretilt angle of a liquid crystal display device can be controlled by the applied voltage. In a horizontal electric field-type MVA mode liquid crystal display device, the pretilt angle is preferably controlled to 80° to 89.9° from the viewpoint of alignment stability and contrast.

The temperature during irradiation is preferably within the temperature range in which the liquid crystal composition of the present invention retains a liquid crystal state. Preferably, polymerization is conducted at a temperature near room temperature, in other words, typically at a temperature in the range of 15° C. to 35° C. Examples of the lamps that generate ultraviolet rays include a metal halide lamp, a high-pressure mercury lamp, and a super high-pressure mercury lamp. The wavelength of the ultraviolet ray to be applied is preferably in the wavelength region outside the absorption wavelength region of the liquid crystal composition. If needed, some portions of the UV may be cut. The intensity of the ultraviolet ray applied is preferably 0.1 mW/cm$^2$ to 100 W/cm$^2$ and more preferably 2 mW/cm$^2$ to 50 W/cm$^2$. The amount of the energy of the ultraviolet ray to be applied can be appropriately adjusted but is preferably 10 mJ/cm$^2$ to 500 J/cm$^2$ and more preferably 100 mJ/cm$^2$ to 200 J/cm$^2$. In applying the ultraviolet ray, the intensity may be changed. The time of applying the ultraviolet ray is appropriately selected on the basis of the intensity of the ultraviolet ray to be applied but is preferably 10 to 3600 seconds and more preferably 10 to 600 seconds.

A liquid crystal display device that uses a liquid crystal composition of the present invention is useful since it exhibits high-speed response and suppresses display failures. In particular, it is useful for an active matrix drive liquid crystal display device, and can be applied to liquid crystal display devices of VA mode, PSVA mode, PSA mode, IPS mode, FFS mode, and ECB mode.

Preferred embodiments of the liquid crystal display device according to the present invention will now be described in detail with reference to the drawings.

FIG. 1 is a cross-sectional view of a liquid crystal display device that includes two substrate facing each other, a sealing material disposed between the substrates, and liquid crystals sealed in a sealing region surrounded by the sealing material.

In particular, a specific embodiment of a liquid crystal display device includes a backplane that includes a first substrate 100, a TFT layer 102, a pixel electrode 103, a passivation film 104, and a first alignment film 105; a frontplane that faces the backplane and that includes a second substrate 200, a black matrix 202, a color filter 203, a planarizing film (overcoat layer) 201, and a transparent electrode 204, and a second alignment film 205; a sealing material 301 disposed between the substrates; a liquid crystal layer 303 sealed in a sealing region surrounded by the sealing material; and projections (columnar spacers) 302 and 304 on the surface of the substrate in contact with the sealing material 301.

The first substrate and the second substrate may be composed of any material that is substantially transparent and glass, ceramics, plastics, etc., can be used. For a plastic substrate, cellulose, cellulose derivatives such as triacetyl cellulose and diacetyl cellulose, polycycloolefin derivatives, polyesters such as polyethylene terephthalate and polyethylene naphthalate, polyolefins such as polypropylene and polyethylene, polycarbonate, polyvinyl alcohols, polyvinyl chloride, polyvinylidene chloride, polyamide, polyimide, polyimide amide, polystyrene, polyacrylate, polymethyl methacrylate, polyether sulfone, polyarylate, and inorganic-organic composite materials such as glass fiber-epoxy resin and glass fiber-acryl resin can be used.

In the case where a plastic substrate is used, a barrier film is preferably provided. The function of the barrier film is to decrease the moisture permeability of the plastic substrate and improve reliability of the electric properties of the liquid crystal display device. The barrier film is not particularly limited as long as the film has high transparency and low water vapor permeability. Typically, a thin film formed by using an inorganic material such as silicon oxide through vapor deposition, sputtering, or chemical vapor deposition (CVD) is used.

In the present invention, the same material or different materials may be used in the first substrate and the second substrate. Glass substrates are preferable since a liquid crystal display device having good heat resistance and dimensional stability can be fabricated. Plastic substrates are also preferable since they are suitable for a roll-to-roll production method, light-weight, and flexible. If flatness and heat resistance are desirable, a plastic substrate and a glass substrate are preferably used in combination since preferable results can be yielded.

In Examples described below, substrates are used as the materials for the first substrate 100 and the second substrate 200.

In the backplane, the TFT layer 102 and the pixel electrode 103 are disposed on the first substrate 100. The TFT layer 102 and the pixel electrode 103 are produced in a typical array process. The passivation film 104 and the first alignment film 105 are formed thereon and a backplane is obtained as a result.

The passivation film 104 (also referred to as an inorganic protective film) is a film for protecting the TFT layer and is typically formed by chemical vapor deposition (CVD) technique as a nitride film (SiNx), an oxide film (SiOx), or the like.

The first alignment film 105 has a function of aligning liquid crystals and a polymer material such as polyimide is typically frequently used. An alignment agent solution composed of a polymer material and a solvent is used as the coating solution. The alignment film has a possibility of inhibiting adhesive force to the sealing material and is thus patterned and applied in the sealing region. A printing method such as flexo printing or a droplet ejection method such as ink jet is employed for application. After the solvent us evaporated by precuring, the applied alignment agent solution is crosslinked and cured by baking. Subsequently, an aligning process is performed to yield an aligning function.

The aligning process is usually performed by a rubbing technique. The polymer film formed as mentioned earlier is rubbed in one direction with a rubbing cloth composed of fibers such as rayon so as to generate liquid crystal aligning ability.

Alternatively, an optical alignment technique is sometimes employed. The optical alignment technique is a technique of generating the aligning property by irradiation of an alignment film containing a photosensitive organic material with polarized light. According to this technique, scratching of the substrate and generation of dust that occur in the rubbing technique do not occur. Examples of the organic material used in the optical alignment technique include materials that contain dichroic dyes. Examples of the dichroic dyes that can be used include those that have groups (hereinafter simply referred to as optical alignment groups) that induce molecular alignment by the Weigert's effect attributable to dichroism or induce optical reaction from which the liquid crystal aligning property originates, such as isomerization reaction (ex. azobenzene group), dimerization reaction (ex. cinnamoyl group), optical crosslinking reaction (ex. benzophenone group), or optical decomposition reaction (ex. polyimide group). The applied aligning agent solution is precured to evaporate the solvent and then irradiated with light (polarized light) having a desired polarization so as to obtain an alignment film having an aligning property in the desired direction.

The frontplane has the black matrix 202, the color filter 203, the planarizing film 201, the transparent electrode 204, and the second alignment film 205 disposed on the second substrate 200.

The black matrix 202 is, for example, fabricated by a pigment dispersion method. In particular, a color resin solution containing an evenly dispersed black colorant for forming a black matrix is applied to the second substrate 200 having the barrier film 201 formed thereon so as to form a coloring layer. The coloring layer is then cured by baking. A photoresist is applied to the coloring layer and prebaked. The photoresist is exposed through a mask pattern and developed to perform patterning on the coloring layer. Then the photoresist layer is removed and the coloring layer is baked to form a black matrix 202.

Alternatively, a photoresist-type pigment dispersion may be used. In such a case, a photoresist-type pigment dispersion is applied, prebaked, exposed through a mask pattern, and developed to conduct patterning on the coloring layer. Then the photoresist layer is removed and the coloring layer is baked to form a black matrix 202.

The color filter 203 is prepared by a pigment dispersion method, an electrodeposition method, a printing method, or a dyeing method. For example, according to a pigment dispersion method, a color resin solution in which a pigment (for example, a red pigment) is evenly dispersed is applied to the second substrate 200 and cured by baking. Then a photoresist is applied thereon and prebaked. The photoresist is exposed through a mask pattern and then developed to perform patterning. The photoresist layer is then removed and baking is performed again. As a result, a (red) color filter 203 (203*a*) is obtained. The order of color in which the filters are made is not particularly limited. A green color filter 203 (203*b*) and a blue color filter 203 (203*c*) are made in the same manner.

The transparent electrode 204 is formed on the color filter 203 (if needed, an overcoat layer (201) for planarizing the surface is formed on the color filter 203). The transmittance of the transparent electrode 204 is preferably high and the electrical resistance of the transparent electrode 204 is preferably low. The transparent electrode 204 is formed by sputter-deposition or the like of an oxide film such as ITO.

A passivation film is sometimes formed on the transparent electrode 204 to protect the transparent electrode 204.

The second alignment film 205 is the same as the first alignment film 105.

While specific embodiments of the backplane and the frontplane used in the present invention are described above, the present invention is not limited to these specific embodiments and these embodiments may be freely altered depending on the desired liquid crystal display device.

The shape of the columnar spacers is not particularly limited and its horizontal cross section may have a variety of shapes such as circular, rectangular, and polygonal. Considering the misalignment margin during the process, the horizontal cross section is particularly preferably circular or regular polygonal in shape. The shape of the projections is preferably a truncated cone or truncated pyramid.

The material of the columnar spacers is not particularly limited as long as it is a material that does not dissolve in the sealing material, the organic solvent used in the sealing material, or the liquid crystals. From the viewpoints of processing and weight reduction, a synthetic resin (curable resin) is preferable. The projections can be formed by a photolithographic method or a droplet ejection method on the surface of the first substrate that comes into contact with the sealing material. Due to these reasons, it is preferable to use a photocurable resin suitable for photolithography or a droplet ejection method.

Figure 2:
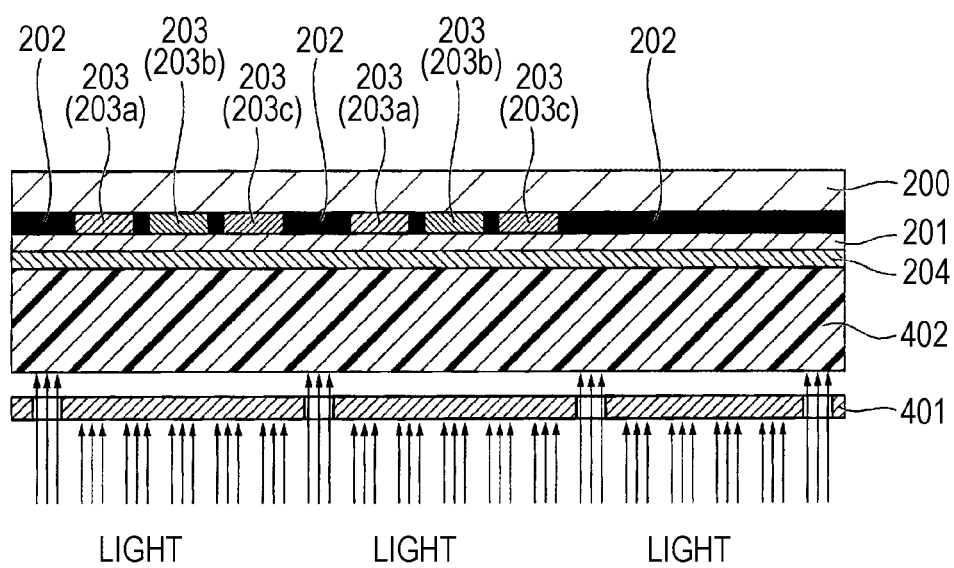
FIG. 2 is a drawing illustrating an exposure step that uses, as a photomask pattern, a pattern for forming columnar spacers to be formed on a black matrix.

The case in which the columnar spacers are obtained by a photolithographic method is described below as an example. FIG. 2 is a diagram of an exposure process step that uses a pattern for forming columnar spacers, the pattern being formed on the black matrix so as to function as a photomask pattern.

A resin solution for forming columnar spacers (not containing colorants) is applied to the transparent electrode 204 of the frontplane. Then this resin layer 402 is cured by baking. A photoresist is applied thereon and prebaked. After exposing the photoresist through a mask pattern 401, development is conducted to conduct patterning of the resin layer. The photoresist layer is then removed and the resin layer is baked so as to complete formation of the columnar spacers (302 and 0304 in FIG. 1).

The positions of forming the columnar spacers can be determined as desired by using a mask pattern. Accordingly, the columnar spacers can be formed inside the sealing region and outside the sealing region (portion where the sealing material is applied) simultaneously. The columnar spacers are preferably formed to be positioned on the black matrix so as not to degrade quality of the sealing region. The columnar spacers fabricated by a photolithographic method as such are sometimes called column spacers or photo spacers.

A mixture containing a triazole-based initiator, an acrylic acid copolymer, a polyfunctional acryl-based monomer or a negative-type water-soluble resin such as PVA-stilbazo photosensitive resin, etc., is used as the material for the spacers. Alternatively, a method that uses a color resin in which a colorant is dispersed in a polyimide resin is available. In the present invention, the spacers can be obtained without any limitation by using a known material in accordance with the compatibility with the liquid crystals and the sealing material used.

After the columnar spacers are formed on the surface of the frontplane where a sealing region is formed, a sealing material (301 in FIG. 1) is applied to the surface of the backplane that comes into contact with the sealing material.

The material for the sealing material is not particularly limited, and a curable resin composition containing a polymerization initiator and an epoxy-based or acryl-based photocurable, thermally curable, or photothermal dual curing resin is used. In order to control the moisture permeability, elastic modulus, and viscosity, a filler composed of an inorganic matter or an organic matter is sometimes added. The shape of the filler is not particularly limited and may be spherical, fibrous, or irregular. A spherical gap material that has a monodisperse diameter or a fibrous material may be mixed in order to satisfactorily control the cell gap or a fibrous substance that easily becomes entangled with the projections on the substrate can be added in order to further strengthen the adhesive force to the substrate. The diameter of the fibrous substance used here is preferably about 1/5 to 1/10 of the cell gap or less. The length of the fibrous substance is preferably smaller than the width of the applied seal.

The material of the fibrous substance is not particularly limited as long as a particular shape can be obtained. A synthetic fiber such as cellulose, polyamide, or polyester, or an inorganic material such as glass or carbon can be appropriately selected.

A printing method and a dispensing method are available as the method for applying the sealing material. A dispensing method that uses less sealing material is preferable. The positions where the sealing material is applied are usually on a black matrix in order not to adversely affect the sealing region. In order to form a liquid crystal dropping region in the next step (in order to prevent leakage of the liquid crystals), the shape of the applied sealing material is to be a closed loop shape.

Liquid crystals are dropped in the closed loop (sealing region) of the frontplane to which the sealing material has been applied. Typically, a dispenser is used. The amount of liquid crystals to be dropped is basically equal to the volume obtained by multiplying the area of the applied seal and the height of the columnar spacer in order for the amount of the liquid crystals dropped to be equal to the cell volume. However, to deal with liquid crystal leakage that occurs in the cell bonding step and optimize the display properties, the amount of the liquid crystals to be dropped may be appropriately adjusted or the positions where the liquid crystals are to be dropped may be scattered.

Next, the frontplane onto which the sealing material has been applied and the liquid crystals have been dropped is bonded to the backplane. In particular, the frontplane and the backplane are adsorbed to stages having a substrate adsorbing mechanism such as an electrostatic chuck and are arranged in such a manner that the second alignment film of the frontplane and the first alignment film of the backplane face each other and in such a position (distance) that the sealing material does not contact the other substrate. Under such conditions, the interior of the system is evacuated. Upon completion of evacuation, the positions of the two substrates are adjusted (alignment operation) while monitoring the position where the frontplane and the backplane are to be bonded to each other. After adjustment of the bonding position is finished, the substrates are brought to be close to each other up to a position where the sealing material on the frontplane contacts the backplane. Under these conditions, the interior of the system is filled with inert gas and the pressure is slowly returned to normal while releasing the evacuation. Due to this process, the frontplane and the backplane become bonded to each other due to atmospheric pressure, and a cell gap is formed at a height position of the columnar spacers. Under these conditions, the sealing material is irradiated with an ultraviolet ray to be cured and form a liquid crystal cell.

Subsequently, a heating step is performed in some cases so as to accelerate curing of the sealing material. A heating step is frequently added so as to strengthen the adhesive force of the sealing material and improve the reliability of electrical properties.

EXAMPLES

The present invention will now be described in further detail by using Examples below which do not limit the scope of the present invention. In the compositions of Examples and Comparative Examples below, "%" means "% by mass".

The properties that were measured in Examples are as follows.

Tni: nematic phase-isotropic liquid phase transition temperature (° C.)
Δn: refractive index anisotropy at 295 K (in other words, birefringence)
Δ∈: dielectric anisotropy at 295 K
η: viscosity (mPa·s) at 295 K
γ1: rotational viscosity (mPa·s) at 295 K
VHR: voltage holding ratio (%) at a frequency of 60 Hz and an applied voltage of 5 V at 313 K
Ghosting:

Ghosting evaluation for the liquid crystal display device was performed by performing uniform display in all parts of the screen after displaying a particular fixed pattern in a display area for 1440 hours, and visually evaluating the extent of the afterimage of the fixed pattern based on the four-grade evaluation below:

AA: No afterimage was observed.
A: Faint afterimage was observed but the extent of the afterimage was acceptable.
B: Afterimage was observed and the extent of the afterimage was unacceptable.
C: Extensive afterimage was observed.

Volatility/Production Facility Contamination Property:

The volatility of the liquid crystal material was evaluated through observation of foaming of the liquid crystal material while observing the operation state of a vacuum stirring defoaming mixer with a stroboscope. In particular, 0.8 kg of a liquid crystal composition was placed in a special container for a vacuum stirring defoaming mixer having a capacity of 2.0 L, the vacuum stirring defoaming mixer was driven at a vacuum of 4 kPa, a revolution velocity of 15 $S^{-1}$, and a rotation velocity of 7.5 $S^{-1}$, and the following four-scale evaluation was conducted based on the time taken for foaming to start.

AA: It took 3 minutes or longer until foaming. The possibility of contamination of facility by evaporation is low.
A: It took 1 minutes or longer but less than 3 minutes until foaming. There is a concern that minor facility contamination may occur by evaporation.
B: It took 30 seconds or longer but less than 1 minute until foaming. The facility will be contaminated by evaporation.
C: It took less than 30 seconds until foaming. There is a concern for serious staining of the facility by evaporation.

Process Compatibility:

Liquid crystals were dropped 100,000 times at 40 pL per dropping using a constant volume pump by a ODF process and, the changes in the amount of liquid crystals dropped for every 200 droppings, namely, "0 to 200th dropping, 201st to 400th dropping, 401st to 600th dropping, . . . 99801st to 100000th dropping", were evaluated on the following four scale.

AA: Very little change was observed (Stable production of liquid crystal display devices is possible.).
A: A slight change was observed but the extent thereof was acceptable.
B: The extent of change was unacceptable (yield would be degraded by generation of nonuniformity).
C: Significant change was observed (liquid crystal leakage and vacuum bubbles occurred).

Solubility at Low Temperature

The solubility at low temperature was evaluated as follows. After a liquid crystal composition was prepared, 0.5 g of the liquid crystal composition was weighed and placed in a 1 mL sample jar. The resulting sample was continuously exposed to temperature change cycles, each cycle including "−20° C. (retained for 1 hour)→heating (0.2° C./min)→0° C. (retained for 1 hour)→heating (0.2° C./min)→20° C. (retained for 1 hour)→cooling (−0.2° C./min)→0° C. (retained for 1 hour)→cooling (−0.2° C./min)→−20° C.". Generation of precipitates from the liquid crystal composition was observed and the following four-scale evaluation was performed.

AA: No precipitates were observed for 600 hours or longer.
A: No precipitates were observed for 300 hours or longer.
B: Precipitates were observed within 150 hours.
C: Precipitates were observed within 75 hours.

Example 1

The composition shown below was prepared. Physical properties of the composition of Example 1 are shown in Table 1.

[Chem. 158]

| Example 1 | Chemical structure | Ratio |
|---|---|---|
| (structure image) | (2.2) | 30% |
| (structure image) | (26.2) | 10% |

-continued

[Chem. 158]

| Example 1 | Chemical structure | Ratio |
|---|---|---|
| (structure: propyl-Cy-Cy-CF2O-phenyl(3,4,5-triF)) | (ii-1) | 20% |
| (structure: ethyl-Ph-Ph(2-F)-Ph-propyl) | (i-1) | 10% |
| (structure: ethyl-Ph-Ph(2-F)-Ph-pentyl) | (i-5) | 10% |
| (structure: pentyl-Cy-Ph-Ph(2-F)-Ph-ethyl) | (23.1) | 2% |
| (structure: propyl-Cy-Cy-CH=CH-ethyl) | (1.3) | 10% |
| (structure: propyl-Ph-Ph(2-F)-Ph(3,5-diF)-CF2O-Ph(3,4,5-triF)) | (45.2) | 8% |

TABLE 1

| | Example 1 |
|---|---|
| Tni | 76.5 |
| Δn | 0.1255 |
| Δε | 13.43 |
| η | 17.2 |

Comparative Example 1

The following composition not containing a compound represented by general formula (i) was prepared. Physical properties of the composition of the Comparative Example 1 are shown in Table 2.

[Chem. 159]

| Comparative Example 1 | Chemical structure | Ratio |
|---|---|---|
| (structure: propyl-Cy-Cy-CH=CH2) | (2.2) | 30% |
| (structure: propyl-Ph-Ph(3,5-diF)-CF2O-Ph(3,4,5-triF)) | (26.2) | 10% |

-continued

[Chem. 159]

| Comparative Example 1 | Chemical structure | Ratio |
|---|---|---|
| 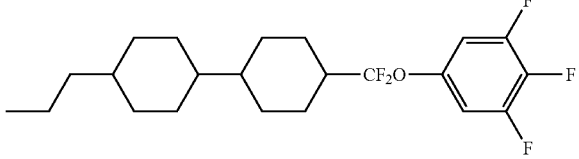 | (ii-1) | 20% |
| 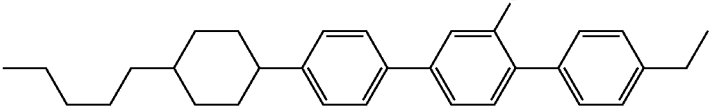 | (23.1) | 2% |
| 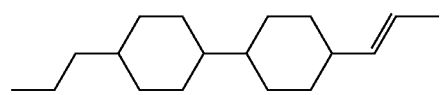 | (1.3) | 10% |
| 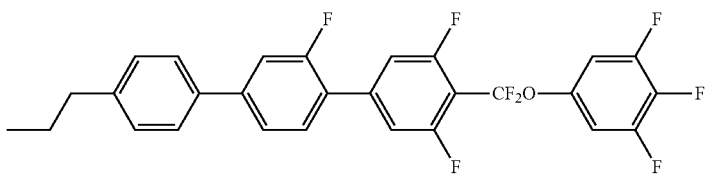 | (45.2) | 8% |
| 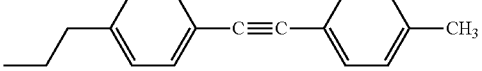 | (T-1) | 4% |
| 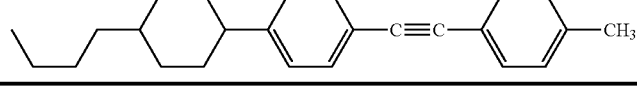 | (T-2) | 16% |

TABLE 2

| | Comparative Example 1 |
|---|---|
| Tni | 77.0 |
| Δn | 0.1257 |
| Δε | 14.84 |
| η | 22.6 |

Comparative Example 2

The following composition not containing a compound represented by general formula (ii) was prepared. Physical properties of the composition of Comparative Example 2 are shown in Table 3.

[Chem. 160]

| Comparative Example 2 | Chemical structure | Ratio |
|---|---|---|
| 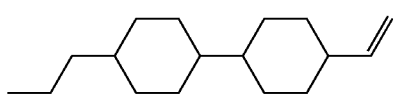 [SMILES: C=CC1CCC(C2CCC(CCC)CC2)CC1] | (2.2) | 30% |
| 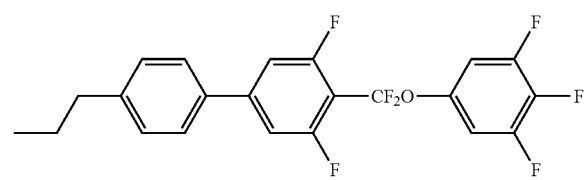 | (26.2) | 10% |

[Chem. 160]

| Comparative Example 2 | Chemical structure | Ratio |
|---|---|---|
| (structure) | (i-1) | 10% |
| (structure) | (i-5) | 10% |
| (structure) | (23.1) | 2% |
| (structure) | (1.3) | 20% |
| (structure) | (45.2) | 8% |
| (structure) | (34.3) | 10% |

TABLE 3

|  | Comparative Example 2 |
|---|---|
| Tni | 74.6 |
| Δn | 0.1264 |
| Δε | 10.26 |
| η | 13.7 |

Example 2

The following composition was prepared. Physical properties of the composition of Example 2 are shown in Table 4.

[Chem. 161]

| Example 2 | Chemical structure | Ratio |
|---|---|---|
| (structure) | (2.2) | 30% |
| (structure) | (ii-1) | 9% |

-continued

[Chem. 161]

| Example 2 | Chemical structure | Ratio |
|---|---|---|
| | (i-1) | 10% |
| | (i-5) | 10% |
| | (23.1) | 2% |
| | (1.3) | 15% |
| | (45.2) | 12% |
| | (45.3) | 12% |

TABLE 4

| | Example 2 |
|---|---|
| Tni | 86.4 |
| Δn | 0.1376 |
| Δε | 13.18 |
| η | 17.6 |

The composition of Example 1 had a high Tni, an appropriate Δn, a high ΔE, and low viscosity η suitable for high-speed response.

In Comparative Example 1, compounds T-1 and T-2 (tolan-based compounds) were used instead of the compound represented by general formula (i). The combination of compounds of this composition was adjusted so that Tni and Δn were about the same as those in Example 1. However, the viscosity η increased.

In Comparative Example 2, the composition was adjusted to exhibit Tni and Δn about the same as those of Example 1 instead of containing the compound represented by general formula (ii). However, ΔE decreased significantly.

The composition of Example 2 is a composition in which the content of the compound represented by formula (III-2.1), which is a compound represented by general formula (III-1), was increased compared to Example 1. However, the viscosity η was about the same as in Example 1, the Tni was higher, and the values of Δn and ΔE were also preferable.

Example 3

The following composition was prepared. Physical properties of the composition of Example 3 are shown in Table 5.

[Chem. 162]

| Example 3 | Chemical structure | Ratio |
|---|---|---|
| | (1.3) | 8% |

-continued
[Chem. 162]
| Example 3 | Chemical structure | Ratio |
|---|---|---|
| 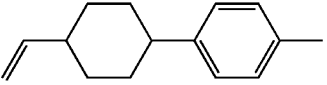 | (6.7) | 10% |
| 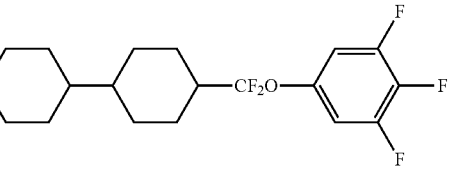 | (ii-1) | 5% |
| 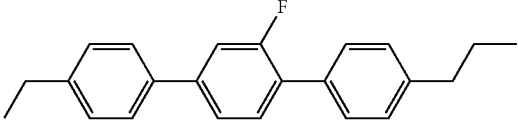 [SMILES: CCCc1ccc(-c2ccc(-c3ccc(CC)cc3)cc2F)cc1] | (i-1) | 5% |
| 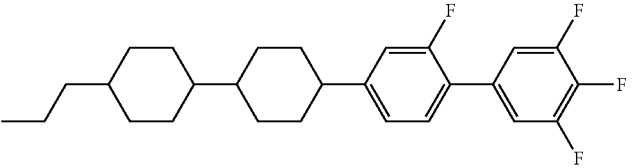 | (37.2) | 2% |
| 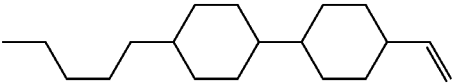 | (2.4) | 7% |
| 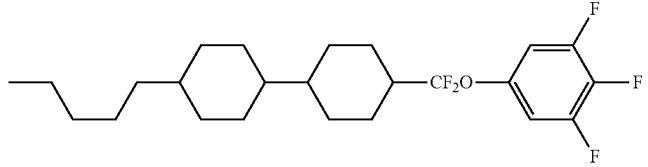 | (ii-2) | 4% |
| 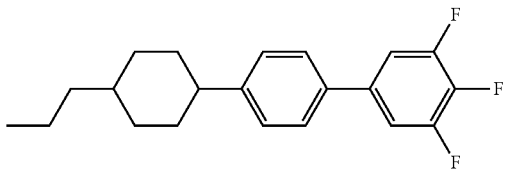 | (56.2) | 9% |
| 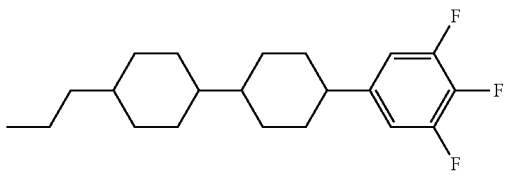 [SMILES: CCCC1CCC(C2CCC(c3cc(F)c(F)c(F)c3)CC2)CC1] | (34.3) | 15% |
| 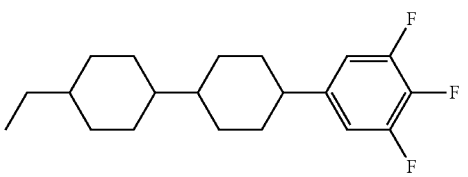 | (34.2) | 10% |

-continued

[Chem. 162]

| Example 3 | Chemical structure | Ratio |
|---|---|---|
| propyl-cyclohexyl-phenyl-(3,4-difluorophenyl) | (54.2) | 10% |
| butyl-cyclohexyl-cyclohexyl-(3,4,5-trifluorophenyl) | (34.5) | 5% |
| propyl-cyclohexyl-cyclohexyl-phenyl-OCH$_3$ | (13.3) | 5% |
| butyl-cyclohexyl-phenyl-phenyl-OCH$_3$ | (17.3) | 5% |

TABLE 5

| | Example 3 |
|---|---|
| Tni | 101.8 |
| ne | 1.575 |
| no | 1.480 |
| Δn | 0.095 |
| ε// | 10.36 |
| ε⊥ | 3.08 |
| Δε | 7.28 |
| η | 20.8 |
| γ1 | 102.6 |

Example 4

The following composition was prepared. Physical properties of the composition of Example 4 are shown in Table 6.

[Chem. 163]

| Example 4 | Chemical structure | Ratio |
|---|---|---|
| propyl-cyclohexyl-cyclohexyl-vinyl | (1.3) | 8% |
| vinyl-cyclohexyl-phenyl-methyl | (6.7) | 10% |
| propyl-cyclohexyl-cyclohexyl-CF$_2$O-(3,4,5-trifluorophenyl) | (ii-1) | 8% |
| ethyl-phenyl-(2-fluorophenyl)-phenyl-propyl | (i-1) | 8% |

-continued

[Chem. 163]

| Example 4 | Chemical structure | Ratio |
|---|---|---|
| propyl-Cy-Cy-Ph(2F)-Ph(3,5-F,4-F) | (37.2) | 2% |
| butyl-Cy-Cy-CF₂O-Ph(3,4,5-F) | (ii-2) | 10% |
| propyl-Cy-Ph-Ph(3,4,5-F) | (56.2) | 9% |
| propyl-Cy-Cy-Ph(3,4,5-F) | (34.3) | 15% |
| ethyl-Cy-Cy-Ph(3,4,5-F) | (34.2) | 10% |
| propyl-Cy-Ph-Ph(3,4-F) | (54.2) | 10% |
| ethyl-Cy-Cy-vinyl | (2.2) | 10% |

TABLE 6

| | Example 4 |
|---|---|
| Tni | 92.3 |
| ne | 1.566 |
| no | 1.478 |
| Δn | 0.088 |
| ε// | 10.92 |
| ε⊥ | 3.15 |
| Δε | 7.77 |
| η | 14.54 |
| γ1 | 82.92 |

Example 5

The following composition was prepared. Physical properties of the composition of Example 5 are shown in Table 7.

[Chem. 164]
| Example 5 | Chemical structure | Ratio |
|---|---|---|
| 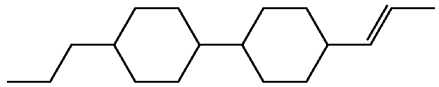 [SMILES: C/C=C/C1CCC(C2CCC(CCC)CC2)CC1] | (1.3) | 8% |
| 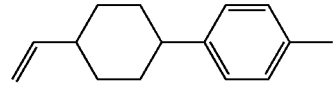 | (6.7) | 10% |
| 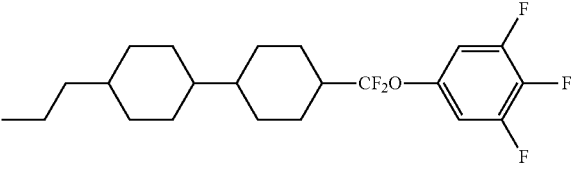 | (ii-1) | 10% |
| 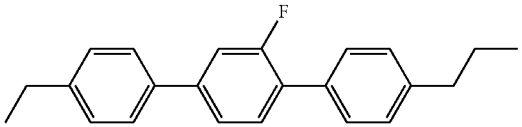 | (i-1) | 3% |
| 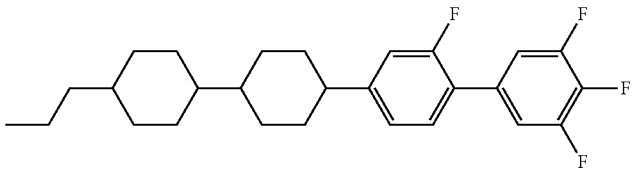 [SMILES: CCCC1CCC(C2CCC(c3ccc(-c4cc(F)c(F)c(F)c4)c(F)c3)CC2)CC1] | (37.2) | 2% |
| 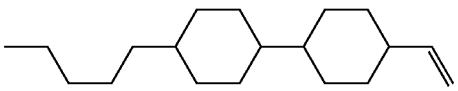 | (2.4) | 5% |
| 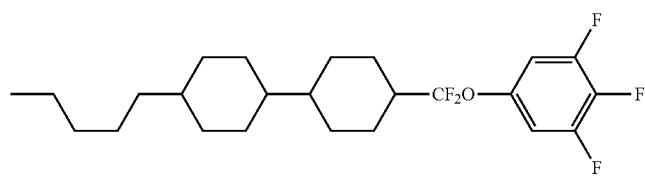 | (ii-2) | 10% |
| 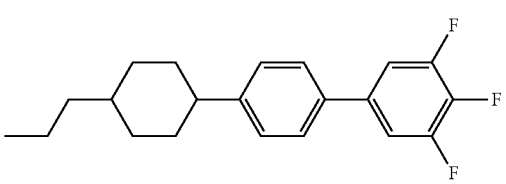 [SMILES: CCCC1CCC(c2ccc(-c3cc(F)c(F)c(F)c3)cc2)CC1] | (56.2) | 7% |
| 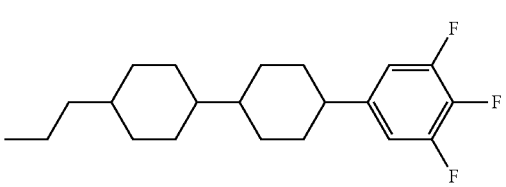 | (34.3) | 10% |
| 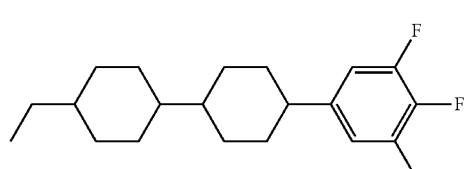 | (34.2) | 10% |

[Chem. 164]
| Example 5 | Chemical structure | Ratio |
|---|---|---|
| 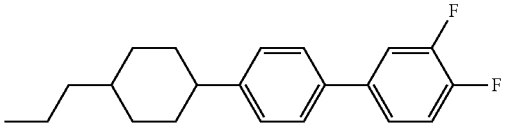 [SMILES: CCCC1CCC(c2ccc(-c3ccc(F)c(F)c3)cc2)CC1] | (54.2) | 10% |
| 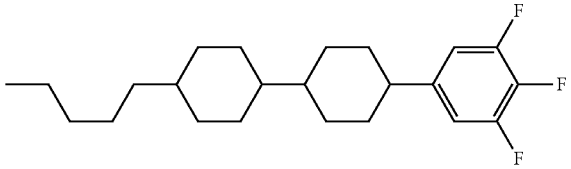 [SMILES: CCCCCC1CCC(C2CCC(c3cc(F)c(F)c(F)c3)CC2)CC1] | (34.5) | 5% |
| 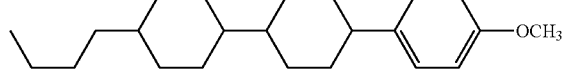 | (13.3) | 5% |
| 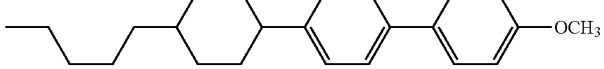 | (17.3) | 5% |
TABLE 7
| | Example 5 |
|---|---|
| Tni | 104.8 |
| ne | 1.571 |
| no | 1.478 |
| Δn | 0.093 |
| ε// | 10.89 |
| ε⊥ | 3.06 |
| Δε | 7.83 |
| η | 22.88 |
| γ1 | 113.8 |
Example 6
The following composition was prepared. Physical properties of the composition of Example 6 are shown in Table 8.
[Chem. 165]
| Example 6 | Chemical structure | Ratio |
|---|---|---|
| 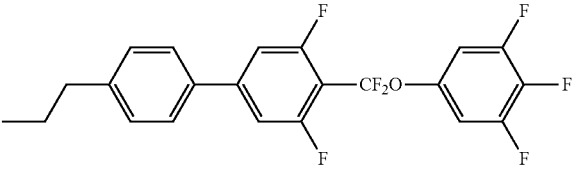 | (26.2) | 10% |
| 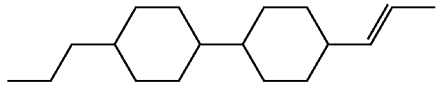 | (1.3) | 5% |
| 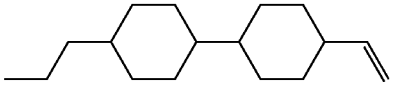 | (2.2) | 15% |
| 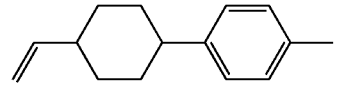 | (6.7) | 7% |

-continued
[Chem. 165]
| Example 6 | Chemical structure | Ratio |
|---|---|---|
| 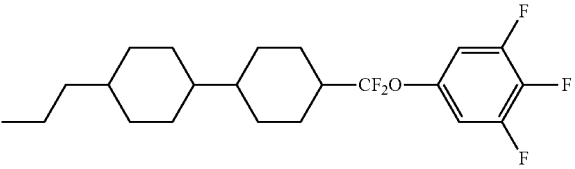 | (ii-1) | 10% |
| 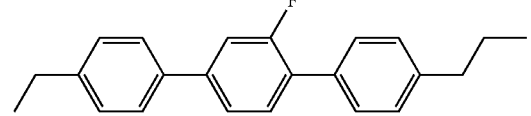 | (i-1) | 5% |
| 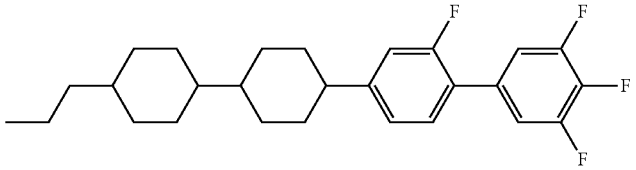 | (37.2) | 5% |
| 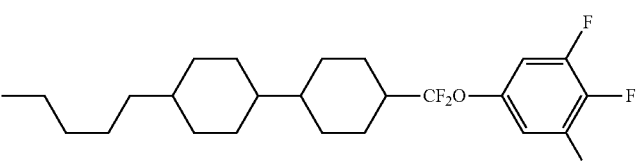 | (ii-2) | 8% |
| 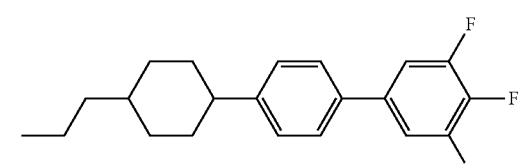 | (56.2) | 8% |
| 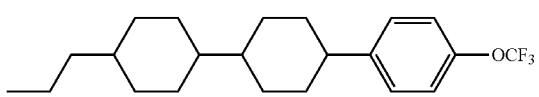 | (31.2) | 15% |
| 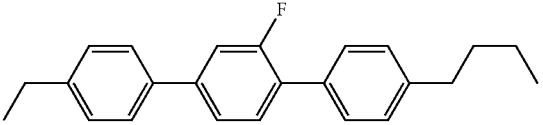 [SMILES: CCCCc1ccc(-c2ccc(-c3ccc(CC)cc3)cc2F)cc1] | (i-3) | 5% |
| 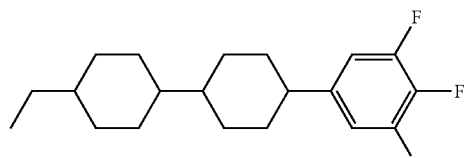 | (34.2) | 7% |
TABLE 8
|  | Example 6 |
|---|---|
| Tni | 92.6 |
| ne | 1.589 |
| no | 1.484 |
| Δn | 0.105 |
| ε// | 12.54 |
| ε⊥ | 3.47 |
TABLE 8-continued
|  | Example 6 |
|---|---|
| Δε | 9.07 |
| η | 17.16 |
| γ1 | 79.39 |

Example 7

The following composition was prepared. Physical properties of the composition of Example 7 are shown in Table 9.

[Chem. 166]

| Example 7 | Chemical structure | Ratio |
|---|---|---|
| propyl-biphenyl(F,F)-CF₂O-phenyl(F,F)-F | (26.2) | 10% |
| ethyl-cyclohexyl-cyclohexyl-CH=CH-CH₃ | (1.3) | 5% |
| propyl-cyclohexyl-cyclohexyl-CH=CH₂ | (2.2) | 15% |
| CH₂=CH-cyclohexyl-phenyl-CH₃ | (6.7) | 7% |
| propyl-cyclohexyl-cyclohexyl-CF₂O-phenyl(F,F,F) | (ii-1) | 5% |
| ethyl-phenyl-phenyl(F)-phenyl-propyl | (i-1) | 8% |
| propyl-cyclohexyl-cyclohexyl-phenyl(F)-phenyl(F,F)-F | (37.2) | 5% |
| butyl-cyclohexyl-cyclohexyl-CF₂O-phenyl(F,F,F) | (ii-2) | 5% |
| propyl-cyclohexyl-phenyl-phenyl(F,F)-F | (56.2) | 8% |
| propyl-cyclohexyl-cyclohexyl-phenyl-OCF₃ | (31.2) | 15% |

-continued

[Chem. 166]

| Example 7 | Chemical structure | Ratio |
|---|---|---|
| [structure: ethyl-phenyl-phenyl(F)-phenyl-butyl] | (i-3) | 10% |
| [structure: ethyl-cyclohexyl-cyclohexyl-phenyl(3F)] | (34.2) | 7% |

| TABLE 9 | |
|---|---|
| | Example 7 |
| Tni | 91.2 |
| ne | 1.604 |
| no | 1.489 |
| Δn | 0.115 |
| ε// | 11.53 |
| ε⊥ | 3.49 |
| Δε | 8.04 |
| η | 17.60 |

| TABLE 9-continued | |
|---|---|
| | Example 7 |
| γ1 | 83.57 |

Example 8

The following composition was prepared. Physical properties of the composition of Example 8 are shown in Table 10.

[Chem. 167]

| Example 8 | Chemical structure | Ratio |
|---|---|---|
| [structure: propyl-phenyl-phenyl(2F)-CF2O-phenyl(3F)F] | (26.2) | 10% |
| [structure: propyl-cyclohexyl-cyclohexyl-vinyl] | (1.3) | 5% |
| [structure: propyl-cyclohexyl-cyclohexyl-vinyl] | (2.2) | 15% |
| [structure: vinyl-cyclohexyl-phenyl-methyl] | (6.7) | 7% |
| [structure: propyl-cyclohexyl-cyclohexyl-CF2O-phenyl(3F)F] | (ii-1) | 13% |
| [structure: ethyl-phenyl-phenyl(F)-phenyl-propyl] | (i-1) | 3% |

[Chem. 167]

| Example 8 | Chemical structure | Ratio |
|---|---|---|
| (structure) | (37.2) | 5% |
| (structure) | (ii-2) | 10% |
| (structure) | (56.2) | 8% |
| (structure) | (31.2) | 15% |
| (structure) | (i-3) | 2% |
| (structure) | (34.2) | 7% |

TABLE 10

| | Example 8 |
|---|---|
| Tni | 93.6 |
| ne | 1.58 |
| no | 1.481 |
| Δn | 0.099 |
| ε// | 13.20 |
| ε⊥ | 3.45 |
| Δε | 9.75 |
| η | 16.95 |
| γ1 | 76.61 |

(Example of Liquid Crystal Display Device)

The liquid crystal compositions of Examples 1 to 3 were used to form liquid crystal display devices of an IPS type having a structure shown in FIGS. 1 and 2. The liquid crystal display devices exhibited excellent display properties (refer to Table 11) and kept stable display properties for a long time.

TABLE 11

| | Example 1 | Example 2 | Example 3 |
|---|---|---|---|
| Initial voltage holding ratio/% | 99.2 | 99.0 | 99.3 |
| Voltage holding ratio after 1 hour at 150° C./% | 98.1 | 97.7 | 97.8 |
| Ghosting evaluation | AA | AA | AA |
| Drop mark evaluation | AA | AA | AA |
| Process compatibility evaluation | AA | AA | AA |
| Evaluation of solubility at low temperature | AA | AA | AA |

INDUSTRIAL APPLICABILITY

A composition that has Δ∈ that takes a positive value and is stable against heat and light can be provided.

REFERENCE SIGNS LIST

100 first substrate
102 TFT layer 103 pixel electrode
104 passivation film
105 first alignment film
200 second substrate
201 planarizing film (overcoat layer)
202 black matrix
203 color filter
204 transparent electrode
205 second alignment film
301 sealing material
302 projection (columnar spacer)
303 liquid crystal layer
304 projection (columnar spacer)
401 mask pattern
402 resin layer

The invention claimed is:

1. A composition comprising one or more compounds represented by general formula (i) and one or more compounds represented by general formula (ii), wherein a content of the compounds represented by general formula (i) is 5% to 30% and a content of the compounds represented by general formula (ii) is 5% to 25%, the composition further comprising a compound represented by formula (2.2), a compound represented by formula (1.3), one or more compounds represented by general formula (VIII-1) but not comprising a compound having a carbonyl group, and one or more compounds represented by general formula (XI)

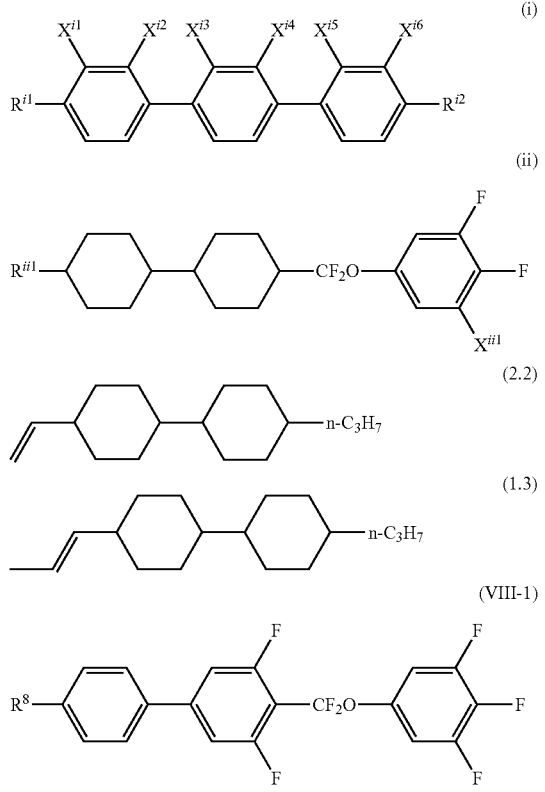

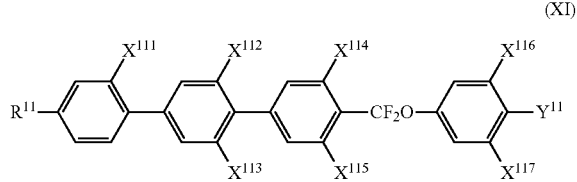

(In the formulae (i) and (ii), $R^{i1}$, $R^{i2}$, and $R^{ii1}$ each independently represent an alkyl group having 1 to 8 carbon atoms where one —$CH_2$— or two or more non-adjacent —$CH_2$— in the alkyl group may each independently be substituted with —CH=CH—, —C≡C—, or —O—, $X^{i1}$ to $X^{i6}$ each independently represent a hydrogen atom or a fluorine atom, and $X^{ii1}$ represents a fluorine atom in the formula (VIII-1), $R^8$ represents an alkyl group having 1 to 5 carbon atoms, an alkenyl group having 2 to 5 carbon atoms, or an alkoxy group having 1 to 4 carbon atoms, and wherein in the formula (XI), $X^{111}$ to $X^{117}$ each independently represent a fluorine atom or a hydrogen atom, at least one of $X^{111}$ to $X^{117}$ represents a fluorine atom, $R^{11}$ represents an alkyl group having 1 to 5 carbon atoms, an alkenyl group having 2 to 5 carbon atoms, or an alkoxy group having 1 to 4 carbon atoms, and $Y^{11}$ represents a fluorine atom or —$OCF_3$.).

2. position according to claim 1, wherein one of $X^{i1}$ to $X^{i6}$ in general formula (i) represents a fluorine atom.

3. position according to claim 1, comprising a compound represented by general formula (L):

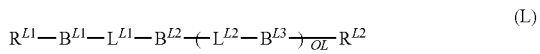

(In the formula, $R^{L1}$ and $R^{L2}$ each independently represent an alkyl group having 1 to 8 carbon atoms where one —$CH_2$— or two or more non-adjacent —$CH_2$— in the alkyl group may each independently be substituted with —CH=CH—, —C≡C—, or —O—, OL represents 0, 1, 2, or 3, $B^{L1}$, $B^{L2}$, and $B^{L3}$ each independently represent a group selected from the group consisting of (a) a 1,4-cyclohexylene group (one —$CH_2$— or two or more non-adjacent —$CH_2$— that are present in this group may each be substituted with —O—) and (b) a 1,4-phenylene group (one —CH= or two or more non-adjacent —CH= that are present in this group may each be substituted with —N=)

where the groups (a) and (b) may each independently be substituted with a cyano group, a fluorine atom, or a chlorine atom, $L^{L1}$ and $L^{L2}$ each independently represent a single bond, —$CH_2CH_2$—, —$(CH_2)_4$—, —$OCH_2$—, —$CH_2O$—, —$OCF_2$—, —$CF_2O$—, —CH=N—N=CH—, —CH=CH—, —CF=CF—, or —C≡C—, and when OL represents 2 or 3 and two or more $L^{L2}$ are present, the two or more $L^{L2}$ may be the same or different and when OL represents 2 or 3 and two or more $B^{L3}$ are present, the two or more $B^{L3}$ may be the same or different provided that the compounds represented by general formula (i), formula (2.2), and formula (1.3) are excluded.).

4. position according to claim 1, comprising a compound represented by general formula (M):

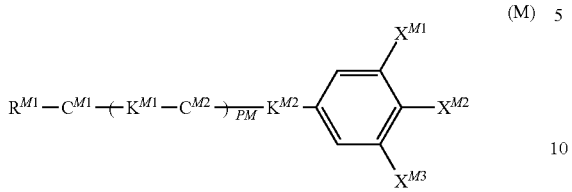 (M)

(In the formula, $R^{M1}$ represents an alkyl group having 1 to 8 carbon atoms where one —$CH_2$— or two or more non-adjacent —$CH_2$— in the alkyl group may each independently be substituted with —CH═CH—, —C≡C—, or —O—, PM represents 0, 1, 2, 3, or 4, $C^{M1}$ and $C^{M2}$ each independently represent a group selected from the group consisting of
(d) a 1,4-cyclohexylene group (one —$CH_2$— or two or more non-adjacent —$CH_2$— that are present in this group may each be substituted with —O— or —S—) and
(e) a 1,4-phenylene group (one —CH═ or two or more non-adjacent —CH═ that are present in this group may each be substituted with —N═)
where the group (d) and the group (e) may each independently be substituted with a cyano group, a fluorine atom, or a chlorine atom, $K^{M1}$ and $K^{M2}$ each independently represent a single bond, —$CH_2CH_2$—, —$(CH_2)_4$—, —$OCH_2$—, —$CH_2O$—, —$OCF_2$—, —$CF_2O$—, or —C≡C—, when PM represents 2, 3, or 4 and two or more $K^{M1}$ are present, the two or more $K^{M1}$ may be the same or different and when PM represents 2, 3, or 4 and two or more $C^{M2}$ are present, the two or more $C^{M2}$ may be the same or different, $X^{M1}$ and $X^{M3}$ each independently represent a hydrogen atom, a chlorine atom, or a fluorine atom, and $X^{M2}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group, provided that the compounds represented by general formula (ii), formula (VIII-1), and formula (XI) are excluded.

5. A liquid crystal display device that uses the composition according to claim 1.

6. An IPS element that uses the composition according to claim 1.

7. The composition according to claim 1, wherein the one or more compounds represented by general formula (XI) comprises

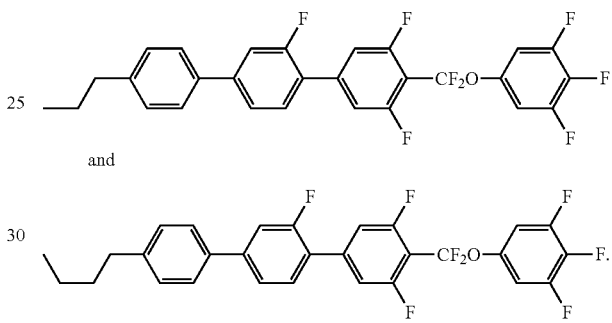

and

* * * * *